(12) United States Patent
Foster et al.

(10) Patent No.: US 10,555,566 B2
(45) Date of Patent: Feb. 11, 2020

(54) IMPACT PROTECTION SYSTEMS

(71) Applicant: PINWREST DEVELOPMENT GROUP, LLC, New York, NY (US)

(72) Inventors: Bruce Foster, Morganville, NJ (US); Mark Panko, Allen, TX (US); Stacy Weiland, Imperial, MO (US)

(73) Assignee: PINWREST DEVELOPMENT GROUP, LLC, New York, NY (US)

( * ) Notice: Subject to any disclaimer, the term of this patent is extended or adjusted under 35 U.S.C. 154(b) by 696 days.

(21) Appl. No.: 15/038,047

(22) PCT Filed: Nov. 6, 2014

(86) PCT No.: PCT/US2014/064446
§ 371 (c)(1),
(2) Date: May 20, 2016

(87) PCT Pub. No.: WO2015/077044
PCT Pub. Date: May 28, 2015

(65) Prior Publication Data
US 2016/0295935 A1 Oct. 13, 2016

Related U.S. Application Data

(60) Provisional application No. 61/907,738, filed on Nov. 22, 2013.

(51) Int. Cl.
*A41D 13/00* (2006.01)
*A41D 13/015* (2006.01)
(Continued)

(52) U.S. Cl.
CPC .......... *A41D 13/015* (2013.01); *A41D 13/05* (2013.01); *A41D 19/002* (2013.01);
(Continued)

(58) Field of Classification Search
CPC .... A41D 13/015; A41D 13/05; A41D 19/002; A41D 19/01523; A42B 1/08; A42B 3/063
See application file for complete search history.

(56) References Cited

U.S. PATENT DOCUMENTS

| | | |
|---|---|---|
| 4,602,385 A | 7/1986 | Warren |
| 4,660,230 A | 4/1987 | Mayling |

(Continued)

*Primary Examiner* — Richale L Quinn
(74) *Attorney, Agent, or Firm* — Loeb & Loeb LLP

(57) ABSTRACT

Disclosed are body impact protection systems. The body impact protection system may comprise at least one plate element layer, such as an interconnected meshed plate element network. Another embodiment may be directed to a protection system comprising at least one plate element layer, such as an interconnected meshed plate element network overlapping and adjacent to at least one liner or gel. Further embodiments may comprise the combination of multiple body impact protection systems in a single protective garment or device. Impact protection systems may be designed to protect various body features, such as for example, the head, shoulders, elbows, arms, wrists, hands, chest, torso, thighs, knees, shins, ankles, feet, and the like. The inventive body impact protection system affords more protection from the force of an impact and comfort than conventional body impact protection systems.

4 Claims, 63 Drawing Sheets

(51) Int. Cl.
  *A41D 19/015*  (2006.01)
  *A42B 1/08*   (2006.01)
  *A41D 13/05*  (2006.01)
  *A41D 19/00*  (2006.01)
  *A42B 3/06*   (2006.01)
(52) U.S. Cl.
  CPC .......... *A41D 19/01523* (2013.01); *A42B 1/08* (2013.01); *A42B 3/063* (2013.01)

(56) References Cited

U.S. PATENT DOCUMENTS

| | | | | |
|---|---|---|---|---|
| 7,093,301 B1* | 8/2006 | Moore, Jr. | ......... | A41D 13/0518 2/2.5 |
| 8,627,512 B2* | 1/2014 | Dodd | ................. | A41D 13/0153 2/22 |
| 8,961,733 B2* | 2/2015 | Dodd | ................. | A41D 13/0153 156/290 |
| 9,198,471 B2* | 12/2015 | Behrend | ............ | A41D 13/0153 |
| 9,554,624 B2* | 1/2017 | Cross | .................... | A43B 13/22 |
| 9,675,122 B2* | 6/2017 | Turner | ................. | A41D 13/015 |
| 10,070,688 B2* | 9/2018 | Lawless | ................ | A43B 13/181 |
| 10,143,256 B2* | 12/2018 | Straus | ................... | A63B 71/10 |
| 10,159,295 B2* | 12/2018 | Frey | ...................... | A42B 3/065 |
| 2006/0179538 A1* | 8/2006 | Dodd | ................. | A41D 13/0153 2/22 |
| 2008/0172779 A1 | 7/2008 | Ferguson | | |
| 2012/0284892 A1 | 11/2012 | Szurley et al. | | |
| 2013/0247284 A1* | 9/2013 | Hoshizaki | ................ | A42B 3/12 2/413 |
| 2013/0276214 A1* | 10/2013 | Wesson | ................. | A42B 3/125 2/414 |
| 2014/0068841 A1* | 3/2014 | Brown | ................... | A42B 3/122 2/413 |
| 2014/0208486 A1* | 7/2014 | Krueger | ................ | A42B 3/064 2/414 |

* cited by examiner

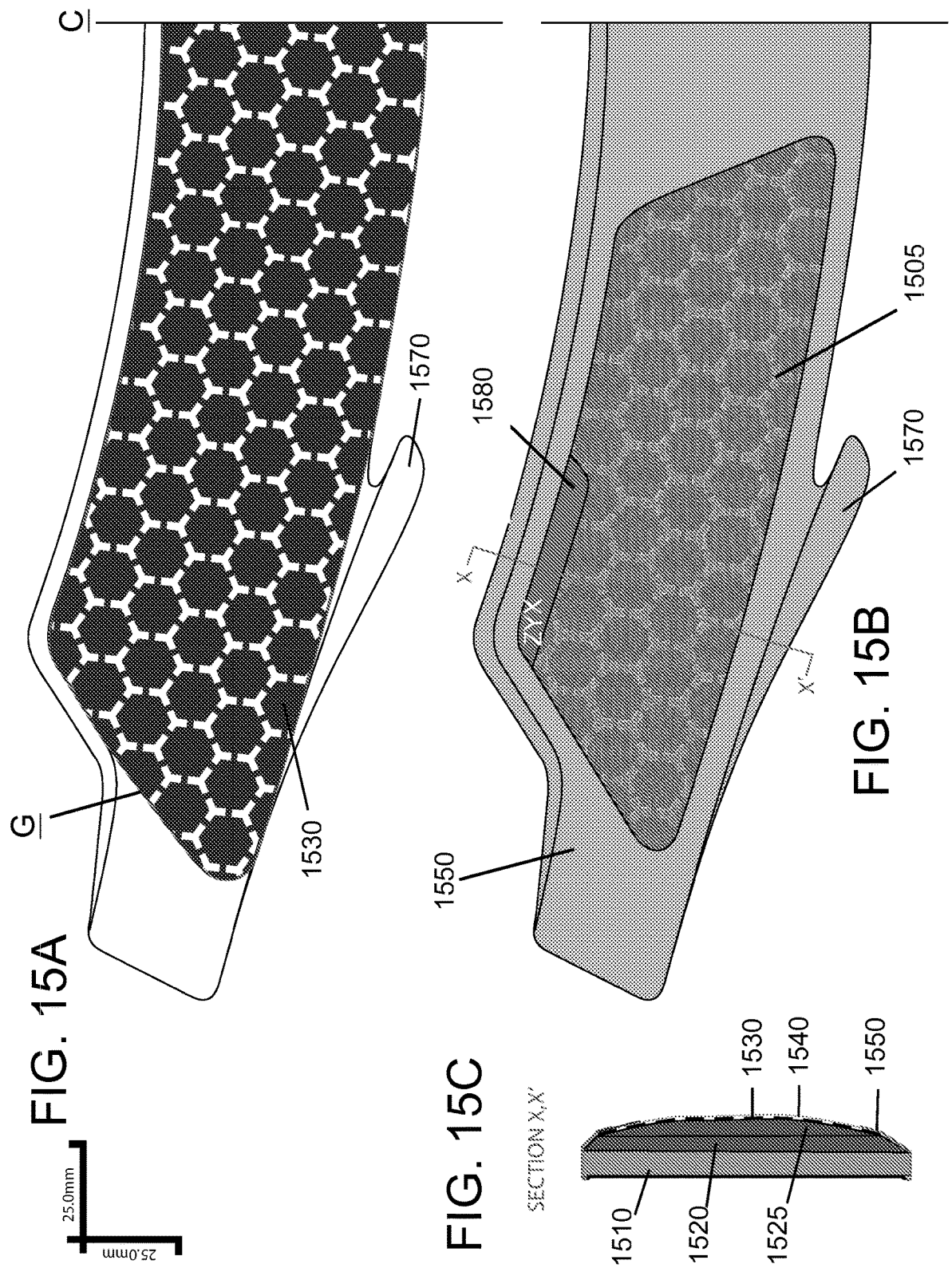

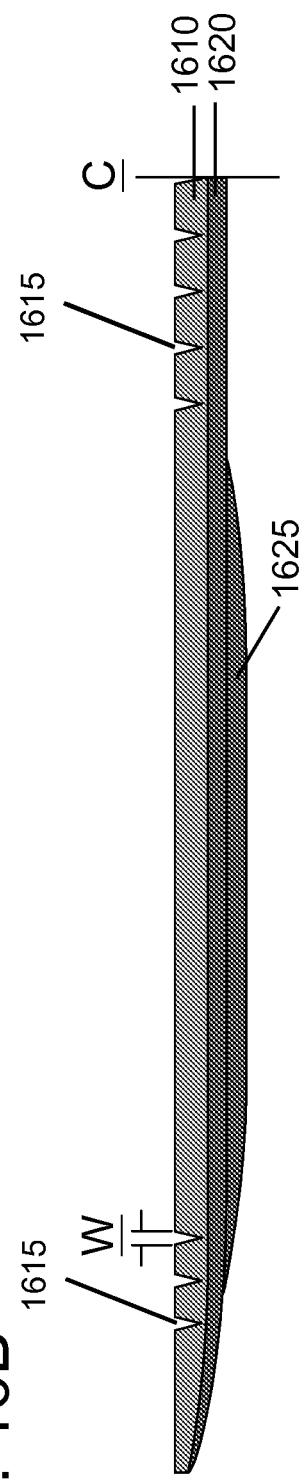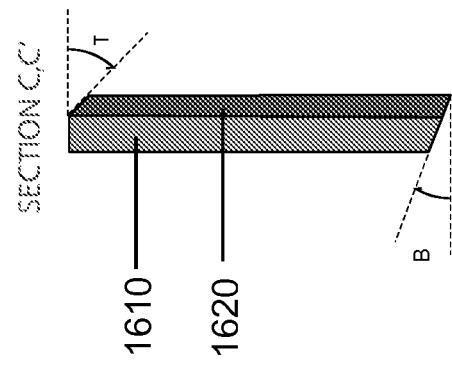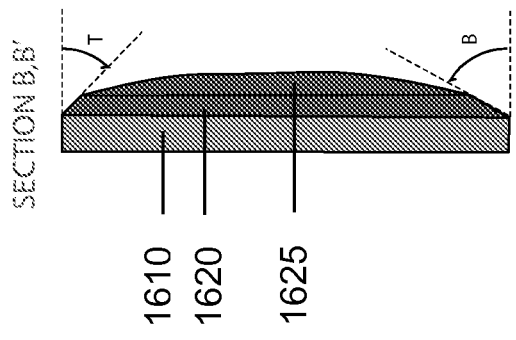

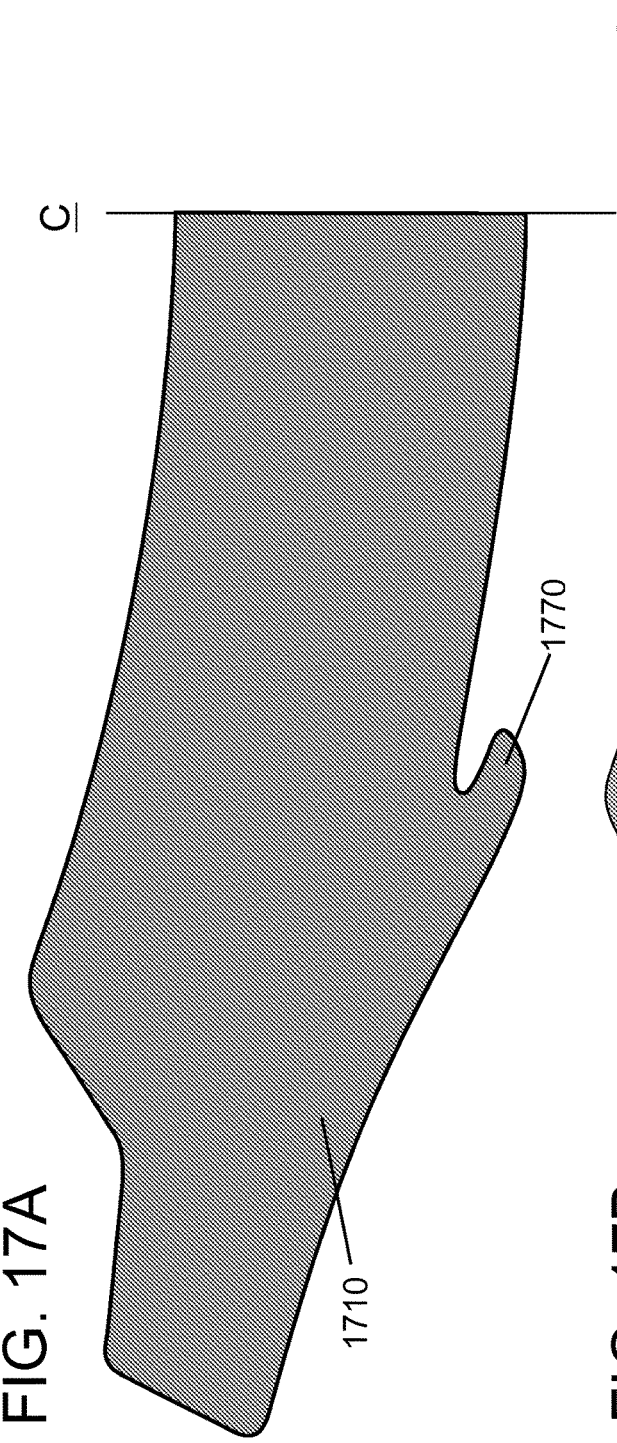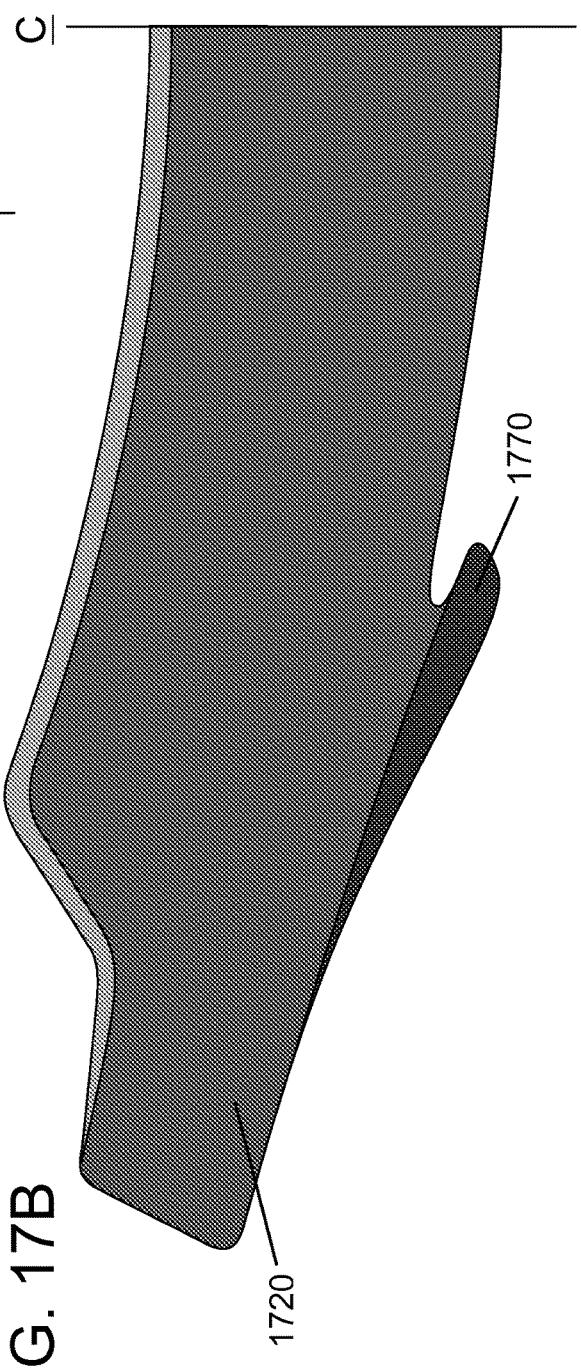
FIG. 17A
FIG. 17B

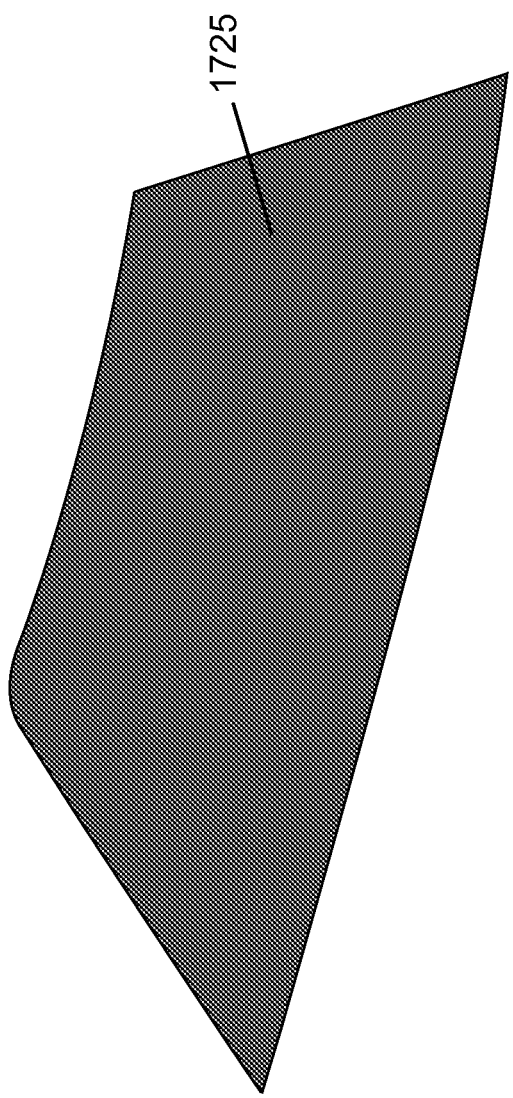
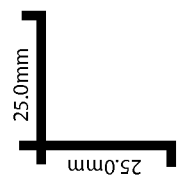
FIG. 17C

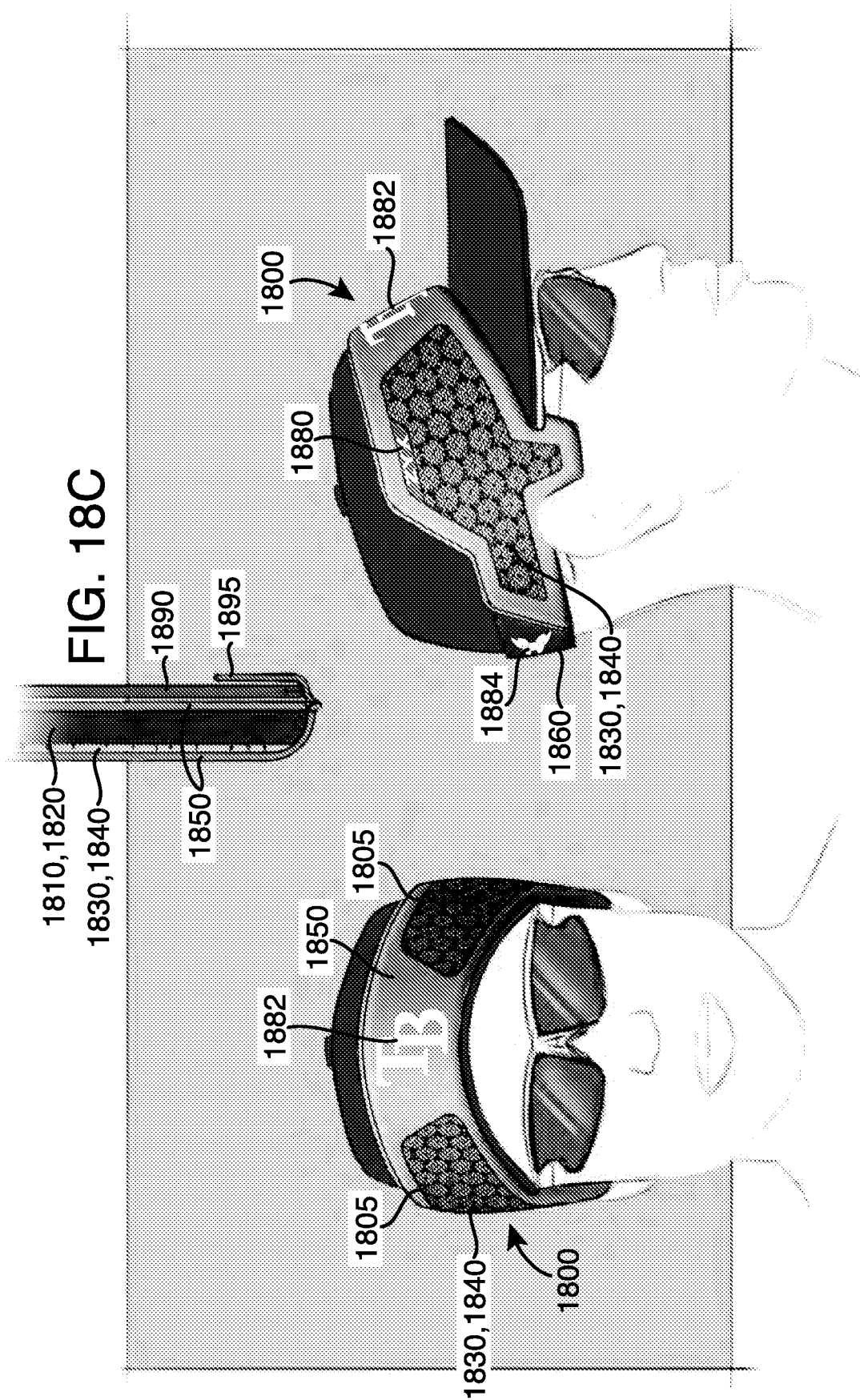

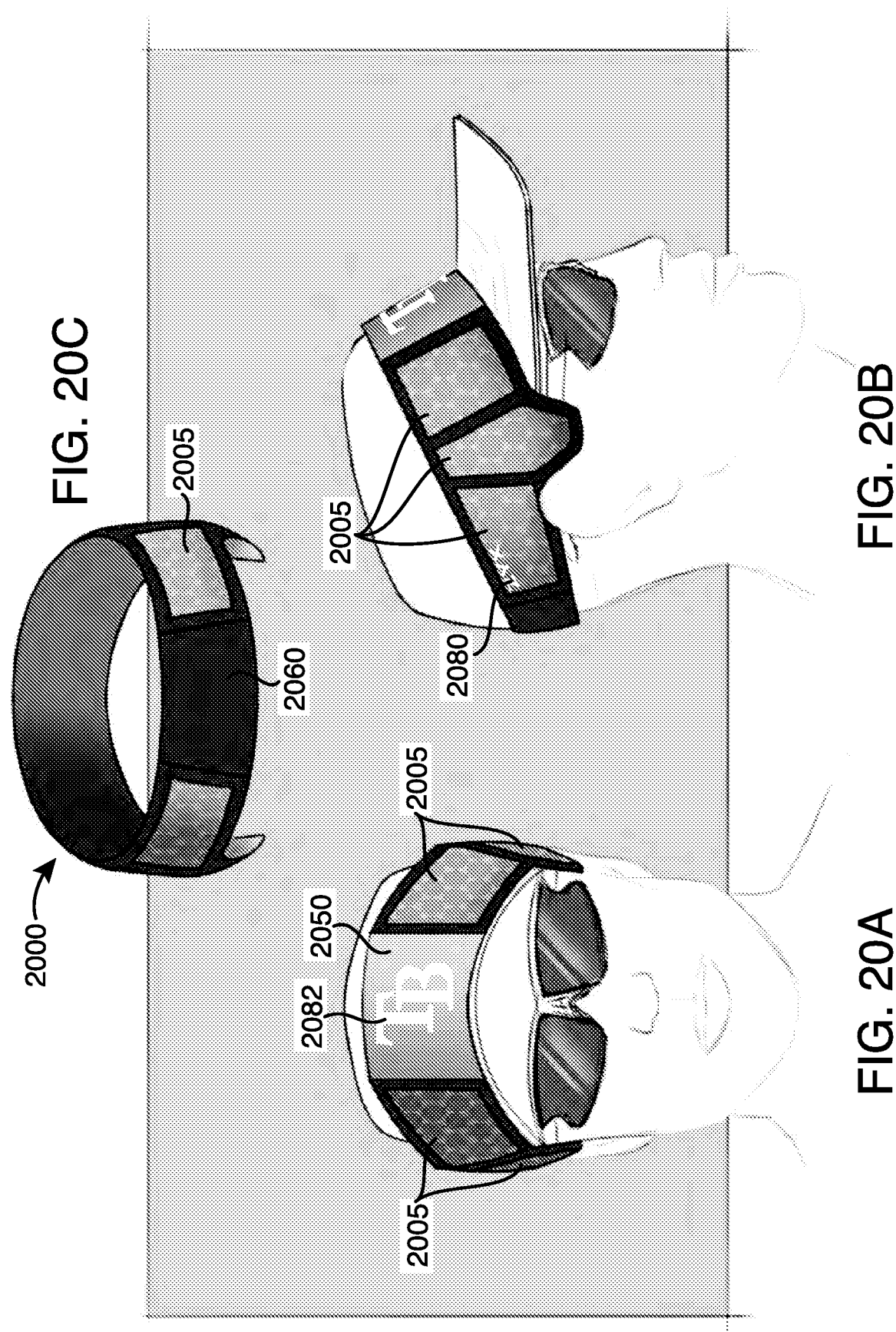

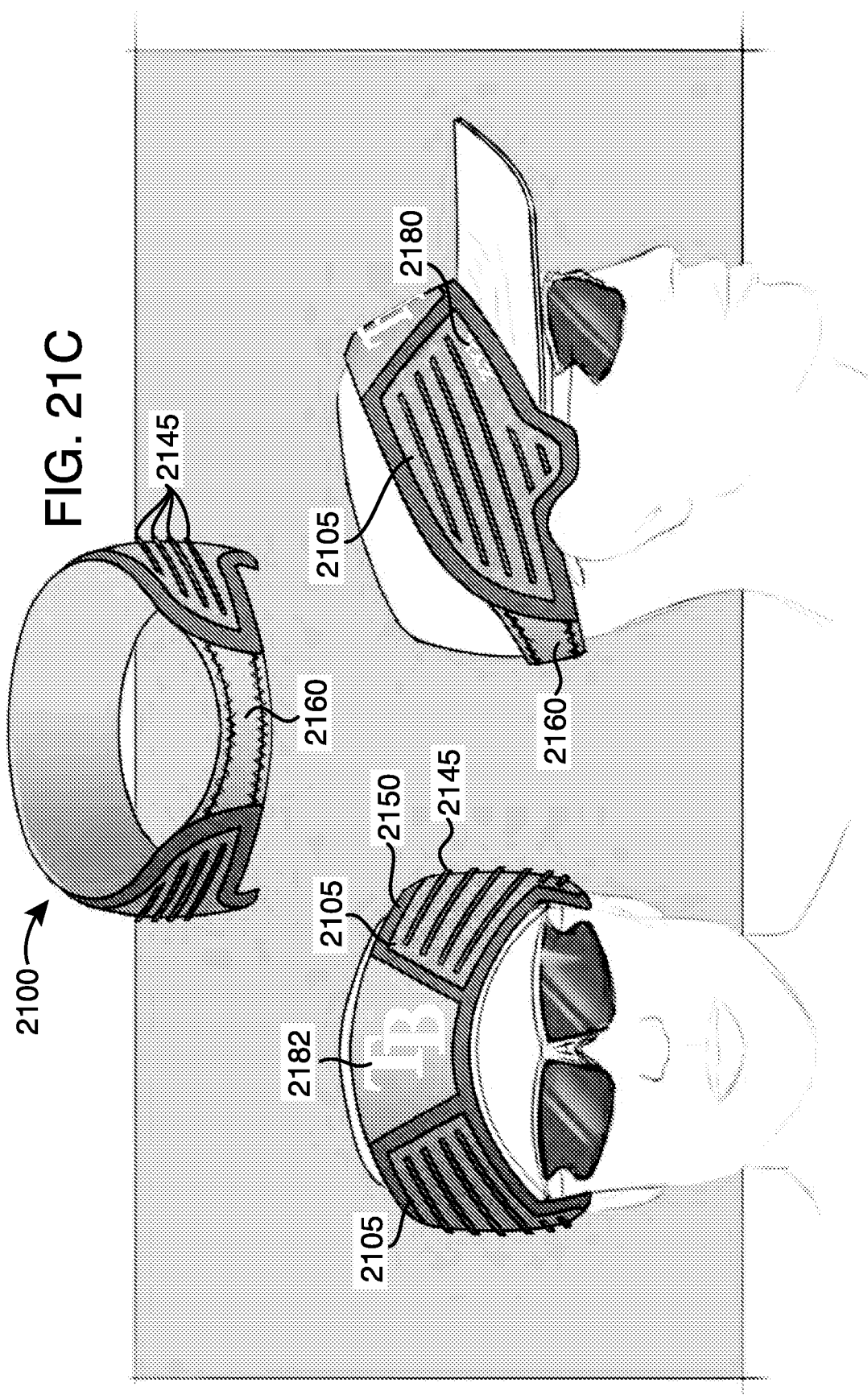

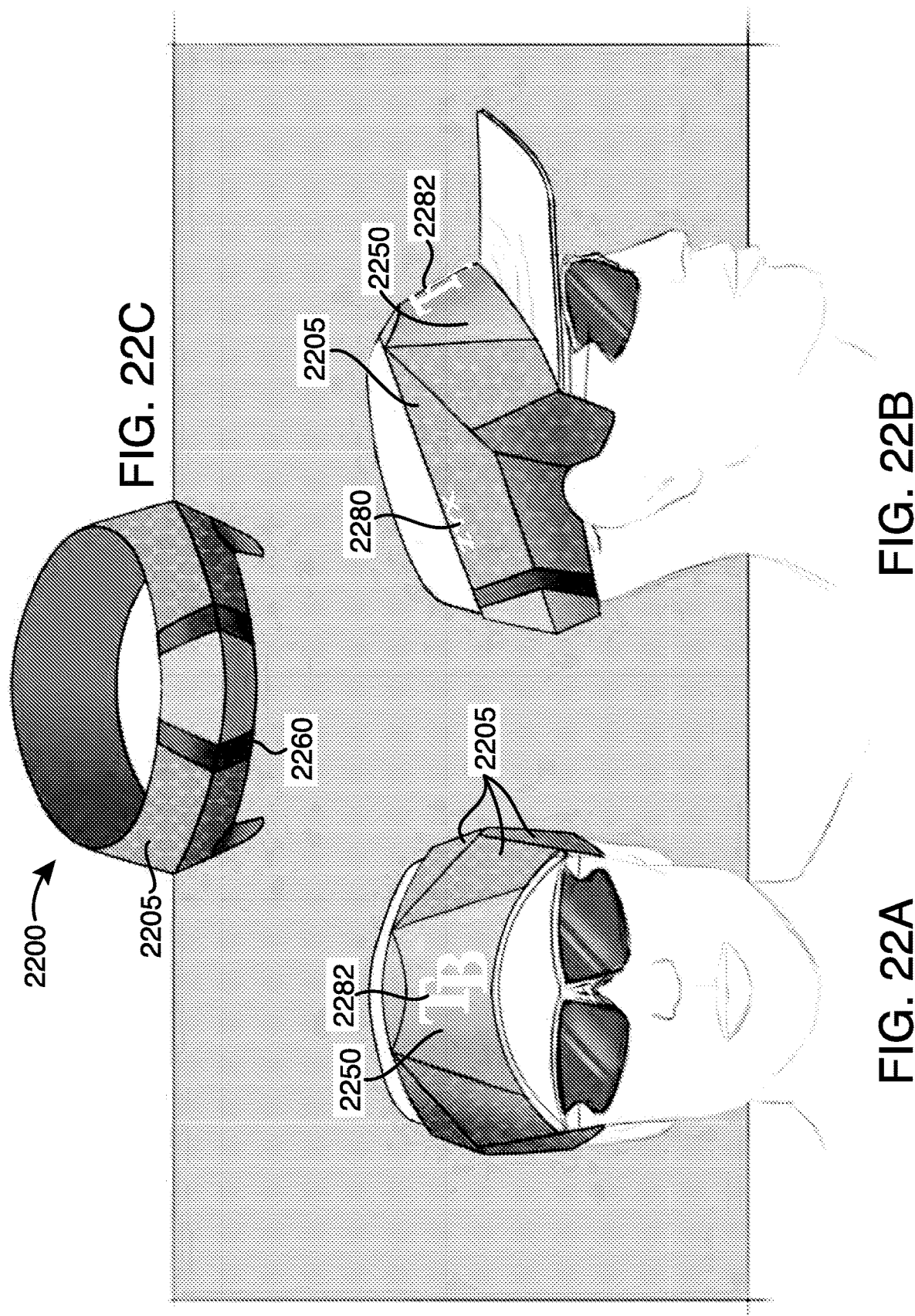

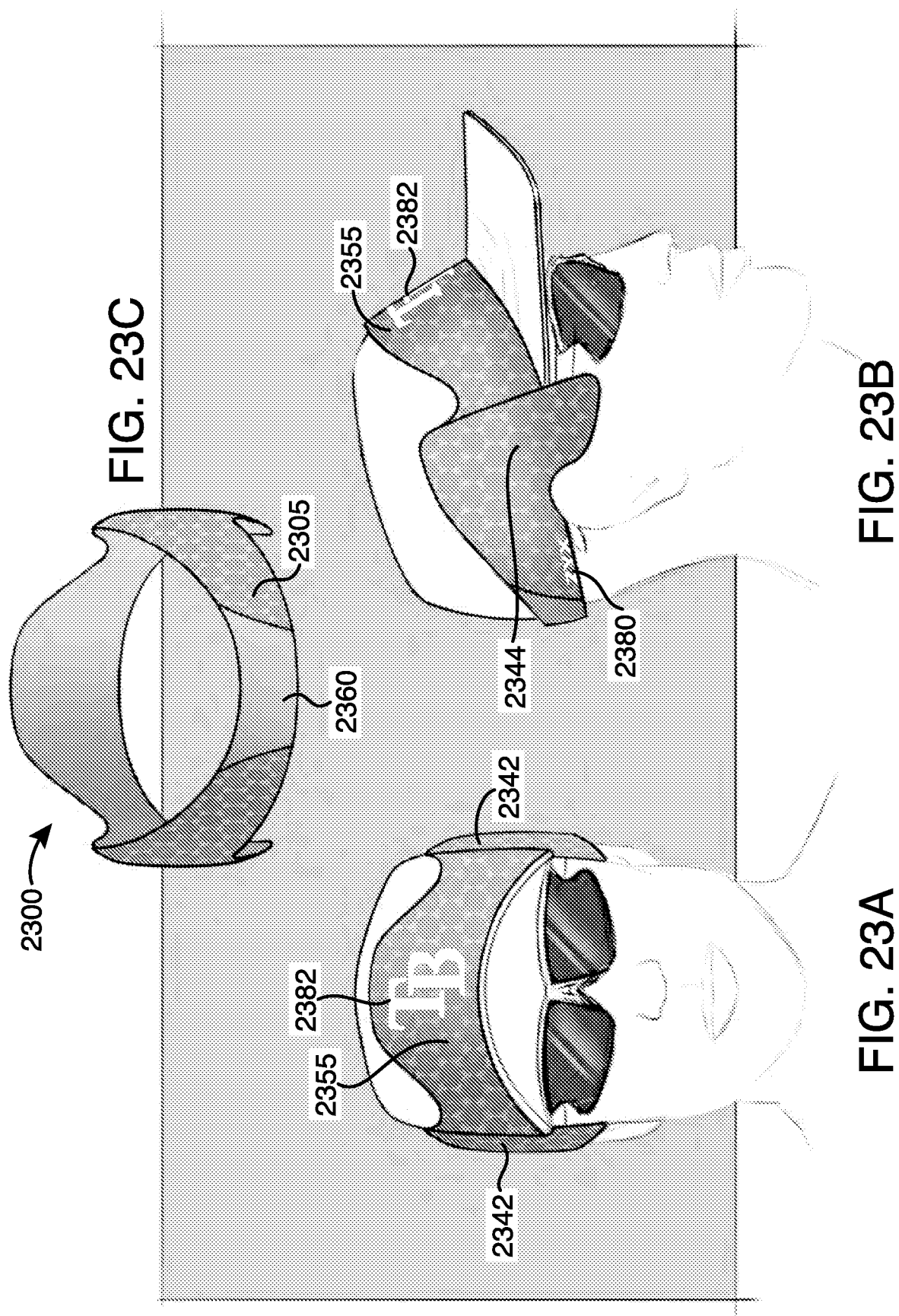

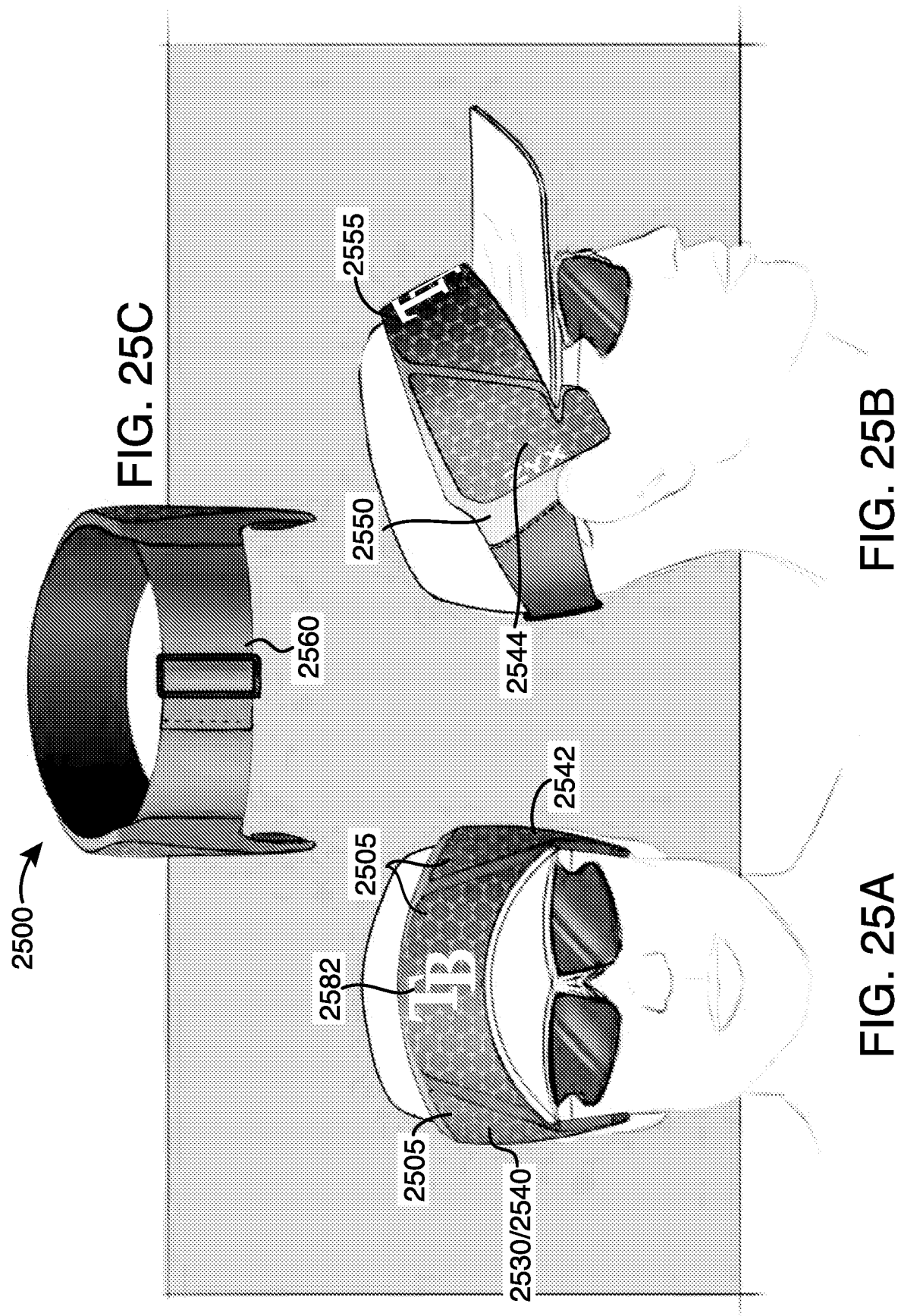

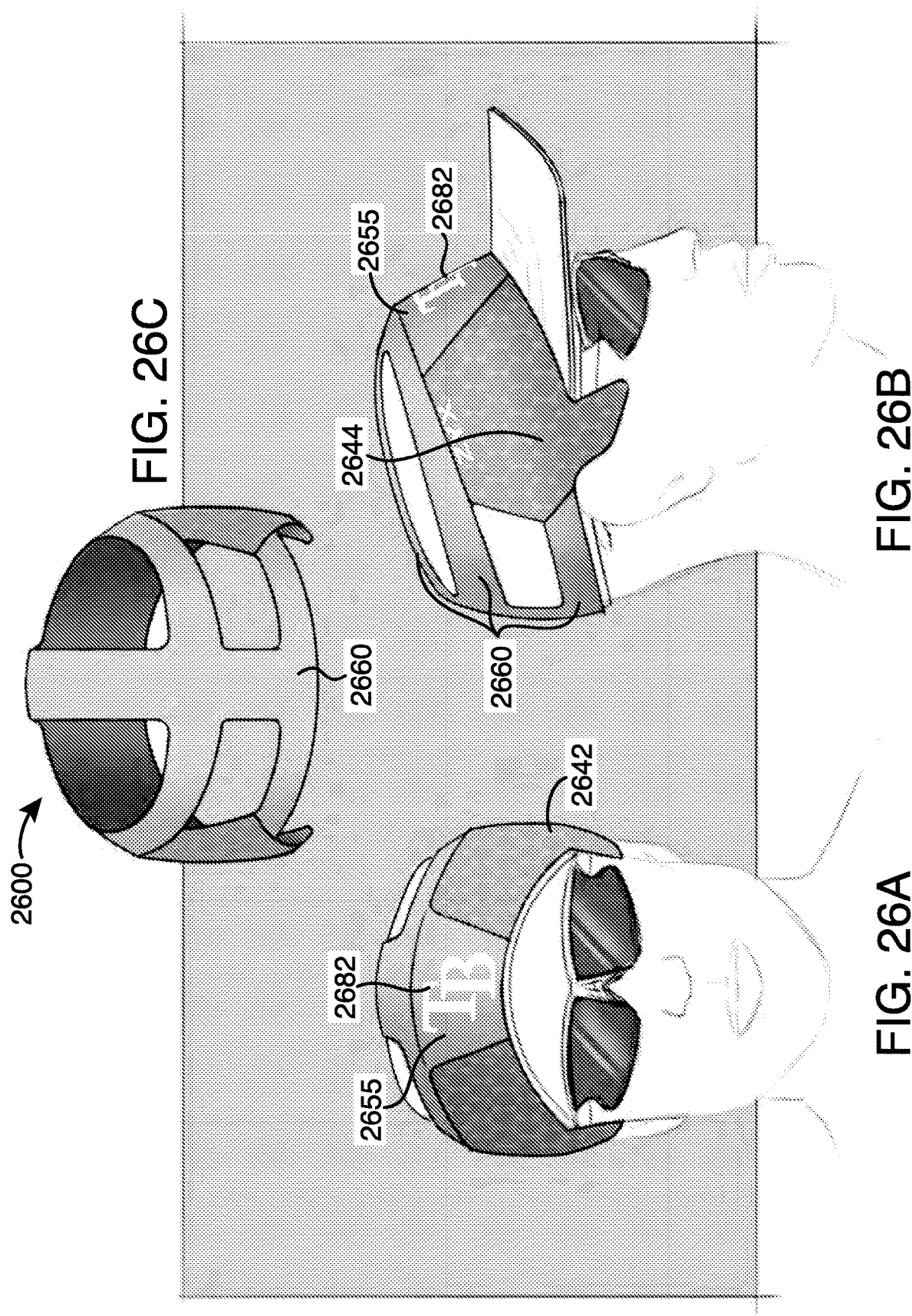

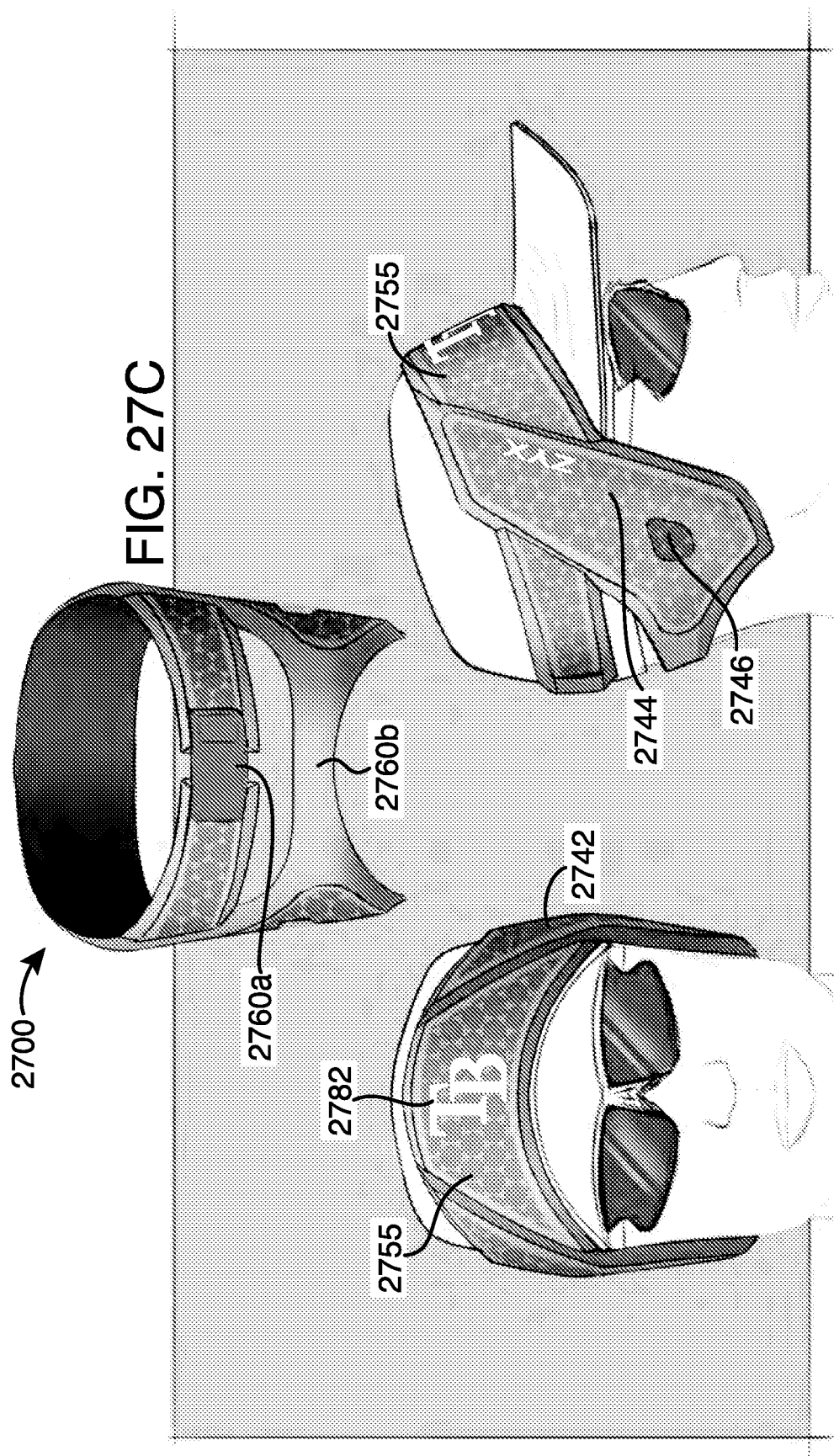

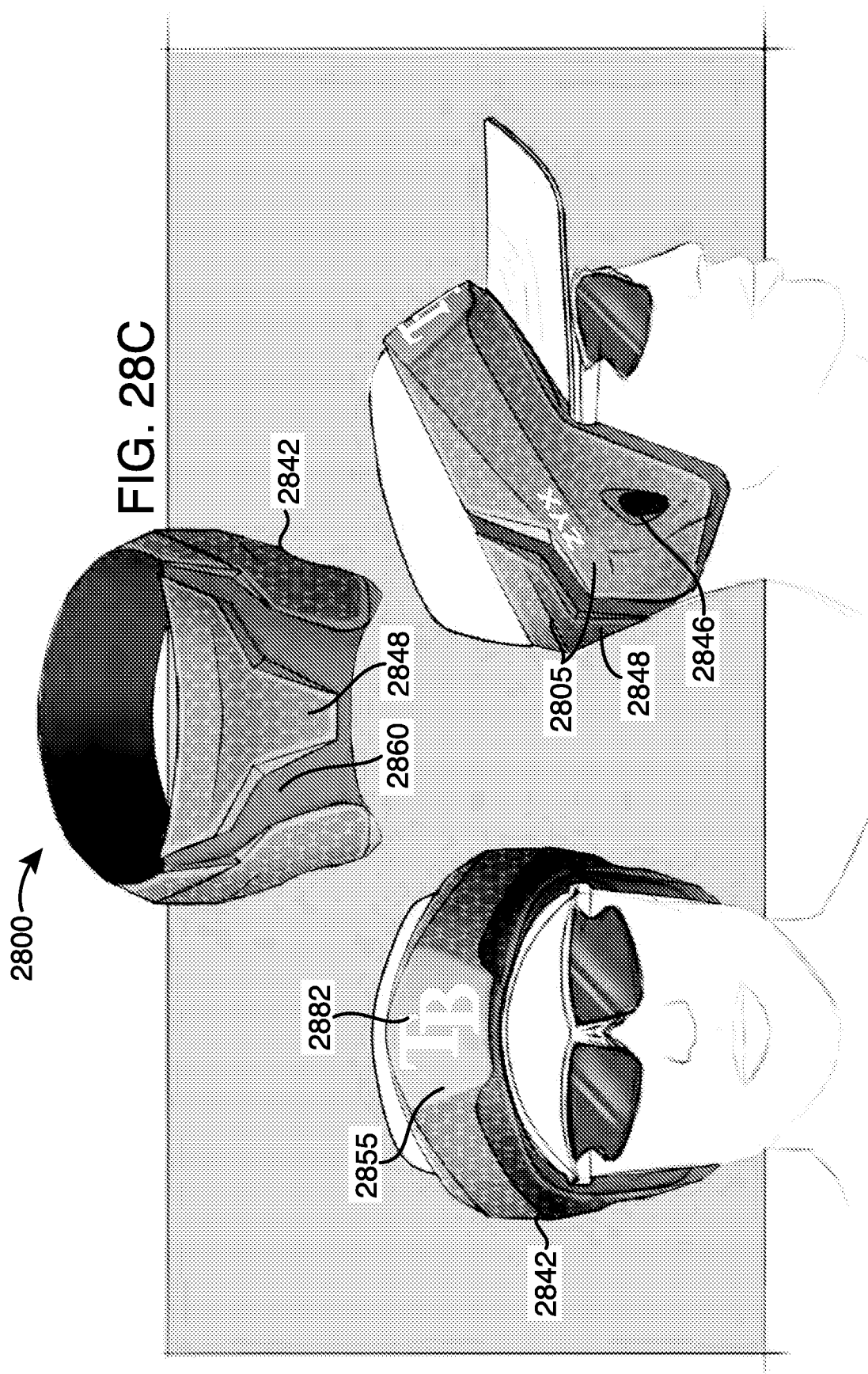

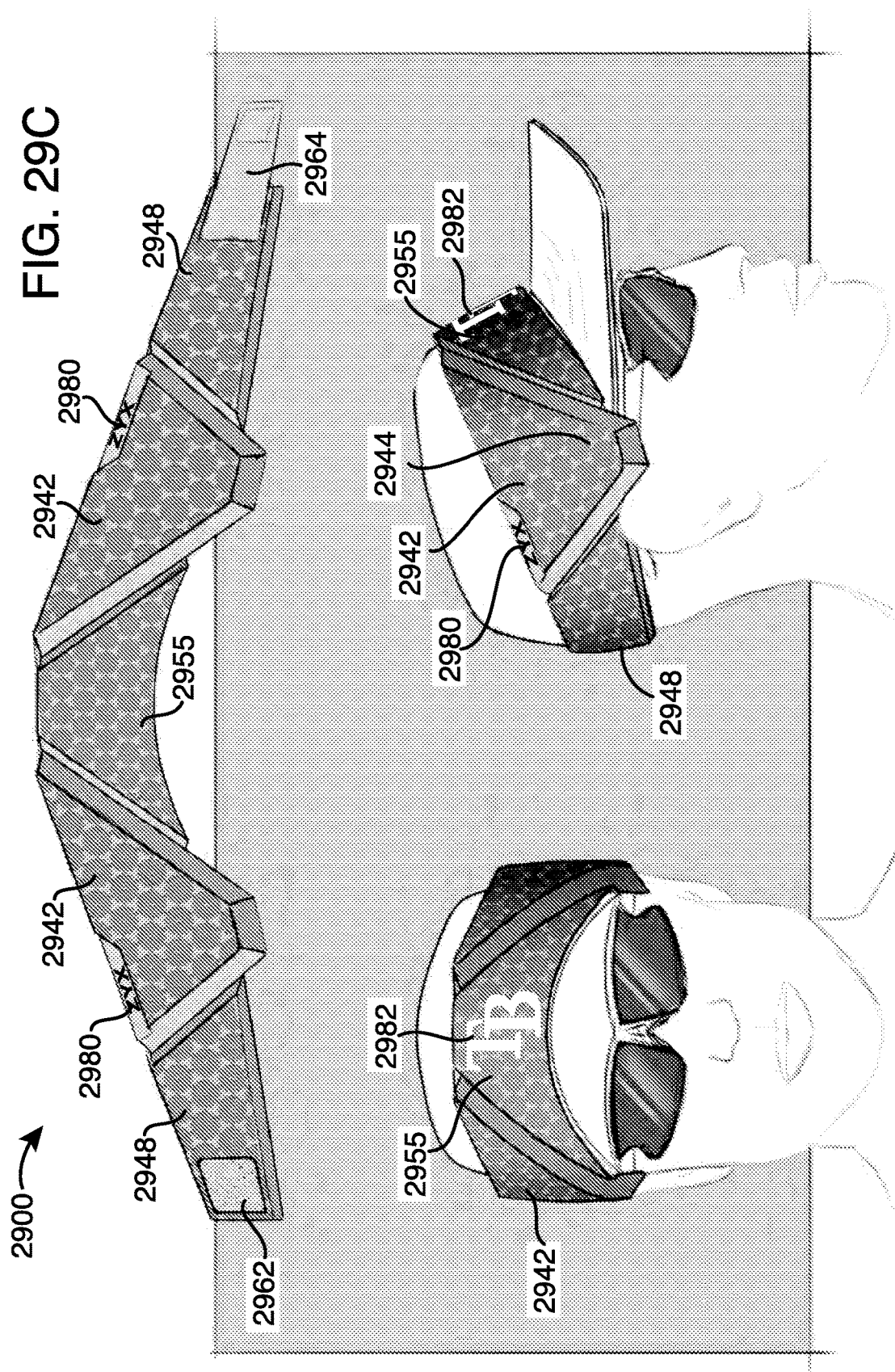

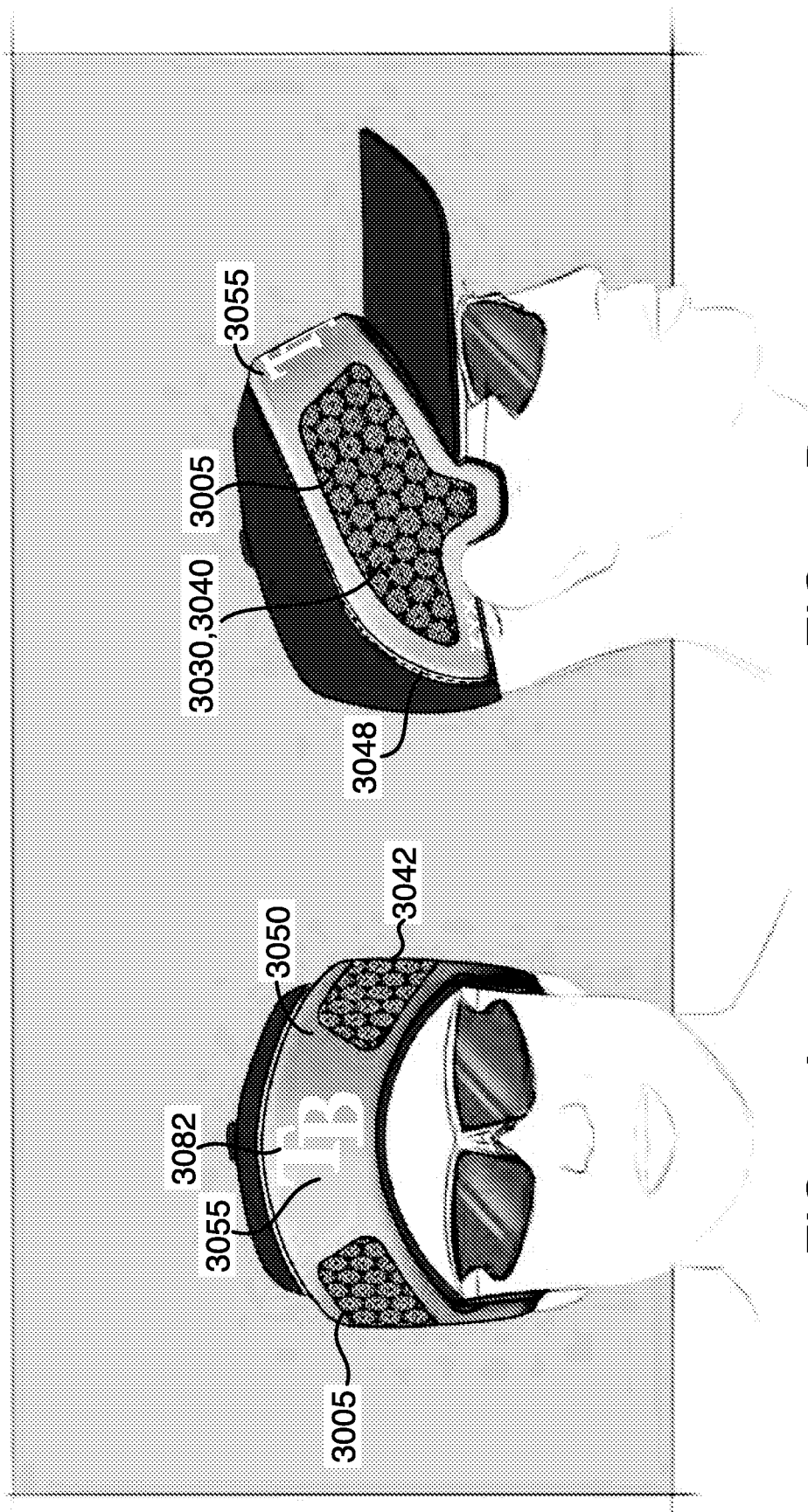

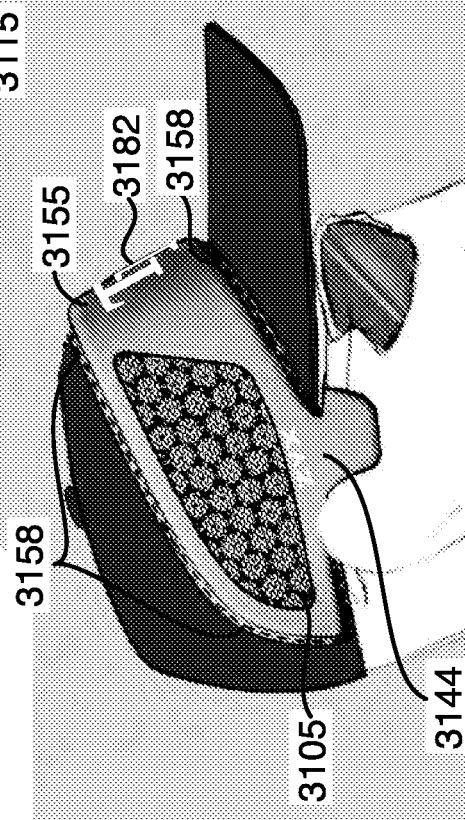
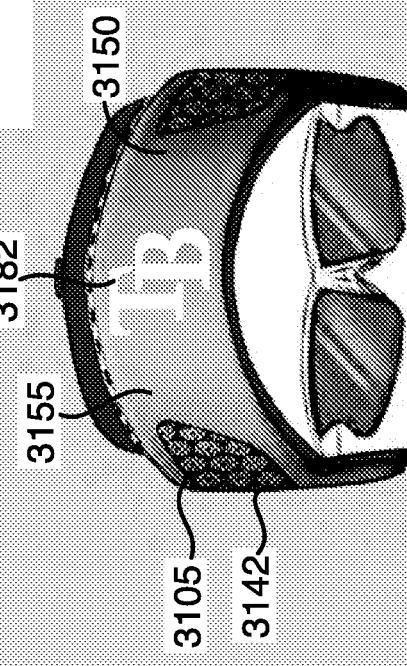

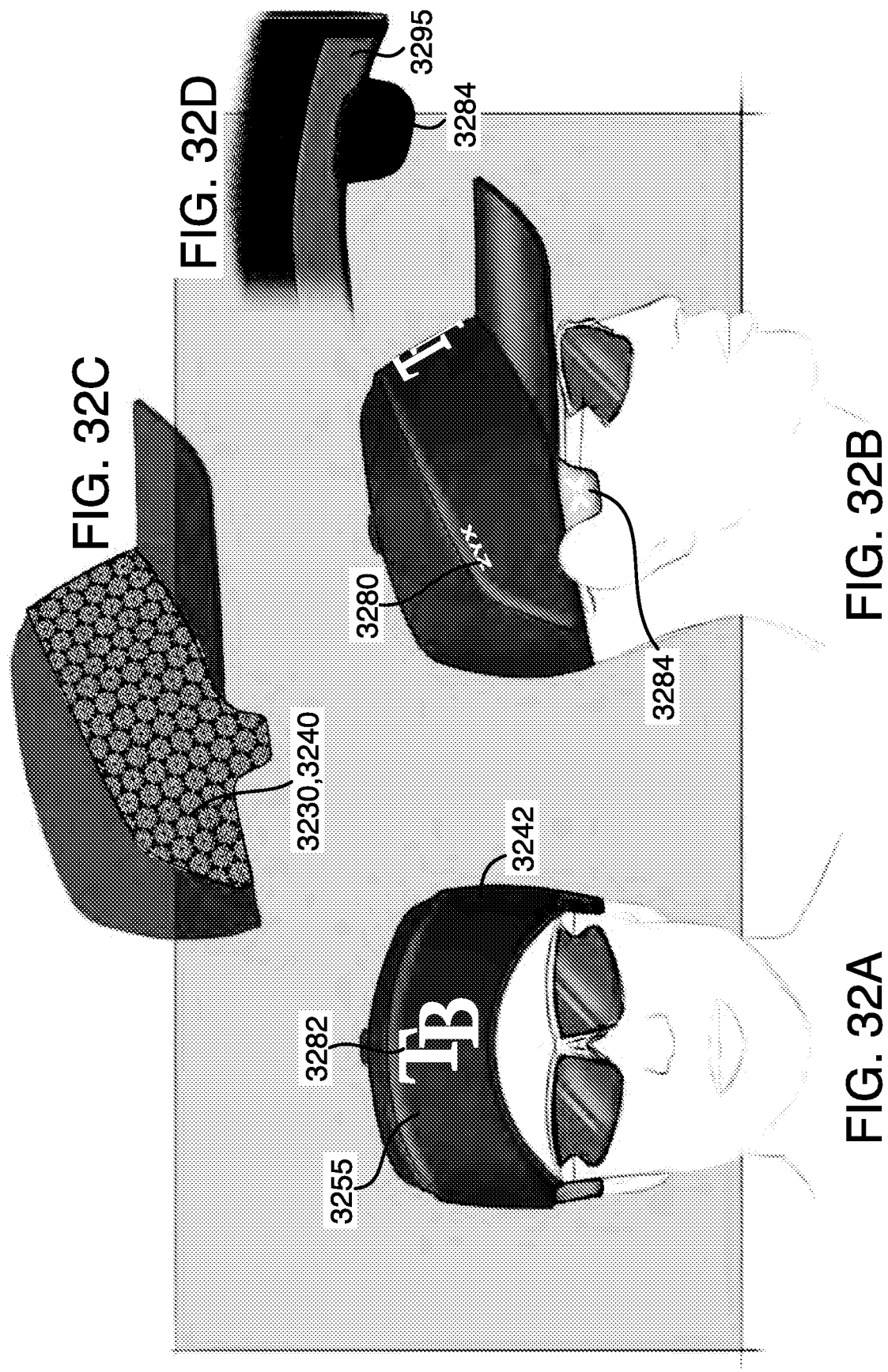

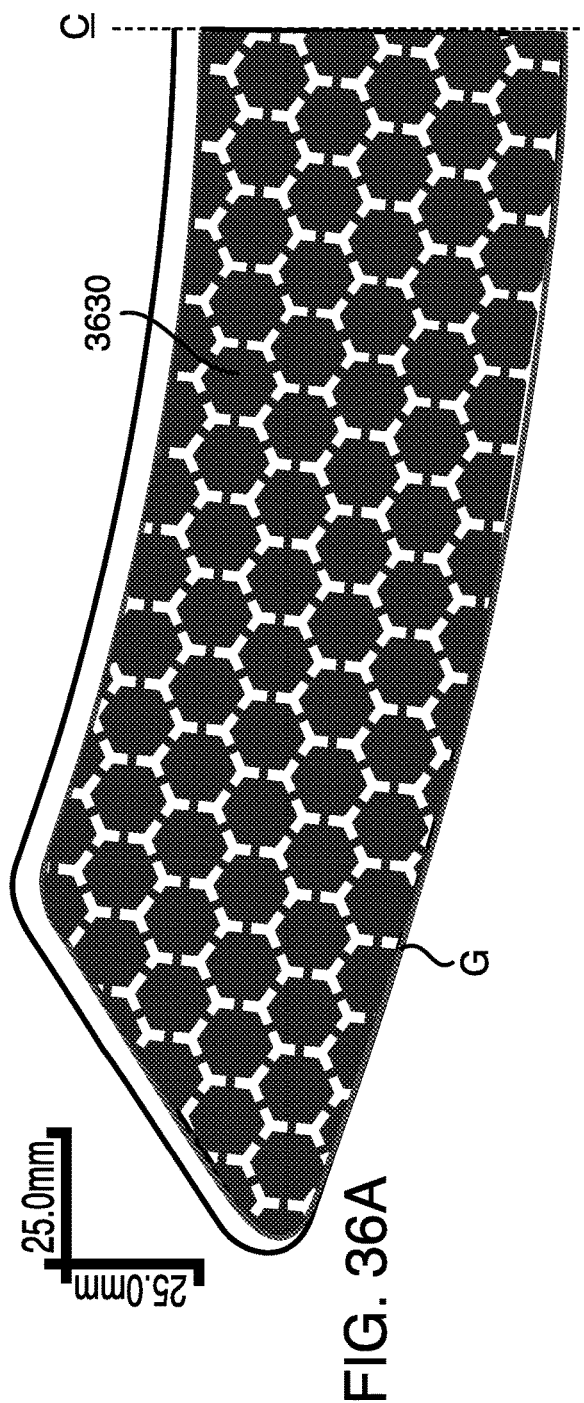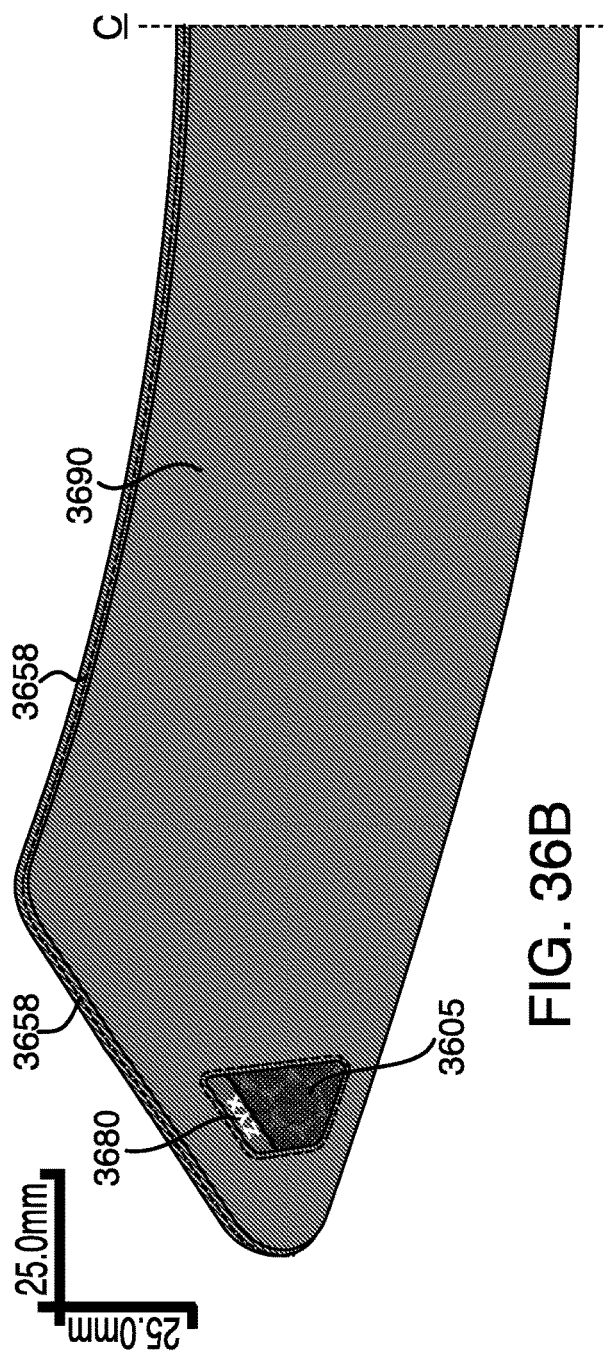
FIG. 36A
FIG. 36B

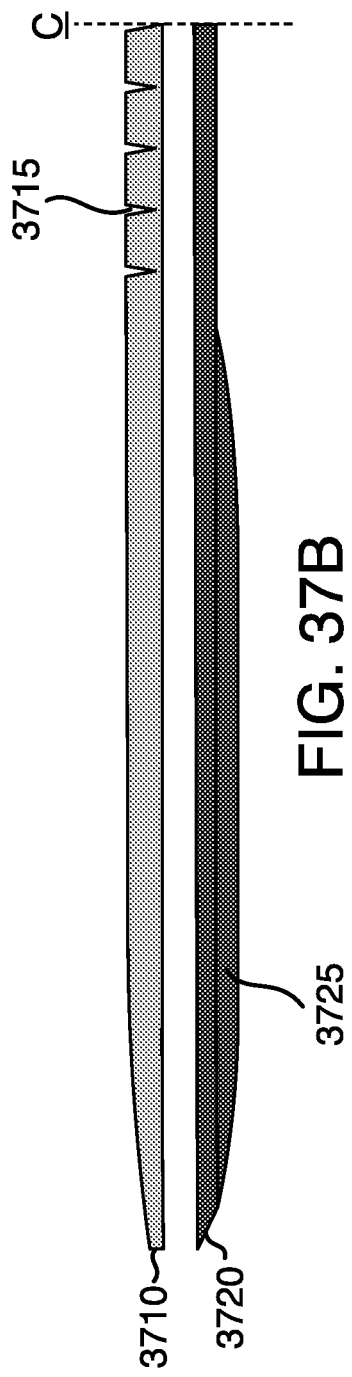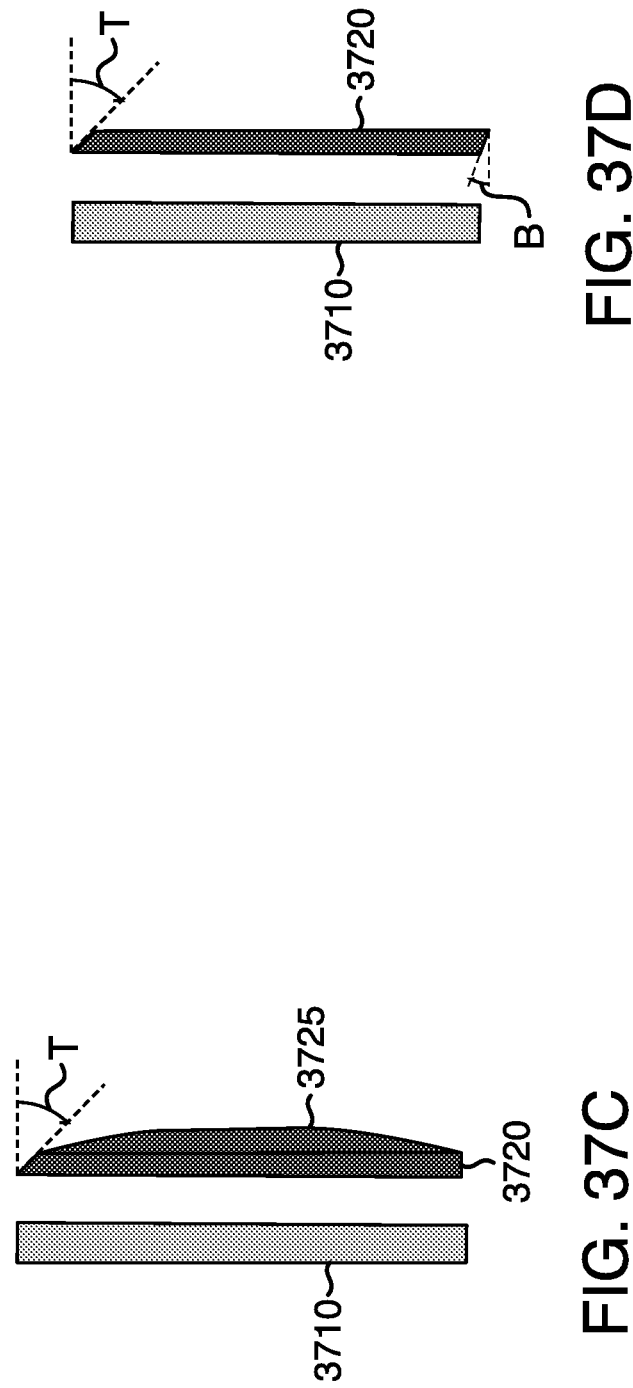

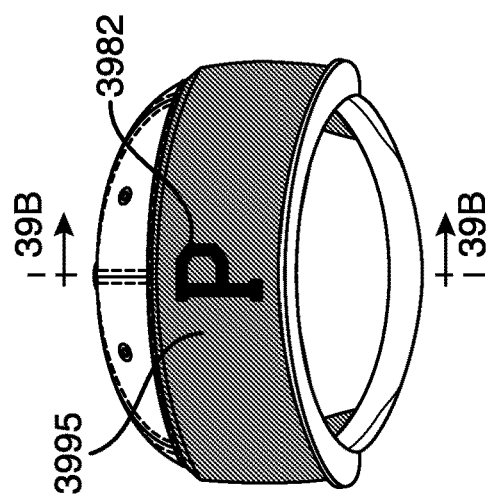
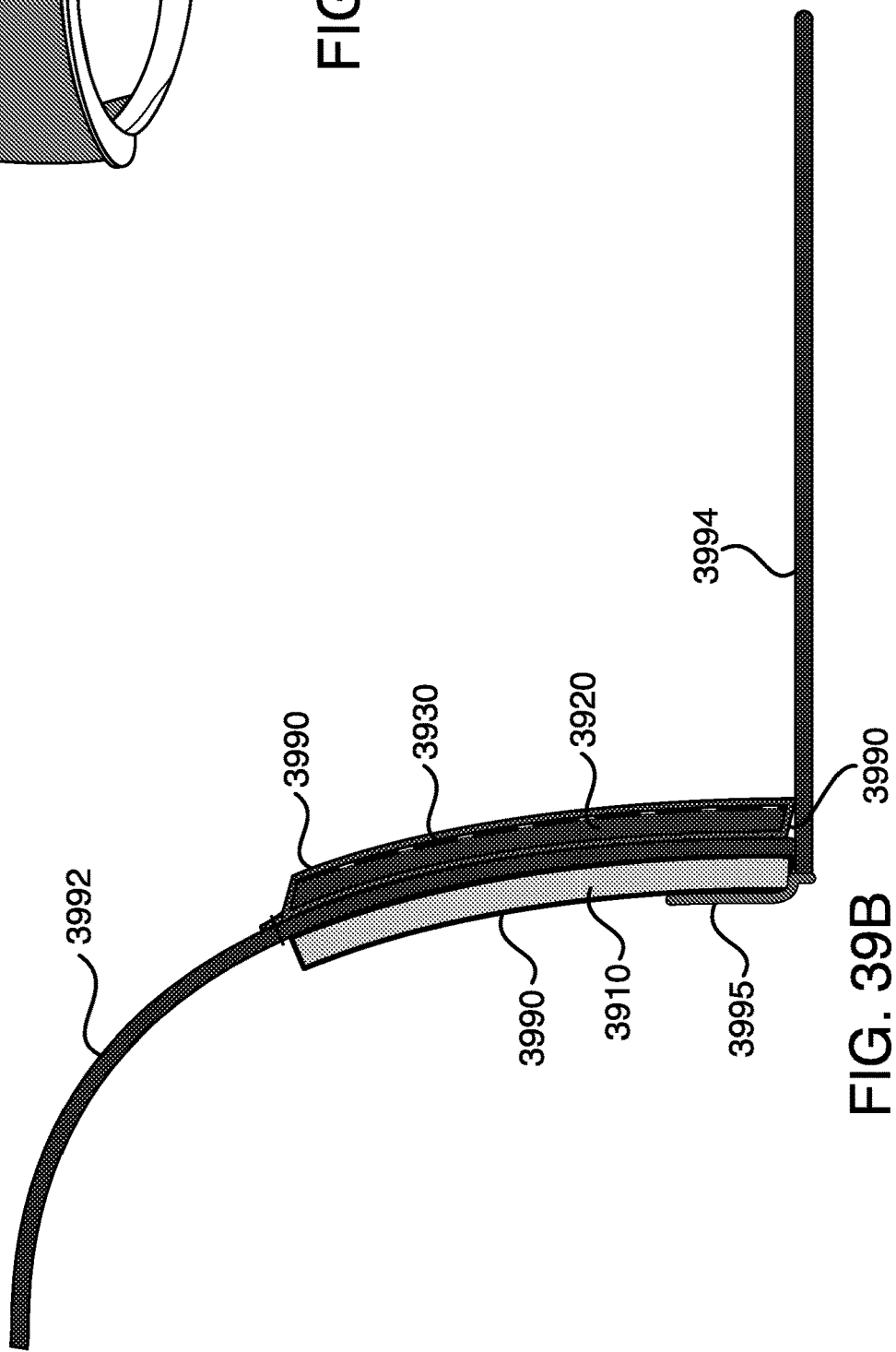
FIG. 39A
FIG. 39B

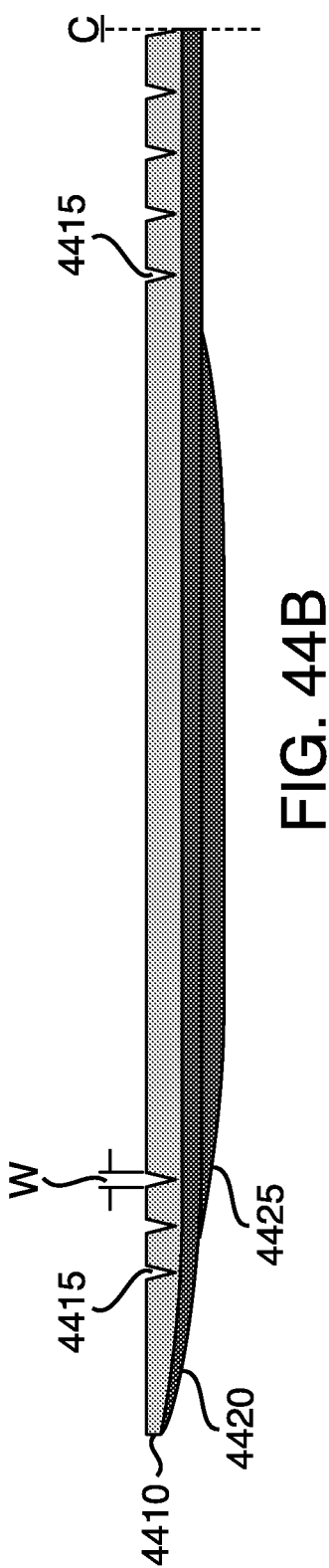
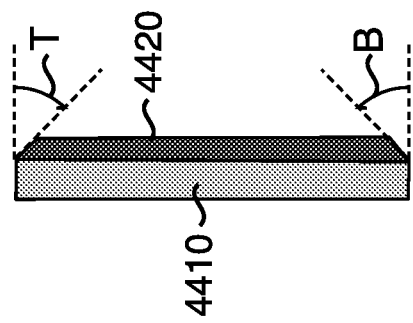
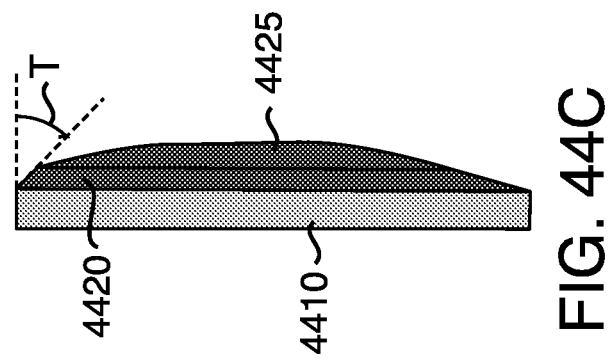
FIG. 44B
FIG. 44D
FIG. 44C

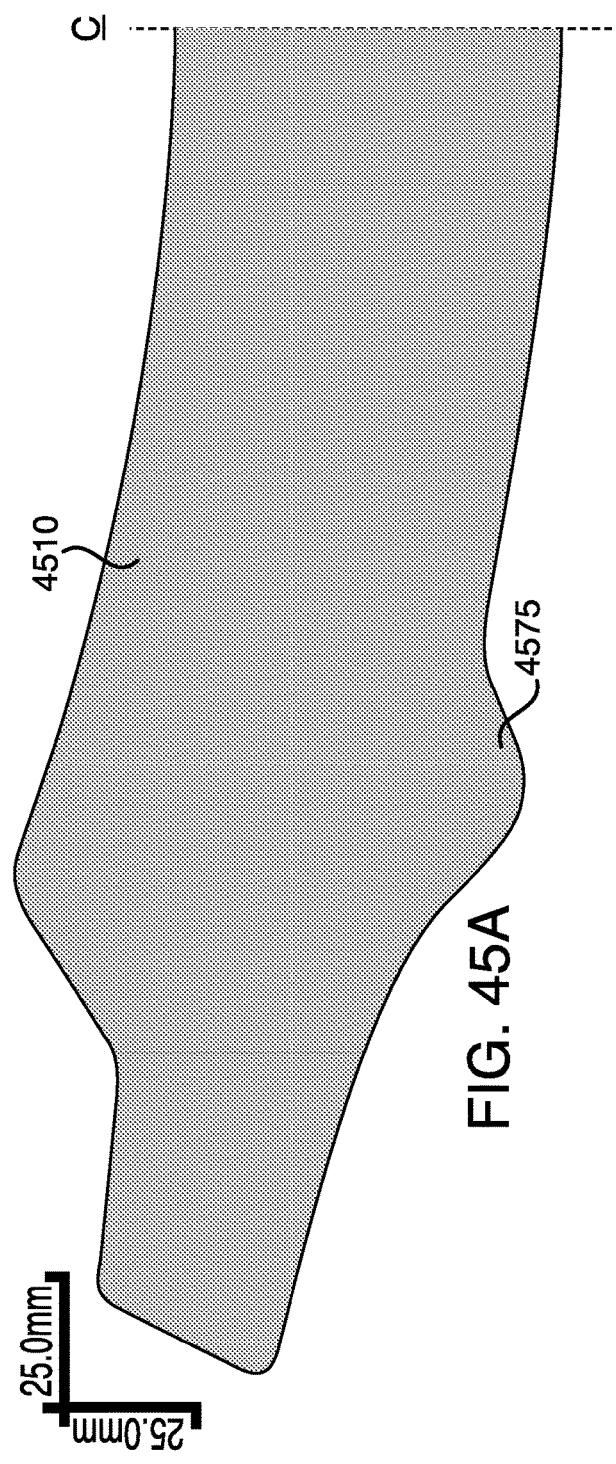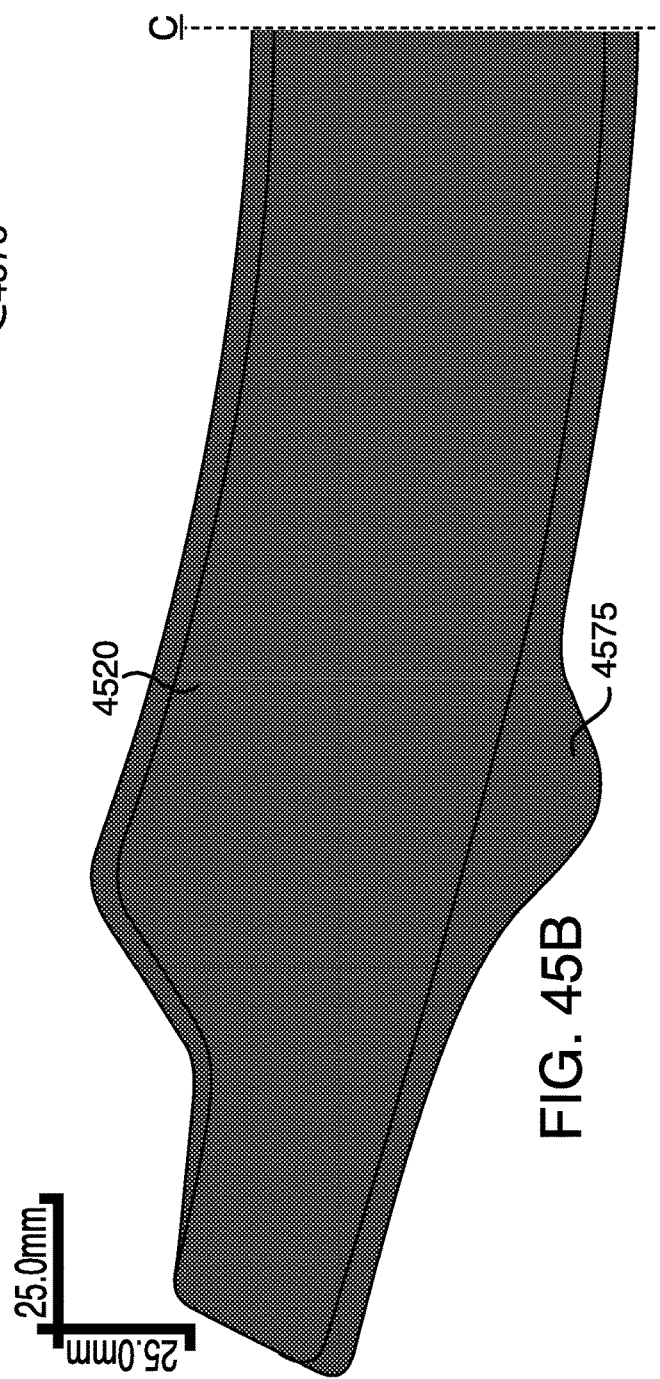
FIG. 45A
FIG. 45B

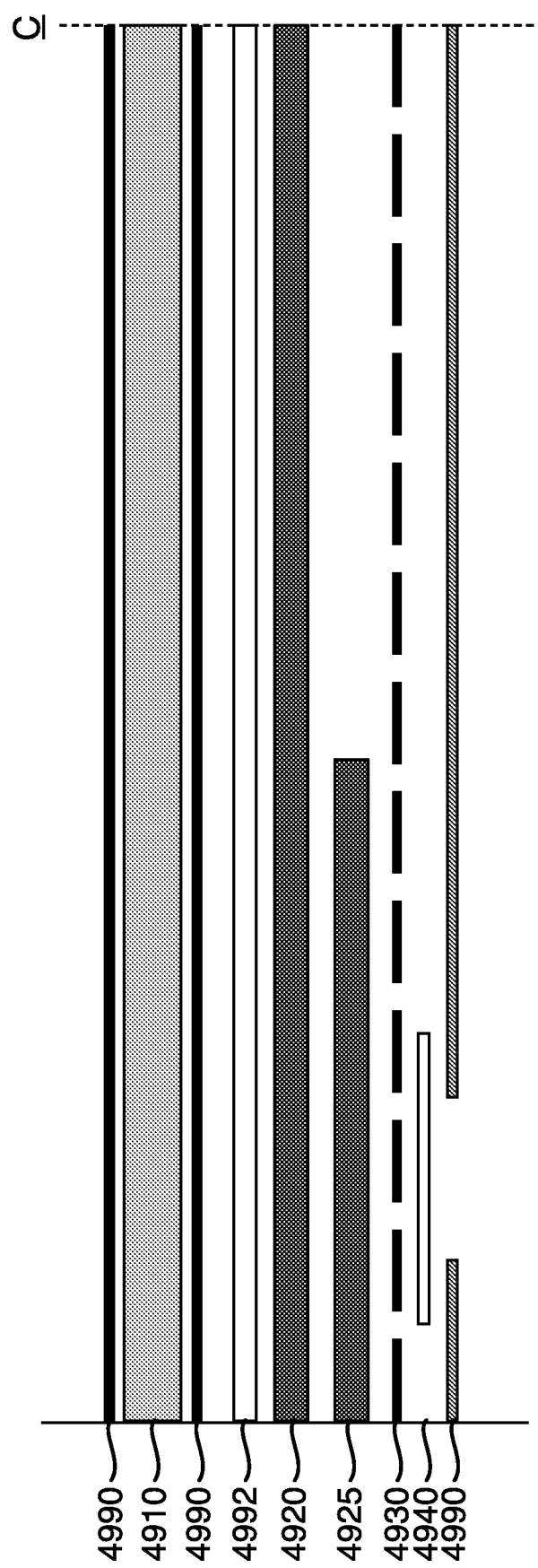

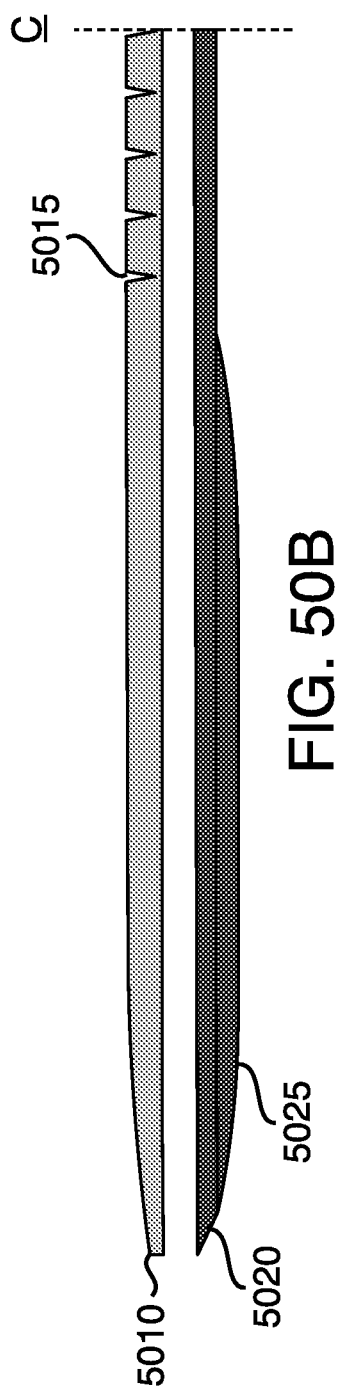
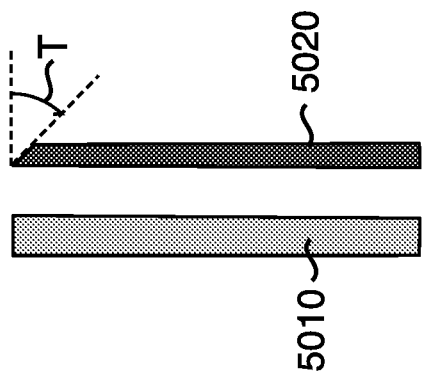
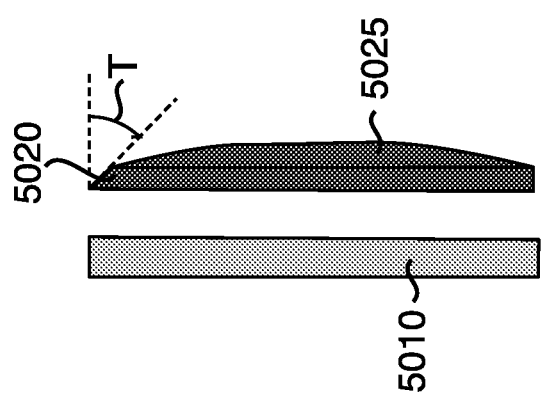
FIG. 50B
FIG. 50D
FIG. 50C

IMPACT PROTECTION SYSTEMS

This international application claims the benefit of provisional patent application Ser. No. 61/907,738, filed Nov. 22, 2013, entitled "Impact Protection Systems," the entire disclosure of which is incorporated here by reference.

FIELD OF THE INVENTIONS

The inventions generally relate to a body impact protection system of protective devices, such as those useful in affording protection against blows or impacts.

BACKGROUND

According to a 2011 report of the American Association of Neurological Surgeons (AANS), the leading cause of death from sports-related injuries is traumatic brain injury. Sports and recreational activities contribute to about 21 percent of all traumatic brain injuries among American children and adolescents.

A traumatic brain injury (TBI) is defined as a blow or jolt to the head, or a penetrating head injury that disrupts the normal function of the brain. TBI can result when the head suddenly and violently hits an object, or when an object pierces the skull and enters brain tissue. Symptoms of a TBI can be mild, moderate or severe, depending on the extent of damage to the brain. Mild cases may result in a brief change in mental state or consciousness, while severe cases may result in extended periods of unconsciousness, coma, or even death.

The U.S. Consumer Product Safety Commission (CPSC) tracks product-related injuries through its National Electronic Injury Surveillance System (NEISS). According to an AANS study utilizing CPSC data, there were an estimated 446,788 sports-related head injuries treated at U.S. hospital emergency rooms in 2009. This number represents an increase of nearly 95,000 sports-related injuries from the prior year. All of the 20 sports noted below posted increases in the number of injuries treated in 2009, except for trampolines, which posted 52 fewer injuries in 2009. Sports that exhibited substantial increases from 2008 to 2009 included baseball and softball (26,964 to 38,394), basketball (27,583 to 34,692), water sports (11,239 to 28,716), and cycling (70,802 to 85,389).

The actual incidence of head injuries may potentially be much higher for two primary reasons: (1) in the 2009 report, the CPSC excluded estimates for product categories that yielded 1,200 injuries or less, those that had very small sample counts and those that were limited to a small geographic area of the country; and (2) many less severe head injuries are treated at physician's offices or immediate care centers, or are self-treated.

Included in these statistics are not only the sports/recreational activities, but the equipment and apparel used in these activities. For example, swimming-related injuries include the activity as well as diving boards, equipment, flotation devices, pools, and water slides. According to the 2011 AANS report, the following 20 sports/recreational activities represent the categories contributing to the highest number of estimated head injuries treated in U.S. hospital emergency rooms in 2009:

Baseball and Softball: 38,394; Cycling: 85,389; Football: 46,948; Basketball: 34,692; Water Sports (Diving, Scuba Diving, Surfing, Swimming, Water Polo, Water Skiing, Water Tubing): 28,716; Powered Recreational Vehicles (ATVs, Dune Buggies, Go-Carts, Mini bikes, Off-road): 26,606; Soccer: 24,184; Skateboards/Scooters: 23,114; Fitness/Exercise/Health Club: 18,012; Winter Sports (Skiing, Sledding, Snowboarding, Snowmobiling): 16,948; Horseback Riding: 14,466; Gymnastics/Dance/Cheerleading: 10,223; Golf: 10,035; Hockey: 8,145; Other Ball Sports and Balls, Unspecified: 6,883; Trampolines: 5,919; Rugby/Lacrosse: 5,794; Roller and Inline Skating: 3,320; and Ice Skating: 4,608.

The top 10 sports-related head-injury categories among children ages 14 and younger include: Baseball and Softball: 18,246; Skateboards/Scooters: 14,783; Cycling: 40,272; Basketball: 14,952; Soccer: 8,392; Water Sports: 12,843; Football: 21,878; Powered Recreational Vehicles: 6,818; Winter Sports: 6,750; and Trampolines: 5,025.

A major part of the problem is that the head-protection gear that is currently commercially available for various sports is merely somewhat sufficient to provide adequate protection to the sports player or enthusiast and not necessarily comfortable. For example, in Baseball and Softball, there is a void in head protection gear that is available in the form of a comfortable cap, i.e., not a helmet. Some sporting activities, such as soccer, girls' lacrosse, field hockey, and ice skating generally, do not even employ or have available any protective head gear. Finally, head protection devices that may be currently available are often cumbersome, uncomfortable, reduce visibility, and/or unsightly, leaving many sports players and enthusiasts to prefer forgoing wearing such protective devices.

The same can be said for body protection that is currently available for many sporting activities. For example, children playing baseball, softball, and lacrosse can be hit by a ball which can cause severe injuries. Sadly, children have died from being hit in the chest by softballs, baseballs, and lacrosse balls. There are also many injuries to various body parts that routinely occur from falling or from collisions with other players. Unfortunately, there are insufficient body armor or protection options available that are comfortable and which do not inhibit a person's ability to play as competitively as they would like to play.

Another result of such injuries is an increase in lawsuits related to accidental sports injuries. Sports insurance is available to help protect against liability for sports injuries, but is another cost that can prevent teams from being formed especially in economically disadvantaged areas. Additionally, the downtime from a sporting injury can be catastrophic if one does not have disability insurance that covers sports related injury, and some health insurance plans limit payments for rehabilitation.

Therefore, there is a need for a body protection system and devices that not only protect a person or item from bodily harm, but also allows the person sufficient movement, visibility, and comfort.

BRIEF SUMMARY OF THE INVENTIONS

The deficiencies of the prior art, namely the injuries sustained using current protection are substantially overcome in consideration of the invention disclosed here. More specifically, additional innovation and advantages are realized when configuring the protection systems.

One object of the invention relates to a protection system, comprising: at least one interconnected mesh plate element network; and at least one liner, where the interconnected mesh plate element network overlaps the liner.

Another object is directed to a baseball cap, comprising: a) a temple or side protection system, comprising: two overlapping interconnected mesh plate element networks laying exterior to one liner; and b) a forehead protection system, comprising: one interconnected mesh plate element network laying exterior to two overlapping liners, wherein the temple protection system lays exterior to the forehead protection system at each of the temple regions of the baseball cap.

A further object of the invention relates to a glove, comprising: a hand protection system, comprising: at least one interconnected mesh plate element network laying exterior to at least one liner, where the hand protection system covers the back of the hand. The glove may further comprise a finger protection system, comprising: at least one interconnected mesh plate element network where each plate element covers each phalange of the finger, and optionally, further comprises at least one liner where the interconnected mesh plate element network overlaps or lays exterior to the liner. The glove may further comprise a wrist protection system, comprising: at least one interconnected mesh plate element network laying exterior to at least one liner, where the wrist protection system covers that back and/or sides of the wrist.

Yet another object relates to a protective garment, comprising: a base layer protection system, comprising: at least one interconnected mesh plate element network laying exterior to at least one liner, wherein the base layer protection system is in fabric of the protective garment.

A further object relates to a head impact protection system that may have over-hat, exterior hat-incorporated, integrated, or in-hat designs, where at least one vinyl nitrile foam or shock absorbing composite material may be combined with a plate element layer on the exterior side closest to the area of first impact.

These and other features, aspects and advantages of the present invention will become better understood with reference to the following drawings, description, and claims.

BRIEF DESCRIPTION OF THE SEVERAL VIEWS OF THE DRAWINGS

FIGS. 15A-15F illustrate the construction details of the over-hat head protection system of FIG. 13.

FIGS. 16A-16D illustrate the liner or foam details of the over-hat head protection system of FIG. 13.

FIGS. 17A-17C illustrate the liner or foam patterns for the over-hat head protection system of FIG. 13.

FIGS. 18A-18C illustrate an over-hat head protection system designed to have one mesh window on each side connected by an elastic band at the back, with a front view (A), a side view (B), and a cross-section view (C).

FIGS. 20A-20C illustrate an over-hat head protection system designed to have multiple mesh windows on each side, portions of the back section, and a portion of the forehead section, connected by an elastic band at the back, with a front view (A), a side view (B), and a back view (C).

FIGS. 21A-21C illustrate an over-hat head protection system designed to have one mesh window on each side and raised slats, wings, or the like, preferably made of hot melt film positioned on the mesh windows in a parallel fashion, where the sides are connected by an elastic band at the back, with a front view (A), a side view (B), and a back view (C).

FIGS. 22A-22C illustrate an over-hat head protection system designed to have multiple mesh windows with chamfer channels in between each windowed section, thereby providing a boxy appearance, and where the sides are connected by an elastic band at the back, with a front view (A), a side view (B), and a back view (C).

FIGS. 23A-23C illustrate an over-hat head protection system designed to have mesh windows throughout the system, except for the back connector, which may be an elastic band, with a front view (A), a side view (B), and a back view (C).

FIGS. 25A-25C illustrate an over-hat head protection system designed to have mesh windows throughout the system, except for the back connector, which may be an elastic band or material with a buckle or combination, where the elastic band or material makes up the innermost layer closest to the hat, with a front view (A), a side view (B), and a back view (C).

FIGS. 26A-26C illustrate an over-hat head protection system designed to temporarily attach to the user's head and hat through elastic webbing, where the elastic band extends from the front of the head protection system over the top or crown area and connects the sides from the front and sides to the back section at two points (i.e., the top and the lower sections of the sides), where the elastic webbing may be attached by sewing, gluing, or other attachment., with a front view (A), a side view (B), and a back view (C).

FIGS. 27A-27C illustrate an over-hat head protection system designed to temporarily attach to the user's head and hat through elastic webbing and a hook-and-loop fastener connector, where the elastic band extends from two points of the sides areas which cover the user's ear and sideburn areas, to a single elastic band on the lower back of the user's head area, while the head protection system extends from the front to the sides and almost the entire back of head area, except for a hook-and-loop fastener connector on the upper back of the user's head area, where the elastic webbing and hook/loop connector may be attached by sewing, gluing, or other attachment?, with a front view (A), a side view (B), and a back view (C).

FIGS. 28A-28C illustrate an over-hat head protection system designed to temporarily attach to a user's head and hat through elastic webbing, where the elastic webbing connects all of the sections of the head protection system, preferably sewn together, with sufficient gaps in between the sections such that the system fits over the user's head and hat and fits comfortably around the head, with a front view (A), a side view (B), and a back view (C). This embodiment covers a significant portion of the forehead, sides, including temple, sideburn, and ear areas, and back of the head, where the ear areas have an opening in the layers, except for the elastic webbing, to allow the user to hear without interference.

FIGS. 29A-29C illustrate an over-hat head protection system designed to temporarily attach to a user's head and hat by encircling the forehead, sides, and back of the head connected by a hook-and-loop fastener connector attached to the outermost layer (i.e., the mesh layer, with a front view (A), a side view (B), and an expanded view (C). This embodiment covers a significant portion of the forehead, sides, including temples and sideburns, and back of the head, where chamfers strategically placed allow the over-hat head protection system to lay flat.

FIGS. 30A-30B illustrate an exterior hat-incorporated head protection system designed on the exterior of a user's hat, covering the forehead and sides of the head, where the layers of the head protection system are sewn onto the exterior of the hat by a stitch and turn seam along the top edge of the forehead section and a top stich around the curved section at the back of the sides, with a front view (A) and a side view (B).

FIGS. 31A-31C illustrate an exterior hat-incorporated head protection system designed on the exterior of a user's hat, covering the forehead and sides of the head, where the layers of the head protection system are sewn onto the exterior of the hat by top stitching around the perimeter that contacts the hat. A front view (A), a side view (B), and a cross section view of a liner with siping (C) illustrate the construction of the exterior hat-incorporated head protection system.

FIGS. 32A-32D illustrate an integrated hat head protection system designed on the interior of a user's hat, covering the forehead and sides of the head, where the layers of the head protection system are integrated into the hat such that the hat textile covers all of the layers of the head protection system. A front view (A), a side view (B), an interior view of the hat showing a mesh layer covering a plate element that spans with liner(s) underneath (C), and a detailed view of the sideburn interior (D) illustrate the construction of the integrated hat head protection system.

FIGS. 36A-36C illustrate the construction details of the in-hat head protection system of FIG. 34.

FIGS. 37A-37D illustrate the liner or foam details of the in-hat head protection system of FIG. 34.

FIGS. 39A-39B illustrate the construction of the in-hat head protection system of FIG. 34.

FIGS. 44A-44D illustrate the liner or foam details of the over-hat head protection system of FIG. 41.

FIGS. 45A-45C illustrate the liner or foam patterns for the over-hat head protection system of FIG. 41.

FIGS. 49A-49C illustrate the construction details of the in-hat head protection system of FIG. 47.

FIGS. 50A-50D illustrate the liner or foam details of the in-hat head protection system of FIG. 47.

FIGS. 52A-52B illustrate the construction of an in-hat head protection system of FIG. 47.

DETAILED DESCRIPTION OF THE INVENTIONS

Figure 1:
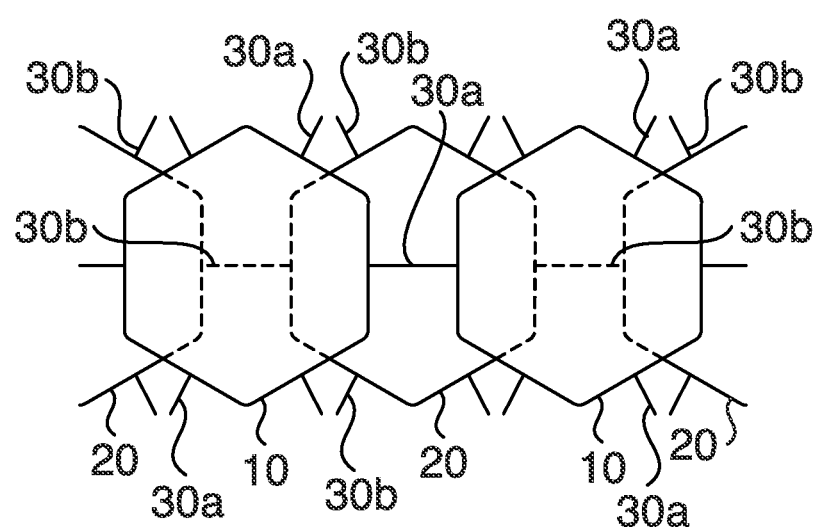
FIG. 1 illustrates two overlapping lines of two separate sheets of interconnected plate elements.

The present inventions provide body protection systems and devices that can be used to prevent or limit serious injuries from impacts or collisions during an activity. More particularly, the present inventions provide body protection systems and devices that can be incorporated into articles of clothing, or which can be incorporated into materials or articles, such as seats or linings, or into elements such as walls of vehicles to reduce the effect of impact. The preferred body protection systems and devices may be incorporated into or form part of headgear, gear, or clothing, designed to cover and protect one or more parts of a person, such as a military individual, a law enforcement individual (e.g., police officer), or athlete—professional or recreational. Thus, the body protection systems and devices may be used to protect or cover an individual's head, shoulder, arm (upper arm, forearm, elbow, and/or hand), ribcage and chest areas, back, sides, stomach, hips, and legs (thigh, calf, shins, ankle, and feet).

Plate Elements:

Plates or plate elements, used interchangeably here, may be used in protection systems and devices as described here. The plates may be separately used for protecting a small area or interconnected with other plates in order to cover and protect a larger area. A preferred embodiment is directed to an interconnected meshed or latticed plate system, and more preferably an interconnected mesh plate system in the form of a sheet, where the plate system comprises a hard plastic material or any injection moldable material, where the interconnected meshed plate network may preferably be made by injection molding with the selected material. Depending on the application and how much impact protection may be needed, the material of the plate elements may vary, even within the same protection system, device, or gear. Non-limiting examples of plate element materials include: thermoplastics, thermosets, polyurethanes, epoxy resins, phenolic resins, polyesters, polypropylene, polyethylene, low-density polyethylene, high-density polyethylene, polyvinyl chloride, acrylonitrile butadiene styrene, styrene, acrylic, fluoroplastics, nylon, acetal, polycarbonate, polyimide, polyamide-imide, polyphenylene sulfide, polyarylates, polyethylene terephthalate, polybutylene, terephthalate, polyether ether ketone, polysulfone, polyether sulfone, polyetherimide, or polyphenylene oxide, and combinations and blends thereof. The plate element materials may be made of substances that are designed or selected to withstand high or medium impacts; have high, medium, or low densities; varying hardness; and tensile strengths. However, the main commonality among the various types of plastics or polymers that may be useful in affording protection is that they may be moldable to form the plate elements and sheets of meshed plate elements.

The shape of the element may be selected from a variety of shapes, such as but not limited to, circular, oval, square, rectangular, triangular, trapezoidal, pentagonal, hexagonal, octagonal, and the like. Preferably, the elements are in the shape of hexagons, and more preferably an entire interconnected meshed plate element sheet has a plurality of plate elements each in the shape of a hexagon. In another embodiment, differently shaped plates may be interconnected in a meshed network. However, the shape of the elements may depend on the particular site for protection and the efficiency for deflecting or distributing the impact of blows. The elements may have a particular shape or varied shapes throughout a network of interconnected meshed plate elements that is essentially in the form of a sheet.

The sizes of the individual plates will depend upon the particular application for which they are to be employed. In a preferred embodiment, the plate sizes within the same interconnected meshed plate network have the same size. However, another aspect may be directed to different plate sizes employed in the same meshed plate element network. For example, a plate of one size may alternate with another plate of a different size in a network or sheet of interconnected meshed plates. Alternatively, one section of a sheet of interconnected meshed plate elements may have the same plate size and another section of the sheet may have plates of a different size. A further embodiment relates to a protection system that has multiple overlapping sheets of interconnected meshed plate networks, where each sheet has a different plate element size. Moreover, multiple plates may have a multitude of different sizes even in the same system or network depending on the surface area to cover and the amount of protection needed.

Preferably, the plates will all be of the same size in a particular meshed plate arrangement. The size of the plate elements may depend on the application, surface area for protection, and/or particular location. However, the size of the plates are preferably sufficient to afford optimal protection and/or disperse energy from an impact. The plate may have a width across the face of the plate, for example in the horizontal (x-axis) plane, of greater than about 0.25 inch (or about 0.635 cm) and less than about 2.5 inches (or about 6.35 cm). More particularly, a plate may range in size from about 0.25 inch to about 2.5 inches, from about 0.25 inch to about 1.0 inch (or about 2.54 cm), preferably from about 0.4 inch (or about 1.016 cm) to about 0.6 inch (or about 1.524 cm), and most preferably about 0.5 inch (or about 1.27 cm). The plates of any particular meshed sheet will preferably have approximately the same thickness, but alternatively, the plates of any particular sheet may have different thicknesses depending on the application for which they are to be employed and on the area of protection.

The thickness of a plate, i.e., the vertical (y-axis) plane may be greater than 0.07 inch (±0.001 inch) (or about 0.1778 inch±about 0.00254 cm) and less than 0.074 inch±0.001 inch) (or about 0.18796 cm±about 0.00254 cm). In a preferred embodiment, the thickness of a plate may range from about 0.07 inch (+/−0.001) to about 0.074 inch (+/−0.001), and preferably have a thickness of about 0.072 inch (or about 0.18288 cm±about 0.00254 cm).

The tensile strength at yield refers to tenacity and is not related to elasticity. Using ASTM method, D-638, a preferred method for measuring tensile strength at yield of the plate element materials, the preferred range may be from about 3050 PSI to about 4100 PSI, preferably from about 3200 PSI to about 4100 PSI, and in another embodiment 3500 PSI. If a high density polyethylene (HDPE having a density ranging from about 0.95 g/cm$^3$ to about 1.27 g/cm$^3$; elongation percent of about 2.5%; and tensile strength ranging from about 20 MPa to about 80 MPa) and a low density polyethylene (LDPE) copolymer blend are used as the material for the interconnected meshed plate network, a preferred blend may be about 50% and about 50%. However, other blend percentages may also be useful depending on the particular application, including but not limited to about 10%/about 90%, about 20%/about 80%, about 30%/about 70%, about 40%/about 60%, and vice versa.

In another embodiment, the interconnected meshed plate networks may be selected by their elongation percentage, which is the percentage change in length. Elongation at break is related to elasticity as it refers to total deformation before failure of the material, while elongation at yield only marks the deformation before it becomes non-recoverable or permanently set. For example, the plate elements may have an elongation percentage, also measured by D-638, ranging from about 10% to about 550%, preferably at about 12% to about 79%, and in other embodiments about 450%.

Bridges or Bridge-Like Features

A preferred network of meshed plate elements may be interconnected with bridges or bridge-like features (e.g., bonds), used interchangeably here, connecting one plate to another and which are bendable or flexible in response to an applied force. The number of bridges will depend on the shape of the plate element. For example, if the plate is in the shape of a hexagon, then a bridge may extend from each of the six sides; whereas, if the shape is a triangle, then only three bridges extending from each of the three sides could be employed. Alternatively, if the application warrants a string of only one row of plates, and the plates are in the shape of a hexagon, then only one bridge connecting two plates may be employed. A preferred network of meshed plates may comprise of one plate interconnected with another plate by at least one bridge, where the interconnections are allow for rotational movement of one plate relative to the other plate. The bridges allow for movement and the distribution of impact forces.

In a preferred embodiment, the bridge is made of the same material as the plate, and may be formed when the plate elements are formed. For example, if a polypropylene copolymer is melted and poured into a mold of plates interconnected to other plates via bridges, the same polymer would form the interconnected meshed plate network, including the bridges. Alternatively, the bridges may be created by cutting, shaping, etching, or machining the plate elements from a single sheet of material. However, with regard to the bridge-like features, if in an embodiment that utilizes individual plates, the fabric or material of the body protection device or gear may act as a bridge. For example, each plate element may be compartmentalized in a pouch and the fabric that holds the pouch extends over an area to another pouch containing another plate element. The fabric that connects the two plate elements acts as a bridge and may be referred to as a bridge-like feature that connects plate elements.

The bridges or bridge-like features that connect plate elements may be proportionately sized to the plate elements. For example, the bridge is preferably of a length ranging from about 0.04 inch (or about 0.1016 cm) to about 0.11 inch (or about 0.2794 cm), and more preferably from about 0.05 inch (or about 0.127 cm) to about 0.11 inch. The distance between plate elements will preferably be sufficient to safely and efficiently deflect or distribute the force of any impact or blow. The thickness of the bridges is preferably the same thickness as the plate elements. In the preferred hexagonal embodiment, the diameter of the hexagon may be preferably about 0.610 inch (or about 1.5494 cm), the distance from the center of one plate element connected to that of an adjacent plate element may be about 0.72, and the approximate angles of preferred interconnected hexagonal plate elements may be in increments of about 60°, where an angle of about 180° represents plate elements directly in a row.

In order to provide adequate to superior protection, multiple sheets of interconnected meshed plate elements may be employed together. The individual sheets may be made of similarly or differently shaped and sized interconnected mesh plates. The sheets may be layered one on top of the other such that each plate is exactly aligned on top of or beneath each plate of the other sheet. This overlapping arrangement (e.g., one sheet of meshed plate elements on top of another in the y-axis direction) may also be offset or staggered such that each plate element is not exactly on top of or beneath the plate of a different sheet. The meshed network of plates that are interconnected have spaces between the plate elements. When layers of these sheets are organized in a staggered overlapping arrangement, the spaces of one sheet of plate elements may be covered by the plate elements of another sheet. One of skill in the art would be knowledgeable in selecting the appropriate shape and size (i.e., width and thickness) and configuration for a particular protection system.

In another embodiment, the plates may have a convex exterior portion that covers the entirety of or a portion of the surface area of the plate. The shape of the exterior portion may essentially be a bubble, convex shape, or sphere on one or both sides of the plate (i.e., extending in the vertical (y-axis) on the horizontal (x-axis) of the plate). The bubble may generally be of a circular or oval shape so that the plates are round or ovoid, or appear as half of a circle or half of an oval. Regardless of the shape of the plate element, the convex exterior portion may cover the entire surface of the plate or only a portion. For example, the circular shape would have a radial distance upwards and horizontally in the plane of the plate that are equidistant; whereas, the oval would have a radial distance upwards that is less than the radius in the horizontal plane of the plate. In another aspect, the sphere may take the shape of the plate, covering the entirety or portion of the horizontal surface area of the plate and extend upwards and/or downwards, i.e., on one or both sides of the plate.

A further embodiment relates to the bubble portion being part of the plate or a separate portion that is attached. For example, the bubble portion, whether it is on one or both sides of the plate element, may be made simultaneously as the plate element, for example, when molded. However, in another embodiment, the plate element and the bubble portion or portions may be formed separately and then attached to each other, by melding them under high temperature, gluing or adhering them together, or in any other similar fashion. The bubbles may be solid or hollow; however, in a preferred aspect, the bubbles are hollow. Without being bound by theory, the bubbles may provide additional protection by further cushioning the impact of an external force upon the user or wearer of the body protection. When the bubble is hollow, it essentially forms an air chamber, which when compared to vinyl nitrile, was found to attenuate energy more effectively throughout a wider range of drop heights and impact masses. (G. Gimbel et al, "A comparison between vinyl nitrile foam and new air chamber technology on attenuating impact energy," *Int J Sports Sci Eng,* 2(3): 154-161, 2008).

Although the plate elements, either alone or interconnected with other plate elements in a mesh network, may be used for protection, a further embodiment may be directed to the use of the plates as a form of decoration in conjunction with functional plate elements or separately. The plates may be designed to have light-emitting or illumination elements, such as, for example, light-emitting diodes (LED) or be of different colors and patterns that are not illuminated. The plate elements either alone or in combination with other plates may result in a particular color scheme or picture, such as a logo or mascot, and may be illuminated or not illuminated, or even with the option of being illuminated when desired.

Liner Elements

Another aspect of the protection system is directed to liners or liner elements. The liner, which may be a foam or foam-like material, may be used to lessen the force or impact of a blow, as well as, or in conjunction with providing comfort to the user or wearer of the protective gear as the liner provides a cushion. The liner may also preferably conform to a user's body part. For example, the liners may be constructed to have flexibility and bendability around curvatures of the body and hinge-like body parts, i.e., e.g., elbows, knees, and fingers. They are known to be virtually indestructible while providing excellent cushioning, shock absorbing, and vibration dampening properties. Moreover, the liner should be easily manipulated into a desired shape, which is beneficial for fitting in protective systems of varying shapes and sizes.

The liner materials that afford the desired characteristics and provide high impact protection in the impact protection systems described here may be selected from the non-limiting examples of liner materials that include: thermoplastic elastomers, natural rubber, polyisoprene, styrene butadiene rubber, chloroprene rubber, polybutadiene, nitrile rubber, butyl rubber, chlorosulfonated polyethylene, polysulfide rubber, silicone rubber, polyurethane, and closed or open-cell neoprene or foam. Vinyl nitrile foams may be the preferred material for the liners because they provide not only good durability, but also exhibit firm support and a low-density construction. A more preferable liner may be composed of a blend of acrylonitrile butadiene rubber and polyvinyl chloride (NBR/PVC), and most preferably, the liners are made of closed cell foam.

In one embodiment, at least one liner may be used in a protection system. However, where additional protection may be desired, another embodiment may be directed to the use of multiple layers of liners, such as for example, two liners or three liners. Each liner may be made of the same material or may be made of different materials. The preferred material for the liners is vinyl nitrile. However, within the vinyl nitrile category of foams, there are differing properties that may be more useful than others depending on the application or the amount of protection needed.

Each liner layer may comprise of the same type of vinyl nitrile foam or may differ. For example, the densities of various vinyl nitriles may range from about 0.090 g/cm$^3$ to about 0.26 g/cm$^3$, where liners may have preferable densities ranging from about 0.12 g/cm$^3$ to about 0.14 g/cm$^3$, about 0.16 g/cm$^3$ to about 0.22 g/cm$^3$, and about 0.19 g/cm$^3$ to about 0.26 g/cm$^3$.

Moreover, the thickness of the liner may range be about 0.125 inch (i.e., ⅛ inch; or about 0.3175 cm), about 0.25 inch (i.e., ¼ inch or about 0.635), or about 0.375 inch (i.e., ⅜ inch or about 0.9525 cm). When using more than one liner in the protection system, the liners may have the same thickness or vary in thickness. Essentially, various combinations of vinyl nitrile foam types and thicknesses may be used depending on the desired application, impact force distribution, and comfort level.

Tensile strength is the maximum stress that a material can withstand while being stretched or pulled before failing or breaking as measured in pounds per square inch (PSI) units, The tensile strength at yield is the tensile stress level at which the rise in the stress-strain curve equals zero for the first time. In one embodiment, the tensile strength of the vinyl nitrile liner may range from about 112 PSI to about 370 PSI, preferably from about 168 PSI to about 370 PSI, in another preferred embodiment from about 227 PSI to about 238 PSI, and in another embodiment 140 PSI. Various combinations of liners having differing tensile strengths are also contemplated.

In another embodiment, the preferred vinyl nitrile liners may be selected by their elongation percentage. For example, the liners may have a minimum elongation percentage ranging from about 120% to about 180%, preferably at about 150% to about 180%, and in other embodiments about 160%.

A further embodiment relates to the compression deflection where a compressive load is applied to certain materials, such as the liners, and the liner material is deformed but the volume of the material remains constant measured at 25% and/or 50%. The liners that are useful in the protection systems described here may have a minimum compression deflection at 25% ranging from about 3 PSI to about 25 PSI, preferably 8.5 PSI to about 25 PSI, and may also include preferable compression deflection of about 12 PSI to about 15 PSI. At a compression deflection at 50%, the liners may have a minimum compression deflection ranging from about 19 PSI to about 28 PSI. The useful liners may have sufficient tensile strength, elongation percentages, and compression deflection sufficient to protect the user or wearer of a protection system described here. At least one liner may be used to provide protection and comfort; however, preferably there will be a combination of liners stacked one upon the other, or non-continuously stacked, where plate elements may alternate with the liners. In a preferred embodiment, the protection system will have at least two overlapping liners, and a more preferred embodiment, the liners will have at least two overlapping liners with another liner in the protection system, not necessarily directly in contact with the other liners.

The liners may generally form the shape of the protective layers of the overall area that the impact protection system protects, including, for example, a head impact protection system—over-hat, integrated, and in-hat—comprising any one of or combinations of forehead protection, sideburn protection, ear protection, under the bill hooks, slopes, and similar curvatures. Preferably, the base liner closest to the hat and the adjacent liner have the same overall shape of the impact protection system, such as forehead and side areas of a head protection system. The additional liner at the sides and temple areas may conform to the shape of the other liners in those locations, or may preferably be in another shape, such as for example, a trapezoid, a hexagon, an octagon, a parallelogram, a square, a rectangle, a triangle, a diamond, an oval, a circle, partial portions of any of these shapes, or combinations thereof, with or without one or more curved corners.

Another embodiment may be directed to a foam liner closest to the plate element that has a guideline for the shape and placement of the plate element. The guideline may be, for example, a slight depression in the liner that fits the plate element and optional mesh layer. Although the shape of the liner, plate element, or guideline may vary, preferable non-limiting shapes may include trapezoids, parallelograms, squares, rectangles, triangles, diamonds, ovals, circles, and partial portions of any shape sufficient to cover the particular areas that make up the impact protection system, such as for example, the forehead and side portions, including temple, sideburn, and ear areas of a head impact protection system. Preferably, the guideline may have a depression of at least the thickness of the plate element, and if the mesh is present, then the thickness of both the plate element and the mesh combined. Alternatively, the liner may not have a depressed guideline, and rather have an outline indicating the edges of the liner itself, or the liner may not have a guideline at all except for the edges of the liner itself. An exterior material may hold all of the layers, i.e., combinations of liners, plate elements, etc., in place where indicated by the guideline.

Since impact protection systems must fit around curves that make up areas in need of protection, the layers of the system must conform to a body part that is curved or bends and the system needs to be designed to allow sufficient conformation and bendability. For example, in head impact protection systems, the head area that needs protection should bend sufficiently to comfortably fit around the circumference of the head and/or hat. In order to achieve these bends, "V" notch flex channels are preferably scored, siped, or manufactured on the liner closest to the curvatures of the head, i.e., the base closed cell liner 1 at each of the "corners" where the forehead meets the sides of the head and where the sides meet the back of the head. However, other liners may also be siped as necessary. The number of channels and their placement depend on the circumference of the hat. More notch flex channels allow for more bendability or flexibility; however, the number of channels must be balanced with the integrity of the impact protection because in those siped locations, there may be less impact protection. The locations of the channels essentially approximate where the "corners" of the head or hat are located, i.e., where the forehead meets the sides and where the back of the head meets the sides, or around the knees or elbows for other impact protection systems.

One of ordinary skill in the art in the design industry, particularly in the hat apparel construction, would understand how to make impact protective systems, such as those for head protection described here. Components that may vary depending on design that the skilled artisan would understand how to modify for achieving the desired level of impact protection include, for example, the number, the depth, and the placement of the "V" notch flex channels such that the head protection system comfortably and securely fits in or over a hat. In one embodiment, an over-hat head protection system preferably fits immediately adjacent to the exterior of the hat above the bill of the hat, along the sides and back of the hat, with as little of, or preferably without, a gap between the hat and the over-hat protection system. The "V" notch flex channels may be in the liners, preferably the base liner 1. The widest point of the "V" notch flex channel may be about 1/16-inch (i.e., 0.0625 inch or about 1.5875 mm) to about 1/4-inch (or about 6.35 mm), and preferably about 0.118 inch or about 3 mm in width. The height of the "V" notch flex channel may be almost the entire thickness of the liner to provide ample flexibility and bendability, i.e., less than about 3/8-inch. The distance between each of the "V" notch flex channels or siping may range from about 1/4-inch to about 5 inches, but the channels may be separated by up to about 13 inches in embodiments where there is only 1 channel on each side of the head impact protection system. The preferred siped channels may be perpendicular to the bottom edge of the head protection system or angled such that when the top edge forms a straight angle of 180°, the angles formed may be 270°, greater than or less than 270°, but no more than 360° or no less than 180°.

Another embodiment may be directed to the liners designed to have a sloping surface or chamfers at the top and/or bottom edges of the impact protection systems. One embodiment is directed to a head protection system where the top edge of a side or temple area where the liner closest to the head or base liner does not slope but the bottom edge is 90 degrees from the vertical side that wraps around the head. The sloping top edge of the liner adjacent to the base liner may have a top chamfer ranging from about 0 degrees to about 90 degrees, preferably about 45 degrees from the top. The bottom edge chamfer of the side portion may have an approximate angle of about 60 degrees from the bottom. Another embodiment directed to a forehead portion of a head protection system may have a top edge chamfer angle of about 45 degrees from the top and a bottom edge chamfer angle of about 150 degrees from the bottom. Chamfers are not a necessary design of the over-hat head protection system, but are preferable for design aesthetics or optics.

Impact protection system embodiments described here may have an additional mesh layer in order to showcase the underlying protective layers, i.e., plate element layer and other visible liners underneath, and also to advance breathability. A mesh layer is optional and most beneficial when mesh windows are in the particular impact protection system design. In embodiments that do not have a mesh window, the mesh layer may still be useful as a side of a pocket or pouch for holding the plate element or liner protective layers. Moreover, the mesh layer may also be the outermost or exterior layer, or in some embodiments replace a hot melt or thermoplastic film. Preferably, a mesh layer covers a plate element such that the mesh layer is adjacent to the plate element and on the exterior side of, for example, an over-hat head protection system.

The mesh layer covering the plate element of an impact protection system may preferably be a mono-mesh layer made of, for example, nylon, polyester, and the like, or blends. Although the mesh may have various characteristics, primarily for aesthetics and for breathability, a preferred mesh is a monofilament mesh made of non-limiting materials such as, steel, fabric, vinyl, fiberglass, plastic, polymers, nylon, including a woven nylon ripstop material, blends, or the like. Preferably the mesh is a 4-way stretch unified mesh material, which avoids or essentially avoids too much stretch or elongation in one-direction. The mesh may have a count per inch sufficient to maintain breathability and comfort for the wearer or user of the impact protection system, and optionally to allow the underlying layers, including plate element layer, to be seen. The mesh material may also be lightweight without unnecessary weight or bulk, to provide comfort to the person wearing the impact protection system. In one embodiment of the over-hat head protection system, the mesh layer may expand over the entire length and height of the system, or a portion of the system. In one embodiment, the mesh layer may be visually exposed at a portion of the forehead, particularly where the forehead abuts the sides or temple areas, and a portion of the back where the back joins the sides or temple areas of the over-hat head protection system that have mesh windows. Alternatively, the mesh layer may expand only the areas that are not covered by a hot melt film or textile, or the areas in the mesh window openings.

In order to maintain all of the layers together, a hot melt film may be applied to hold or enclose the multiple layers that form an impact protection system, such as for example, an over-hat head protection system. Preferably the hot melt film may be composed of a thermoplastic material, polyester, polyurethane, cotton, blends, combinations thereof, or the like. A preferred hot melt film may be tear- and rip-resistant. The hot melt film or thermoplastic film may encase the layers of the impact protection systems such that the layers remain in their designated positions, and the layers are not permanently affixed or adjoined, thereby allowing movement between each of the liners and plate element. The hot melt film may form a pouch or pocket that comprises one or more of the liners and the plate element layers. The material of the hot melt or thermoplastic film may be such that allows for screen-printing or die cut, such as, for example, for a logo, graphic, or a design.

A further embodiment may be directed to a liner substitute. A lightweight, flexible, high performing material that provides impact protection may replace one or more liners of the impact protection systems described here. For example, an impact protection system may comprise a plate element or an interconnected plate element network, and underneath, or interior to the plate element, an impact protective gel or composite material having high shock absorption and impact protection characteristics. The material may be a synthetic polymer or a polymer blend either alone, or in combination with other materials that supplement or advance impact protection of the polymer. Non-limiting examples of liner substitute materials may include elastomers, polyurethane, thermoplastic urethanes, silicones, siloxanes, silicas, transition metal oxides, organic polymers, non-Newtonian or shear thickening fluids, or other shock absorbing, impact protecting fluid, gel, or foam, blends and combinations thereof, or the like. Another embodiment may be directed to modification of the identified examples of liner substitute materials, where prior to forming the final liner substitute material, the material may be further cross-linked by an agent or a polymer, such as for example, polyisocyanates, epoxides, polystyrene. Furthermore, to assist the polymers to attach to the gel matrix, additional compounds may be combined, such as for example, 3-aminopropyltriethoxysilane (APTES). Another embodiment may be directed to polymer-cross-linked aerogels (X-aerogels) that are stiff and flexible, which allow them to stand up to large deflections in a three-point bend test. Typically, most gels may be cross-linked to make an x-aerogel, including for example, silica, alumina, resorcinol-formaldehyde polymer, and the lanthanide oxides.

In a preferred embodiment, the composite material may be a combination of a foam synthetic polymer, preferably closed cell foam, such as for example, an elastomeric matrix; a shear thickening polymer (preferably different from the elastomeric matrix) that may be dispersed throughout the matrix, and a fluid or gas also spread throughout the matrix, where the composite material is highly shock or impact absorbent and protective. The elastomeric matrix may preferably be a synthetic thermoplastic elastomer, such as for example, an elastomeric polyurethane. Silicone and ethylene propylene rubbers, including ethylene propylene diene monomer (M-class) rubbers, may also be used as the elastomeric matrix. The shear thickening polymer may be provided by the polymer itself or with the aid of other components, such as for example, plasticizers, extenders, or viscous fluids, and the like. A preferred shear thickening polymer may be a siloxane material, or more specifically, a borated siloxane material comprising polyborodimethylsiloxane.

The high impact protective, shock absorbing, and compressible gel or composite material may substitute or replace one or more liners, and may be attached to the impact protection system by enclosing the gel or composite material in a pocket, pouch, or bladder that would thereby serve as a liner substitute. In a similar fashion, the gel or composite material pocket may be adjacent to the plate element layer, where the plate element is on the exterior closest to an initial impact. Moreover, the gel or composite material pocket may substitute for one or more liners, and where one or more gel or composite material pockets may be utilized in any one of the embodiments described here.

Protection Systems:

Protection systems described here may comprise of various configurations of single or multiple sheets of plates and liners or minimally plates alone, where the plates may be individual or interconnected with other plates to form an interconnected mesh network of plates in the form of a sheet. In one embodiment, only plates are used to provide protection. For example, a single layer of plates embedded or compartmentalized in a fabric or protective gear may afford sufficient protection to the wearer in low impact applications. The compartmentalization in the form of pockets or pouches holding plates, liners, or combinations thereof, may also be useful in high impact applications.

Another embodiment may be directed to a single plate layer arranged on a liner, where the plate may be independent of the liner or attached to the liner by any means, such as for example, glue, bonding, silicone, adhesive, tape, or the like, although preferably, the plate and the liner are not affixed to each other in a permanent matter. Any of the layers of the protection systems described may be bonded to each other or independent from each other (i.e., not bound, but freely, separately, and independently layered). A preferred embodiment may be directed to protection systems that have independent layers where the plate element networks and the liners are not bonded together. Yet a further embodiment may provide a protection system comprising various configurations of plate elements and liners, having varying properties. However, in all formations, the exterior portion that would first receive the impact of a blow is preferably a plate element. Underneath the outer plate element or interconnected mesh network of plates may be another sheet of plates or at least one liner layer or a combination of plates and liners.

In Table 1, various combinations of plates and liners are configured for providing protection against blows or impacts that may be useful in the described protective device and systems. Depending on the design, application, and amount of protection necessary, the combination of liners and plates may have other layers interspersed. These layers may be, for example, textiles, elastic bands, or materials for the design, comfort, or functionality of the impact protection system. Further embodiments may include combinations of the various individual Sample configurations demonstrated in Table 1.

TABLE 1

| Sample | EXTERIOR | | | | | ----> INTERIOR | |
|---|---|---|---|---|---|---|---|
| 1 | Plate | Plate | Liner | Plate | Plate | Liner | Liner |
| 2 | Plate | Plate | Liner | Plate | Liner | Liner | |
| 3 | Plate | Plate | Plate | Liner | Liner | | |
| 4 | Plate | Plate | Liner | Liner | Liner | | |
| 5 | Plate | Plate | Liner | Liner | | | |
| 6 | Plate | Liner | Plate | Liner | | | |
| 7 | Plate | Plate | Liner | | | | |
| 8 | Plate | Liner | Liner | Liner | | | |
| 9 | Plate | Liner | Liner | | | | |
| 10 | Plate | Liner | | | | | |
| 11 | Plate | | | | | | |

As is understood in the art, areas of the body that may need additional protection would likely benefit from a protection system configuration having multiple layers, whether plates or liners or both. Furthermore, in another embodiment, the layers may be bonded or attached to some or all of the other layers or completely detached yet arranged on top of or overlapping another layer of plates or liners or both. In yet a further aspect, groupings of layers may be separated. For example, in Sample 2 portrayed in Table 1, the Plate-Plate-Liner layers may be grouped together followed by another grouping of the Plate-Liner-Liner layers, yet still in the direction from the exterior to the interior, where the exterior portion is initially impacted by the force of a blow and the interior portion is closer to the user or wearer of the protection system. The groupings may be separated by, for example, a fabric or material from the protective system. In one embodiment, the groupings may be held by individual pockets that are adjacent, or by a pocket that holds a grouping of layers, separated by a piece of material or cushion of space, followed by another pocket holding another grouping of layers. These pockets that may hold layers of plates and/or liners may be permanently closed or modified to enable the insertion of plates and/or liners.

A preferred combination of liners for impact protection systems described here may include a combination of Samples 8 and 9 from Table 1, where Sample 9 having one plate and two liners may be the primary combination, but for those areas that require additional high impact protection, the combination of Sample 8 may be used by adding another liner layer. Preferably, for a head impact protection system, the combination of layers around the circumference of the system, or a portion of the system, may include a liner, or combination of liners, and an exterior plate element network or plate element layer placed exterior to the outermost liner layer. The combinations of liners underneath the plate element network may include a closed cell vinyl nitrile foam liner 1 that is about ⅜-inch thick closest to the head, such as for example, NBR/PVC, and another liner 2 of the same material that is about ¼-inch in thickness, and either directly or indirectly adjacent to base liner 1. While at the temple region of the side sections, an additional liner 3 of ¼-inch thickness and the same material as liner 1, or preferably liner 2 may be placed exterior to and adjacent to the ¼-inch thick liner 2. Another embodiment may include a combination such as that of Sample 10, where a closed cell vinyl nitrile foam liner base 1 that is about ⅜-inch thick or about ¼-inch thick may be combined with an exterior plate element.

Depending on the application or amount of protection needed in a protection device or garment, the layers of the protection system may vary. One of skill in the art would understand that in one embodiment, the outermost layer that may be an interconnected meshed plate element network would preferably have a higher tensile strength than another plate element network that may be underneath (i.e., more interior) which may have more flexibility and a lower tensile strength. Similarly, the liners would, preferably, have a denser outer layer that has a higher compression deflection force compared to a more interior liner that is less dense and with a lower compression deflection force. These parameters are preferred since by having a higher to lower tensile strength and a higher to lower compression deflection force from the exterior to the interior, the protection system may be more impact resistant or tolerable and capable of better diffusing impacts.

Head Protection:

With respect to the use of the body protection system for protecting the head in the form of a helmet, hat/cap, or headgear, ideally the head protection would afford protection throughout a wide range of potential impact-related injuries. It is understood that a preferred head protection system would be a balance between a sufficiently hard surface and a softer surface, where the hard surface could compress to a particular degree that would distribute the force of the blow or impact and the softer surface could be sufficient so that it does not collapse under the impact. Head protection could comprise of any of the preferred combinations of layers of plate elements and liners. In a preferred embodiment, a helmet or a cap would retain a typical helmet or cap and the protection system described here would essentially function as "padding". For example, a standard baseball cap may be configured to have a protection system comprising layers of plates and liners, where the protection system may be enclosed in a fabric or other material pocket or pouch that may be fastened to the inside, outside, or both of a billed cap, such as a baseball cap. The pouch may be sewn, glued, adhered, zippered, or fashioned in another manner to the inside, outside, or both of the cap or hat as a separate entity. Alternatively, the pouch may be a continuation of the inside or outside of the cap, where the fabric or material that covers the exterior front or interior of the cap extends to a sufficient length such that the protection system may be encompassed and then sewn or attached directly into the cap. Another embodiment is directed to a head impact protection system that may be temporarily attached or placed on the exterior of a hat, where the entire system essentially acts as a pocket or pouch holding the impact protection layers. This embodiment may be to a removable protection system that is utilized during periods of time when maximum impact protection may be needed, for example, when a baseball pitcher is pitching, and removed when the user is not pitching. A further embodiment may be to a protection system that is permanently affixed to the exterior of the hat or the protection system is incorporated to the exterior portion of the hat by a pouch where the outermost pouch side is made of the hat textile or material and covers the protection system sufficiently to encompass the protective layers. Yet another embodiment may be to a head protection system that is permanently integrated into the hat on both the interior and the exterior of the hat.

An exterior textile or material may, in one embodiment, be the same material as that of the hat, which also may make up the pocket that holds the combination of layers of an impact protection system, may preferably be made of a high performance polyester material that may have non-limiting characteristics including comfort, light weight, breathable, moisture-wicking, anti-bacterial, and provide ultraviolet radiation protection (i.e., UPF that blocks UVA and UVB radiation). However, other textiles and materials may be useful depending on the application, such as but not limited to, polyester, cotton, wool, synthetics, blends of any material, cotton blends, polyester blends, cotton-synthetic blends, combinations thereof, and the like. Moreover, a hot melt film or mesh may be the exterior material.

For baseball or softball players, the front and sides of the head need the most protection. Accordingly, protection systems that extend from at least one side temple area across the forehead and to the other side temple area would be particularly beneficial. Alternatively, separate protection systems may be used to protect the forehead and side areas, including the temples. In one embodiment, a single grouping of layers of a protection system may extend from one temple or just behind the ear, across the forehead, and to the other temple or area behind the other ear. The area of protection may include the curved area between the forehead and the temple, or the front boss. There are two front boss areas—the right and left front boss areas. Similarly, the rear boss includes the curvature between the ear and back portion of the head and has a right and a left rear boss area.

Another embodiment may be directed to a protection system that combines the single grouping of layers of the protection system extending from one temple to the other temple by way of across the forehead area and additional groupings of protection systems at the temple areas. For example, from the most exterior portion to the interior portion, "temple" or "side" protection systems for each temple or side area may comprise two plates and a liner which may be exterior to another "forehead" protection system that may extend across the entire forehead, front boss areas, and temples, which may comprise of a plate element and two liners. In such a configuration, the temple regions have additional protection and the combination of temple protection systems and forehead protection system results in an exemplary configuration comprising 2 plate elements and 1 liner (temple protection system) and 1 plate element and 2 liners (forehead protection system) in the direction from the exterior to the interior. Whereas, the forehead region only has one grouping comprising 1 plate element and 2 liners.

More preferably, the forehead protection system may comprise of one medium impact polypropylene copolymer plate element layer (e.g., of HDPE/LDPE about 0.07 inch in thickness)—a 0.25-inch (or ¼-inch) closed cell vinyl nitrile liner 2—a 0.375-inch (or ⅜-inch) closed cell vinyl nitrile liner 1 grouping from the exterior to the interior, and at each of the side areas, directly underneath the plate element layer, an additional 0.25-inch (or ¼-inch) closed cell vinyl nitrile liner 3 lies in between the exterior plate element layer and the 0.25-inch liner 2. However, various embodiments of impact protection systems described here may include various combinations of these preferred layers.

The polypropylene copolymer plate element layer preferably displays medium impact protection at low temperatures, has a density of about 0.9 $g/cm^3$ as determined by the ASTM D-792 method, and a yield tensile strength of about 2300 psi and yield elongation of about 12%, both as determined by the ASTM D-638 method. The 0.25-inch closed cell vinyl nitrile liner 2, that is also the preferred additional temple liner 3, may preferably have a hardness of about 70 Shore 00 to about 90 Shore 00 (as determined by ASTM D2240 at a temperature of about 21° C.±0.5° C.), a density of about 0.19 $g/cm^3$ to about 0.28 $g/cm^3$ (as determined by ASTM D297), a tensile strength of about 370 PSI (as determined by ASTM D412), an elongation of about 180% (MIN.) (as determined by ASTM D412), a 25% compression deflection of about 25 PSI (MIN.) (as determined by ASTM D1056 at a temperature of about 21° C.±0.5° C.), and a shrinkage at about 10 mm, at about 70° C. for 24 hours of about 5% (MAX.). The 0.375-inch closed cell vinyl nitrile liner 1 preferably has a hardness of about 65 Shore 00 to about 95 Shore 00, about 65 Shore 00 to about 85 Shore 00, or about 75 Shore 00 to about 95 Shore 00 (as determined by ASTM D2240 at a temperature of about 21° C.±0.5° C.), a density of about 0.16 $g/cm^3$ to about 0.22 $g/cm^3$ or about 0.17 $g/cm^3$ to about 0.21 $g/cm^3$ (as determined by ASTM D297), a tensile strength of about 238 PSI to about 312 PSI (as determined by ASTM D412), an elongation of about 150% to about 180% (MIN.) (as determined by ASTM D412), a 25% compression deflection of about 15 PSI (MIN.) to about 17 PSI (as determined by ASTM D1056 at a temperature of about 21° C.±0.5° C.), and a shrinkage at about 10 mm, at about 70° C. for 24 hours of about 2% to about 5% (MAX.).

While at the temple or side region, the temple protection system may essentially lay on top of or be exterior to the forehead protection system, resulting in a preferred four-layered or six-layered protection system at the temple area. The temple protection system alone may comprise of a three-layered combination of a polypropylene plate element—a medium impact polypropylene copolymer plate element—a 0.125-inch or a 0.0625-inch closed cell vinyl nitrile liner (which when chamfered may range in thickness up to about 0.25 inches) in order from the exterior where an impact would first hit to the interior. The forehead protection system may include a protection system that extends from the area behind one ear to one temple to one front boss and the forehead to the other front boss, to the other temple to the area behind the other ear. Alternatively, the forehead protection system may extend from one side of the head to the other side of the head. In another embodiment, the forehead protection system may extend from one temple to the other temple. Another head protection system may expand the entire circumference of the wearer's head or essentially the entire circumference.

Although the head protection system may be adjustable, the length and height of a head protection system may vary depending on the size of the hat or head, and whether it is for adults or youths/children. In one embodiment, the length from the center line (C̲) to the back end of the over-hat head protection system may preferably be about 152 mm to about 356 mm, and preferably about 203 mm to about 305 mm. The most preferred length from the center line to the back end, i.e., half the total length of the head protection system, for an adult version may be about 257 mm and for youth or children versions may be about 177 mm. The total length from the back end or rear boss on one side to the back end or rear boss of the other side through the forehead section may be about 304 mm to about 712 mm, preferably about 406 mm to about 610 mm, and optimally about 514 mm for adults, and about 354 mm for youths.

The height of a head protection system may vary over the length of the entire head protection system. In a preferred embodiment, the area protecting the forehead where the center line is located, is the tallest, while the area towards the back of the head, i.e., the rear boss ends of the head protection system, may be the shortest. Preferably, the area from the center line of the forehead to each of the sides or temple areas has the greatest height to provide maximum protection in those susceptible high impact locations. The height at the center line or center of the forehead area in one embodiment may be about 25 mm to about 102 mm, preferably about 51 mm to about 77 mm, and most preferably about 74 mm. The forehead protection systems and temple protection systems in another embodiment may preferably have a height ranging from about 25.4 mm or about 1 inch to about 76.2 mm or about 3 inches, preferably about 44.45 mm or about 1.75 inches to about 76.2 mm or about 3 inches. An alternative embodiment may be directed to protection systems that have graduating heights or tapered from, for example, the center of the forehead to the sides of the head, where the height at the temple regions may be less than the height at the forehead region, or vice versa depending on the application.

The additional temple protection systems may lay directly on the forehead protection system or be compartmentalized into a separate pouch and affixed to the forehead protection system, either on the inside of the cap or on the outside of the cap. In particular, a baseball cap with a pocket or pouch specifically designed to hold the temple protection system may exist in a separate compartment from the forehead protection system. Again, the pocket or pouch may be permanently closed, for example, sewn closed, or modified to enable the insertion and removal of protection systems comprising plates and/or liners. The pouch may be accessible through a closure adjusted to have hook-and-loop fasteners, buttons, snaps, or the like to allow the insertion and removal of layers of the protection systems, portions of protection systems, or interchanging portions of protection systems. However, any of the embodiments may include pockets that are permanent or accessible to include additional protection systems or to modify the layers of the protection systems.

A further embodiment may be directed to a head protection system that also protects the top and/or crown of the head or cranium. The forehead protection system may be configured to extend upwards beyond the top of the forehead or hairline over the top of the head and/or crown or part of the crown. In one embodiment, the top protection system may protect from the top center of the head down to a reference plane where the side, forehead, and back of the head align. Another embodiment may protect the top of the head to a distance above the reference plane, i.e., closer to the top of the head, or alternatively, the top protection system may have varying coverage, where the top and sides of the head above the reference plane may have a protection system that extends lower than the protection system that may extend in the direction of the rear of the head.

Example 1 exemplifies a specific head protection system in the form of a baseball cap. However, it is understood that the specific layers of the protection system may vary, but preferred layers would have similar properties that could be used interchangeably. For example, if the same beneficial mechanical properties exhibited in different materials, then both materials would be contemplated to be useful in embodiments described here.

Over-Hat Head Protection System:

A further embodiment may be directed to an over-hat head protection system that is removable from, for example, a hat or a baseball cap, preferably a hat or cap with a bill (see, e.g., FIG. 13). Essentially, the over-hat head protection system may be temporarily affixed to the exterior of the hat when needed for protection, and otherwise removable from the hat. Alternatively, this over-hat head protection system may be permanently fashioned to the hat. The over-hat head protection system may be fashioned to the exterior of the hat, where the layers of the liners and the plate element described here protect the forehead and sides of the head and temple areas.

In one embodiment of an over-hat head protection system, the sides or temple areas of the over-hat head protection system may have additional layers of liners for added protection since these areas of the head tend to be more vulnerable to impact. A preferred embodiment includes liners of varying thicknesses and a plate element adjacent to the exterior most liner. Preferably, an over-hat head protection system comprises, in the order from the layer closest to the head to the exterior, (1) a textile closest to the exterior of the hat that forms a base for the over-hat head protection system; (2) a liner of preferably about ⅜-inch or about 0.375 inch (e.g., a blend of acrylonitrile butadiene rubber and polyvinyl chloride (NBR/PVC) closed-cell foam); (3) a closed cell vinyl liner of preferably about ¼-inch or about 0.25 inch; (4) for the areas at the side of the head or temple area, another closed cell vinyl liner of about ¼-inch or about 0.25 inch; (5) a plate element (e.g., medium impact HDPE/LDPE copolymer) layer that spans the forehead and sides of the over-hat head protection system; (6) optionally, a mesh layer, preferably a mono-mesh layer; and (7) a hot melt film or textile that covers all or a portion of the layers of the liners, plate element, and mesh. The form of the over-hat head protection system allows for movement of the various layers, i.e., the layers are not glued or permanently restricted in place. Preferably, the various layers are enclosed in a pouch or pocket of a textile, mesh, or hot melt film.

Another embodiment may be directed to the interior layer, which may comprise of a sweatband. In an over-hat design, the sweatband may be fastened to the hat or pouch material in such a manner to enable the sweatband to fold-up sweatband that folds up over the bottom edge of the hat, thereby securing the over-hat head protection system design to the hat. Where the bill of a hat extends, this interior sweatband will not be present. Moreover, for embodiments of the head impact protection system that have a bottom edge that extends beyond or downward from the bottom edge of a hat, such as for example, sideburn areas, ear areas, or neck areas, the interior fold-up sweatband would not be present. Rather, the interior fold-up sweatband material would essentially be present only at those areas that are closest to the bottom edge of the hat.

Embodiments directed to youth/children over-hat head protection systems may include only one liner, i.e., the base closed cell vinyl nitrile liner closest to the head or exterior of the hat with a preferred ⅜-inch thickness, and a medium impact polyethylene copolymer plate element immediately adjacent and exterior, where a textile or mesh with hot melt film overlaying all or a portion of the over-hat head protection system. Similarly to the adult version, a mesh layer is optional, particularly in embodiments where the textile or hot melt film covers the entirety of the over-hat head protection system.

The over-hat head protection system may be affixed by at least one connector through compressing the head protection system to the hat by, for example, an elastic band or elastic webbing, snaps and snapbacks, buckles, clasps, hook-and-loop fasteners, magnets, buttons, zippers, latches, or the like, or combinations thereof, attached to the rear boss ends or connection points of the head protection system that lie towards the back of the head. A preferred embodiment of the over-hat head protection system may be directed to connectors joining the two ends of the head protection system, where the ends are preferably tapered downward to a height comparable to the connector. In one embodiment, the connector may have a height, most preferably about 32 mm, that is sufficient to securely fasten ends or connection points of the impact protection system together and over the head or hat of the wearer. The height of the elastic band preferably spans the height of the back ends of the over-hat head protection system.

Another embodiment may be directed to an elastic band or elastic webbing having grips or another means that causes friction or traction, made of silicone or a similar lightweight plastic or polymer, on the interior side of the connector, preferably an elastic band, i.e., the side closest to the hat, to keep the temporary over-hat head protection system securely fastened to the exterior of the hat. In a further embodiment, the textile side closest to the hat may be made of an elastic band or webbing material itself to secure an over-hat head protection system to the hat. Another means for maintaining the over-hat head protection system affixed to the hat are hooks located on each side, which fasten onto the bill of the hat, preferably a portion of the hook attaches to the underside of the bill.

Alternative shapes and designs to the head protection system may also be embodied. For example, the forehead section to side section may slope upward towards the top of the head and then slope downward towards the back section where a connector holds the head protection system in place. Incorporated into various head protection designs are notches located at the point where the brim meets the cap portion covering the head, which contribute to securing the head protection system in place on the hat. Moreover, the sideburn area may be extended downward to protect a greater area of the temple and sides of a user who needs impact protection at that particular location. The head protection systems may have mesh windows of varying sizes, shapes, and designs. For example, one mesh window may be present on each side (i.e., left or right of the center line on the forehead section), multiple mesh windows may be present across the entire length of the head protection system, and preferably, the mesh window pattern is symmetrical on either side of the center line, i.e., the left and right sides from the center line are mirror images. The windows may also be of varying shapes and sizes, but retain symmetry on both sides of the head protection system from the center line. Mesh windows may also extend to the sideburn area as well as the ear covering area. Alternatively, there are no mesh windows, but rather a hot melt film or textile covers the layers of the head protection system.

Exterior Hat-Incorporated Head Protection System:

Another embodiment further expands upon the integrated head protection system by permanently attaching the head protection system to the exterior of a hat. The general shape and design remains the same as in other embodiments with the major exception being the attachment to the exterior of the hat. The layers may comprise of any one of the described combinations of liners and plate elements, in addition to optional mesh and hot melt film. One of these embodiments may be directed to attachment to the exterior of the hat by stitching the perimeter or essentially the entire perimeter sufficiently to secure the layered head protection system to the hat. For example, the top edge along the forehead section may preferably have a stitch and turn seam and a top stitch may be sewn around the top edge of the curved portion towards the back end of the side section. Another embodiment may be directed to a top stitch around the perimeter from top edge of the back side or rear boss portions to the forehead section and the bottom edge of the forehead to temple sections. Siping, as previously described, may be scored on any of the liners to aid in contouring the liners of the head protection system to the curves of the user's head. Preferably the liners located above the ear and sideburn area of the side section are siped along the top edge downward towards the ear. Alternatively, siping or channels may be present at the front or back "corners" of the head protection systems, or both the front and back "corners" where the forehead and back sections meet the side sections.

Integrated Hat Head Protection System:

For design and aesthetics, some users may prefer a head protection system that is hidden. Thus, head protection systems that are integrated into a hat provides protection from impact in a discreet manner. This embodiment essentially incorporates the layered head protection system into a hat where the textile hat layer covers the other protective layers. A non-limiting combination of layers may include an inner textile or material pocket including for example an elastic sweatband, a base liner of a closed cell vinyl nitrile foam that is about 0.375-inch thick, another similar material liner of about 0.25-inch thick, a medium impact polyethylene copolymer blended plate element, and a textile or material which covers the combination of layers and forms the exterior of the hat. Another embodiment may be directed to an integrated head protection system that has a liner of 0.375-inch or 0.25-inch thickness and a medium impact polyethylene copolymer blended plate element adjacent and exterior to the liner, and a textile or other material which covers the combination of layers thereby forming the exterior of the hat. Other layers, such as those from forming pockets, pouches, or bladders may also be incorporated as one of skill in the ordinary art would understand. As previously described, additional liners may be included for added protection where needed. If a portion of the system extends beyond the bottom edge, for example, a sideburn portion, the interior may or may not include all of the layers. One embodiment of the sideburn portion may exclude an elastic sweatband. Alternatively, the sideburn portion that extends beyond the bottom edge may have a different textile closest to the user's head, preferably a soft and comfortable material.

Another integrated head protection system may be directed to a combination of layers of the system that are essentially composed in an exterior pocket of the hat. The exterior pocket essentially is the same shape as the combination of layers of the head protection system, where the perimeter may be stitched with or without piping. For example, the combination of layers from the interior to the exterior of the integrated head protection system with an exterior pocket may be the hat, a textile that forms one side of the pocket, a liner (preferably a thick liner that forms the base), another liner (preferably one that is thinner than the base liner), a plate element, and a textile the forms the other side of the pocket, where this exterior most textile may cover the combination of layers such that the pocket is closed by stitching around the entire top edge. (FIG. 33).

In-Hat Head Protection System:

Another embodiment may be directed to an in-hat head protection system that is part of the interior and exterior of, for example, a hat or a baseball cap, preferably a hat or cap with a bill (see, e.g., FIG. 34). Essentially, the in-hat head protection system may be permanently affixed to the interior and exterior of the hat. For example, a portion of the in-hat head protection system comprises one or more liners on the interior of the hat, while the exterior of the hat comprises one or more liners with a plate element, where the layers of the liners and the plate element described here protect the forehead and sides of the head and temple areas of the wearer of the hat from hard impacts.

In one embodiment of the in-hat head protection system, liners of varying thicknesses and the plate element provide impact protection, where additional liners may be placed at the sides or temple regions as these areas are more susceptible to hard impact injuries. Preferably, the in-hat head protection system comprises, in the order from the layer closest to the head to the exterior, (1) an optional sweatband, elastic band, or elastic webbing on the interior of the hat; (2) an interior textile pocket encompassing a base closed cell liner of preferably about ⅜ inch or about 0.375 inch (e.g., NBR/PVC or vinyl nitrile); (3) a hat layer separating the interior and exterior features of the in-hat head protection system; (4) an exterior textile pocket encompassing a closed cell vinyl nitrile liner of preferably about ¼ inch or about 0.25 inch; (5) for the areas at the side of the head or temple area, another closed cell vinyl nitrile liner of about ¼ inch or about 0.25 inch; (6) a plate element (e.g., preferably, a medium impact HDPE/LDPE copolymer) layer that spans the forehead and sides of the over-hat head protection system exterior to the adjacent liner; (7) optionally, a mesh layer, preferably a mono-mesh layer, which may be stitched, glued, adhered, or affixed in a comparable manner, to the outermost exterior textile pocket layer; and (8) the other side or outermost exterior textile pocket that forms the hat exterior and encompasses or covers all or a portion of the layers of the liners, plate element, and mesh. The form of a body impact protection system, such as for example, the in-hat head protection system, allows for movement of the various layers, i.e., the layers themselves are not glued to each other or permanently restricted in place. The exterior layers may be seen through a mesh window of the outermost textile pocket, specifically, the plate element layer and liner may be viewed through the mesh. A portion of the mesh window may have a screen print logo and hot melt film underlay to display a logo, brand, or other desirable graphic. However, other embodiments may not have a mesh window, and the hat textile may completely cover and encompass the impact protection system.

The in-hat head protection system may be affixed by a connector, for example, an elastic band or webbing, snaps, buckles, clasps, hooks and loops, stitching, or the like. A preferred embodiment of the in-hat head protection system may be directed to pouches or pockets comprising the preferred layers of the in-hat head protection system that may have one or more borders stitched, glued, or affixed together enclosing the head protection system to the hat, and yet not permanently fastening the actual layers of liners and plate element layers. In one embodiment, the two back ends of the in-hat head protection system may be preferably tapered and detached from each other, i.e., the exterior portion is affixed directly to the hat so the back ends do not need to be connected to each other. To keep the in-hat head protection system affixed to the exterior of the hat, this embodiment of the in-hat head protection system preferably has a textile covering with a border that may be stitched, glued, or adhered in a comparable manner directly to the hat. The textile size may be sufficient to cover the multiple layers and have a border that extends beyond the layers such that the textile may be stitched directly to the other end of the pocket created by the textile and the hat. The bottom border along the sides of the hat where the bill does not extend may be adequately wide to fold under the bottom sides of the hat and be stitched directly to the hat, or alternatively, glued, attached, or affixed by another means.

In a further embodiment, the interior of the hat may have, for example, an elastic band or elastic webbing, preferably comprising a sweatband that is the layer closest to the user's head. The elastic sweatband may be attached to the interior of the hat by stitching, gluing, or affixing by another means and thereby provides comfort to the wearer by added cushioning, but also absorbing moisture. The elastic sweatband may be sewn to a pouch or pocket of the hat on the interior of the hat or to the interior of the hat directly.

Although the length and height of the in-hat head protection system may vary depending on the size of the hat and whether it is for adults or youths/children, in one embodiment for adults, the length from the center line (C) to the back end of the in-hat head protection system may preferably be about about 152 mm to about 356 mm, preferably about 203 mm to about 305 mm, and most preferably about 196 mm. The height of the in-hat head protection system may vary over the length of the entire head protection system. In a preferred embodiment, the area protecting the forehead where the center line is located, may be the tallest, while the area towards the back of the head where the ends taper downward, i.e., the ends of the head protection system, may be the shortest. Preferably, the area from the center line of the forehead to each of the sides or temple areas has the same maximum height to provide the most protection in those susceptible high impact locations. The height at the center line or center of the forehead area may be about 25 mm to about 102 mm, preferably about 51 mm to about 77 mm, and most preferably about 74 mm.

Embodiments directed to youth/children in-hat head protection systems are directed to a length from the center line to the back end of the over-hat head protection system preferably about 152 mm to about 356 mm, preferably about 203 mm to about 305 mm, and most preferably about 177 mm. While the height at the center line of the forehead portion of the head protection system may preferably be about 25 mm to about 102 mm, preferably about 51 mm to about 77 mm, and most preferably about 77 mm.

Another design for the youth-specific version of the in-hat head protection system may include only one liner, comprising a base liner closest to the head on the interior of the hat and a textile pocket comprising a plate element on the exterior of the hat and a mesh with the other side of the textile pocket overlaying all or a portion of the exterior part of the in-hat head protection system. Similarly to the adult version, the mesh layer is optional, particularly in embodiments where the exterior most textile pocket layer covers the entirety of the exterior portion of the in-hat head protection system. Alternatively, the mesh layer may be approximately the size of the textile window opening, or slightly bigger than the window such that the mesh may be stitched or attached to the textile and viewable through the opening. For design purposes, a logo may be incorporated into the in-hat head protection system. A preferred embodiment may include a head protection system with a logo screen printed on a portion of the mesh layer that has a hot melt film.

Alternative shapes and designs to the over-hat head protection system may also embodied. For example, the forehead section to side section may slope upward towards the top of the head and then slope downward towards the back section where a connector holds the head protection system in place. Incorporated into various head protection designs are notches located at the point where the brim meets the cap portion covering the head, which contribute to securing the head protection system in place on the hat. Moreover, the sideburn area may be extended downward to protect a greater area of the temple and sides of a user who needs impact protection. The head protection systems may have mesh windows of varying sizes, shapes, and designs. For example, one mesh window may be present on each side (i.e., left or right of the center line on the forehead section), multiple mesh windows may be present across the entire length of the head protection system, and preferably, the mesh window pattern is symmetrical on either side of the center line, i.e., the left and right sides from the center line are mirror images. The windows may also be of varying shapes and sizes, but retain symmetry on both sides of the head protection system from the center line. Mesh windows may also extend to the sideburn area as well as the ear covering area. Alternatively, there are no mesh windows, but rather a hot melt film or textile covers the layers of the head protection system.

Construction of Over-hat Head Protection System

A method of constructing an over-hat head impact protection system may comprise pre-forming a "tube" that forms a pocket to hold the liners and plate element layer. The tube essentially is the exterior layer of an over-hat head impact protection system where the forehead and side areas are expanded and flattened. The tube may comprise of a material that is a textile, fabric, thermoplastic material, a hot melt film, or the like. A preferred embodiment may be directed to a tube that has a top edge and a bottom edge that is sealed, while the ends that make up the back ends of an over-hat head protection system are opened. Through these ends, the combination of layers, including for example, a ⅜-inch NBR/PVC base liner, an adjacent ¼-inch vinyl nitrile liner, a ¼-inch vinyl nitrile liner for additional protection in the temple areas, a medium impact HDPE/LDPE copolymer plate element, and a mesh layer, preferably for embodiments that have mesh windows, may be inserted into the tube through the ends. Once placed inside the tube pocket or pouch, the ends of the tube may be stitched, closed, sealed, glued, or fastened in some manner that encases and maintains the layers inside the tube without impeding the movement of the layers of liners and plate elements. The excess tube material may be trimmed off before the ends are connected through the use of a connector, such as for example, an elastic band, a hook-and-loop fastener material, a buckle and a strap, combinations thereof, and the like.

Construction of Exterior Hat-Incorporated Head Protection System

Another embodiment may be directed to a preferred method of making a head protection system that has an exterior combination of layers. This may essentially be utilized in the method of constructing the head protection systems, such as for example, the exterior hat-incorporated design, integrated hat design, and the exterior portion of the integrated hat design. Various steps of the preferred method may be applied to other manufacturing methods in the design of other head protection systems.

A preferred embodiment of constructing the designs exemplified in, for example, FIGS. 30-34 and 47, may be directed to the following steps. Constructing a beanie by assembling individual panels that compose the beanie of a standard baseball hat. For example, six panels of a standard baseball hat may be constructed and attached to each other along the length of the panels. These panels cover the crown of the head and portions of the forehead, sides, and back of the head that essentially form a beanie. The panels are preferably stitched together, but may be securely glued, adhered, or attached in some other fashion. Simultaneously or sequentially, a head impact protection system, namely the forehead and side panels or sections of a side of a pocket or pouch, such as a textile pouch, are fashioned, combined, adhered, or preferably stitched together. A combination of layers of liners, plate elements, and optionally mesh may be inserted between the beanie panel layer and a side of the textile pocket on the interior, exterior, or both the interior and exterior of the head protection system. An additional liner layer may preferably be included at the temple or side regions of the system when the layers of protective material are composed into the pocket or pouch. The interior or exterior pocket or pouch may have an excess border, allowing the perimeter of the pouch to be attached to the beanie portion at the forehead and side sections by stitching the perimeter or applying a hot melt film to the beanie. The pouch may be affixed to the interior or exterior of the beanie by any means, such as, but not limited to stitching, gluing, adhering, or the like. The bill of the hat may then be attached or fashioned at the forehead region by, preferably, stitching the bill to the beanie and exterior portion of the head protection system. In some embodiments, the bill may also be attached to the interior of the hat.

Attributes For Head Protection:

The skilled artisan would understand the important factors in selecting the appropriate protection system or padding depending on the particular application. For example, density, elongation, compression deflection, thickness, and shrinkage are key attributes in protection systems. More specifically, three key attributes for head protection (helmets and protective caps) are density, thickness and compression deflection. Compression deflection is the parameter for how much force is required to compress a layer, such as for example, a foam liner, to 50% and 25%. For example, if the compression deflection of a one inch thick piece of foam is measured, the amount of force in pounds per square inch (PSI) required to compress the foam to a thickness of 0.5 inch and 0.25 inch would be measured. The higher the PSI measurement, the higher the compression deflection.

Base Layer Protection System

Another embodiment may be directed to a base layer protection system that is employed and embedded in protective clothing or garments. The protection system may be in clothing that optionally has additional benefits such as moisture wicking, stretchiness, anti-bacterial, and the like. The protective garment may preferably have base layer protection systems located in areas that would receive impacts, such as but not limited to the shoulders, elbows, chest, thighs, knees, and the like or combinations of areas. Depending on the protection needed, at least one interconnected meshed plate element network exterior to at least one liner may be incorporated into the protective garment. One embodiment may incorporate a protection system having a 50/50 blended high density polyethylene (HDPE) and low density polyethylene (LDPE) interconnected plate element network exterior to a liner, where the liner may have a tensile strength of about 140 PSI, an elongation minimum of about 150%, a minimum compression deflection at 25% of about 8.5 PSI and at 50% of about 19 PSI. In another embodiment, the HDPE/LDPE ratio may be a blend of about 60/about 40, about 70/about 30, about 80/about 20, about 90/about 10, about 10/about 90, about 20/about 80, about 30/about 70, or about 40/about 60. The embodiment comprising a 50/50 blend of HDPE/LDPE may preferably overlap a vinyl nitrile foam liner (e.g., density of about 0.095 g/cm$^3$ to about 0.12 g/cm$^3$; tensile strength of about 140 PSI; a 25% compression deflection of about 8.5 PSI (MIN.); and a hardness about 55 Shore 00 to about 75 Shore 00) to form the base layer protection system useful in protective garments. For example, the base layer protection system may be sewn into the fabric of a protective shirt, where protection from impacts may be needed, particularly in the shoulder, triceps, sides of the ribcage, or for protective shorts, the hips and thighs. The protection systems may be inserted into a pouch or pocket at various locations and sewn in or preferably, permanently closed or encased. However, similar to other embodiments, the pocket may be temporarily closed enabling the insertion and/or removal of various protection system layers.

A further embodiment may be directed to base layer protection system having an interconnected mesh plate network comprising a medium impact polypropylene HDPE/LDPE copolymer preferably having a density of about 0.9 g/cm$^3$, tensile strength at yield of about 3200 PSI, and about 12% elongation at yield and underneath the plate network, a vinyl nitrile foam having a minimum compression deflection at 25% of about 8.5 PSI and at 50% of about 19 PSI, minimum elongation percent of about 150%, and a density ranging from about 0.095 g/cm$^3$ to about 0.12 g/cm$^3$. The liner may preferably be a vinyl nitrile foam ranging in thickness from about 0.25 inch to about 1 inch, preferably about 0.3125 inch to about 0.8215 inch. For example, protection on or around the thighs may have thicker liners; whereas the sides of the torso may have thinner liners. Preferably the base layer protection may have a peak G force of less than about 50 g as measured in a drop test (see, Example 2). Another preferred embodiment However, one of skill in the art would understand the requirements for the amount of protection system necessary in various areas of the body protection garment.

Glove Protection System

When the protection system is employed in a glove embodiment, the plate elements may be used separate from or in combination with liner elements, but preferably with liner elements to add cushioning and comfort between the hand and the plates. As most impact or blows will be directed to an exterior portion of the hand, i.e., back or top, the plate elements may be positioned on the back of the fingers and/or on the back of the hand so that fingers are bendable at their joints. Plates covering the fingers may be singly presented such that a single plate protects a single phalange. The single plates covering each phalange of a finger may be interconnected to each other over the joints by bridges or alternatively, the material in the body protection garment, or glove, may be used to act as bridges in the fashion of bridge-like features. Bendable bridges could beneficially cover not only the joints, but also the knuckles, or any body part that needs to have a range of motion such as for example, like a hinge. Depending on the particular desired application, the phalanges may be protected with individual plates either interconnected using bridges or materials that act as bridges, with or without a liner underneath the plate. The phalange or finger protection devices may optionally also include protection of the back of the hand with an interconnected network of meshed plates, and may optionally include wrist protection that is part of the meshed interconnected network covering the phalanges and back of the hand, or variations of the combinations, preferably in the form of a glove. For maximum protection, the phalanges, the back of the hand, and the wrist would all be protected. As explained in the protection systems, various layers of plate elements and/or liners may be employed in the glove embodiment. For example, in a glove embodiment, the phalange protection system may employ only plate elements covering each phalange section connected by fabric over the joints, the back of the hand protection system may employ a meshed network of interconnected plate elements sufficient to cover the entire back of the hand including the knuckles and underneath is at least one liner layer, and the wrist protection system may utilize at least one interconnected meshed plate network over at least one liner layer, all of which is within or a part of the glove.

The glove may include a back of the wrist protector section that covers the back, extends to the sides of the wrist, or essentially surrounds the entire wrist. When the glove includes a wrist protection section, the plate elements may be positioned on the wrist protection section to provide protection to the top or back of the wrist. The plate elements on the back or top of the fingers may be connected to the plate elements on the back of the hand, or they may be separated from the plate elements on the back of the hand, and when the glove includes a back of the wrist protection section, the plate elements may be connected to form a sheet extending from the fingers to and including the back of the wrist. Another embodiment may be directed to a wrist protection device that may be separately compartmentalized and affixed to the glove. A further embodiment may be directed to a completely separate wrist protection system that appears as an independent wristband comprising any protection system configuration.

Alternatively, the plate elements alone or in combination with one or more liner elements providing protection to the fingers, may be separate from the plate elements alone or in combination with one or more liner elements providing protection to the back of the hand, which may be separate from the plate elements alone or in combination with one or more liner elements providing protection to the back of the wrist. Thus, in one embodiment, a glove in accordance with the present invention may have in combination individual finger protectors, back of the hand protectors, and back of the wrist protectors.

In another exemplary embodiment, a glove in accordance with the present invention has a wrist protection section and a back of the hand protection section where the back of the hand protection section extends a distance beyond the back of the hand and over each of four or five of the knuckles of the hand (e.g., just the four knuckles excluding the thumb knuckle or all five knuckles including the thumb knuckle), to a position so that the knuckles are fully protected but do not extend to, or beyond, the first joint of the fingers from the knuckles of the hand.

A further embodiment may be directed to plate elements alone or in combination with one or more liner elements may be positioned separately on the back of each of the phalanges of the fingers so that the fingers are more readily bendable. Preferably, plate elements in combination with at least one liner element may be positioned on the back of the fingers, back of the hand, and back of the wrist, so that the combination of the plate elements and liner elements substantially cover the back the fingers, back of the hand, and back of the wrist. The plate elements alone or in combination with the liner elements may also extend to cover the sides of the hand extending from the wrist to the tip of the pinky on the one side and to the tip of the thumb on the other side.

Although any of the protection systems may be incorporated into a particular protection garment or gear, the systems may also be compartmentalized into a separate pouch or pocket. The pouch may either be permanently closed or modified to allow for the insertion of additional layers of plate elements, liners, or both. In the modified pouch that is not permanently closed, the protection system inside the pouch may be sufficiently secure to prevent the layered protection system from detaching or separating from the pouch. For example the pouch may be modified to have a closure that is made of hook-and-loop fasteners, buttons, snaps, and the like which would keep the protection system in the pouch.

In a glove embodiment, for example, a pocket may be assembled onto the back of the hand between the fabric covering the back of the hand and a pouch containing the protection system. The pocket allows for increased mobility or the insertion of additional plate and/or liner elements to supplement the protection system.

In another embodiment, protection may be required more so on the palm side of the hand. For example, boxing trainers use punch mitts to receive punches in the palm of the hand. Thus, protection may be desired on both the front and the back of the hand and/or wrist.

Protection System Applications

The body protection systems and devices of the present invention can be used for various purposes in various applications including indoor and/or outdoor activities such as, but not limited to, cycling, wrestling, volleyball, golf, soccer, lacrosse, mixed martial arts, boxing, hockey, football, basketball, baseball, outdoor activities such as rock climbing, off-road and mountain biking, motocross, skateboarding, snowboarding, cricket, rugby, equestrian, ice-skating, skydiving, skiing, roller-skating, roller-blading, roller-hockey, field hockey, and the like. The body protection systems and devices of the present invention may also be used to protect persons in job-related activities such as, but not limited to, military and law enforcement, house painting (ladder-related activities), construction and utility work, gutter cleaning, and roofing.

Additionally, body protection systems may also be useful for patients or individuals who may easily fall or bump into objects that would injure the individual. For example, those who are prone to seizures, infants who have not yet developed neck strength to support their heads, or the elderly who with the advancement of age become increasingly unstable and likely to fall.

Types of Gear or Protection System Devices

The body protection systems and devices may be made as an intact part of an article of clothing, sports uniform, protective gear, and/or accessories, or they may be made as separate elements or inserts for insertion into pockets or sleeves of sports uniforms, clothing, protective gear, and/or accessories. Articles of clothing that may be prepared include hats and caps, such as baseball and softball caps, both adult and youth, skull caps, beanies, visors, head bands, jerseys, shirts, jackets, flak jackets, chest protectors, gloves, pants, shorts, and tights, under garments, thermal garments, long sleeves having padding for the forearm, elbow, and/or upper arm for sliding onto arms, bodysuits, discriminate garments (i.e., separate pieces) having protective elements for achieving the same or similar result, such as gloves, wrist bands, wrist protectors, forearm protectors, elbow protectors, upper arm, and shoulder protectors, knee pads, thigh padding, calve and shin guards, ankle protectors, wrestling headgear, and helmets. They may also be employed in footwear, such as insoles for support and/or protection against impact for the top and sides of the foot and/or toes (e.g., they may be employed in the tongue, sides, and toe areas of footwear, such as shoes, sneakers, or cleats), ankles in high tops or boot-like footwear, and as orthotics and insoles as well. The protection systems may also be employed in, for example, headgear, knee pads, or jumpsuits for infant protection; head, chest, shoulder, arm, hand, leg, knee, or feet skate elements (such as sides and tongues of skates) for hockey goalies, in addition to or in place of traditional hockey goalie protection. They may also be employed, for example, in baseball and softball batting gloves. Moreover, the protective gear may be useful in chest and arm protectors for protecting against recoil from gunshots (in the left or right upper chest, shoulder, and upper arm areas) and in archery (in the chest, forearm, hand, and finger areas).

The body protection systems and devices may form base layer protection systems, which may optionally be employed with moisture-wicking fabrics (e.g., in combination with fabric that draws sweat off the skin to the outside of the fabric). Alternatively, in any embodiment where a user may anticipate receiving impact or blows, the described protection systems may afford protection and would benefit the user in incorporating the protection systems into the uniform or garment to provide exterior padding.

Further embodiments include incorporation of the protection systems into seats, such as airline seats and automotive seats and, more particularly, seat cushions, and back cushions. The body protection systems and devices may also be employed as protection for, or make up, shipping crates, trunks, suit cases, and brief cases.

DETAILED DESCRIPTION OF THE DRAWING FIGURES

FIG. 1 illustrates two overlapping lines of two separate sheets of interconnected plate elements. As can be seen, the two sheets are offset from each other. For efficiency, two top sheet plate elements 10, are shown and one whole and two half lower sheet plate elements 20 are also shown, the hashed lines representing the lower sheet elements. In the top sheet line of plate elements, two adjacent plate elements are shown by 10, and they are connected to each other by connecting bridges or bonds 30a. The lower sheet line of plate elements 20 are illustrated and connected to each other by connecting bridges or bonds 30b.

Figure 2:
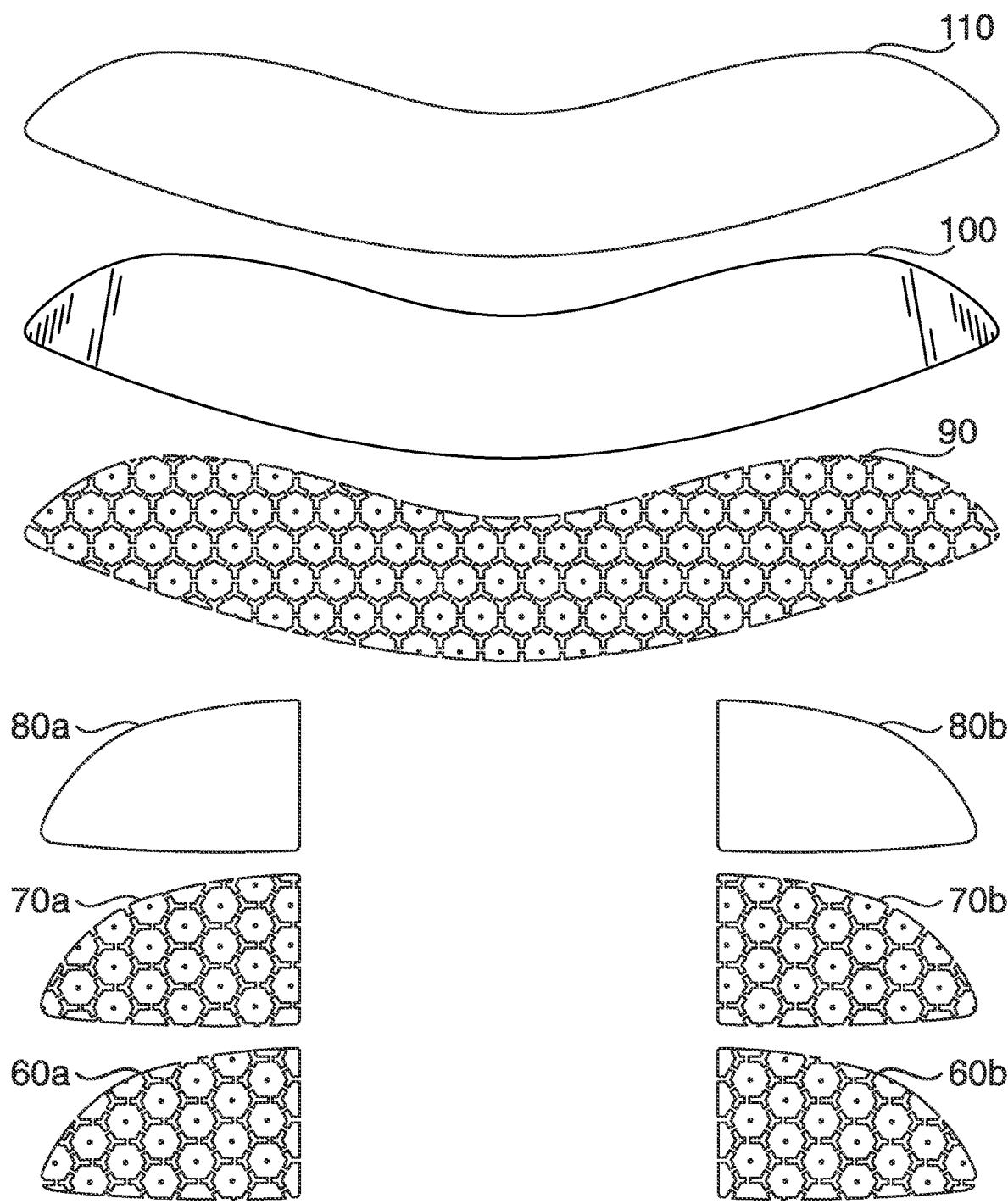
FIG. 2 illustrates the elements of one embodiment of a head protection system in accordance with the present invention wherein the system includes left and right temple protection liner elements and separate forehead and side head plate protection elements.

FIG. 2 illustrates the elements of one embodiment of a head protection system in accordance with the present invention. As can be seen, the elements may include two sets of left and right temple plate elements 60a and 60b, and 70a and 70b. This embodiment may also include left and right temple protection liner elements 80a and 80b which may be positioned beneath the left and right temple plate elements 60a and 60b, and 70a and 70b and closer to a person's temple area. Elements 90, 100, and 110, illustrate, respectively, a forehead and side head plate protection element 90, and two forehead and side head liner elements (100 and 110), which may extend around the inside or outside of a cap, such as a baseball cap, to a position of from about the back area of a person's right ear all the way around the front of a cap, to about the back are of a person's left ear, or any distance in between as appropriate for the particular purpose. The temple protection elements 60a and 60b, and/or 70a and 70b, and/or 80a and 80b, may be used alone or in combination with area possess different densities and therefore, in combination, function to dissipate the impact of an object that may strike a person's head. The temple plate elements 60a and 60b, and 70a and 70b, alone or in combination with the forehead and side head plate protection elements 90, and/or forehead and side head liner element 100, and/or forehead and side head liner element 110. When the temple liner elements 60a and 60b, 70a and 70b, and 80a and 80b, are used in combination with the forehead and side head protection elements 90, 100, and 110, they provide additional protection to a person's head.

Figure 3:
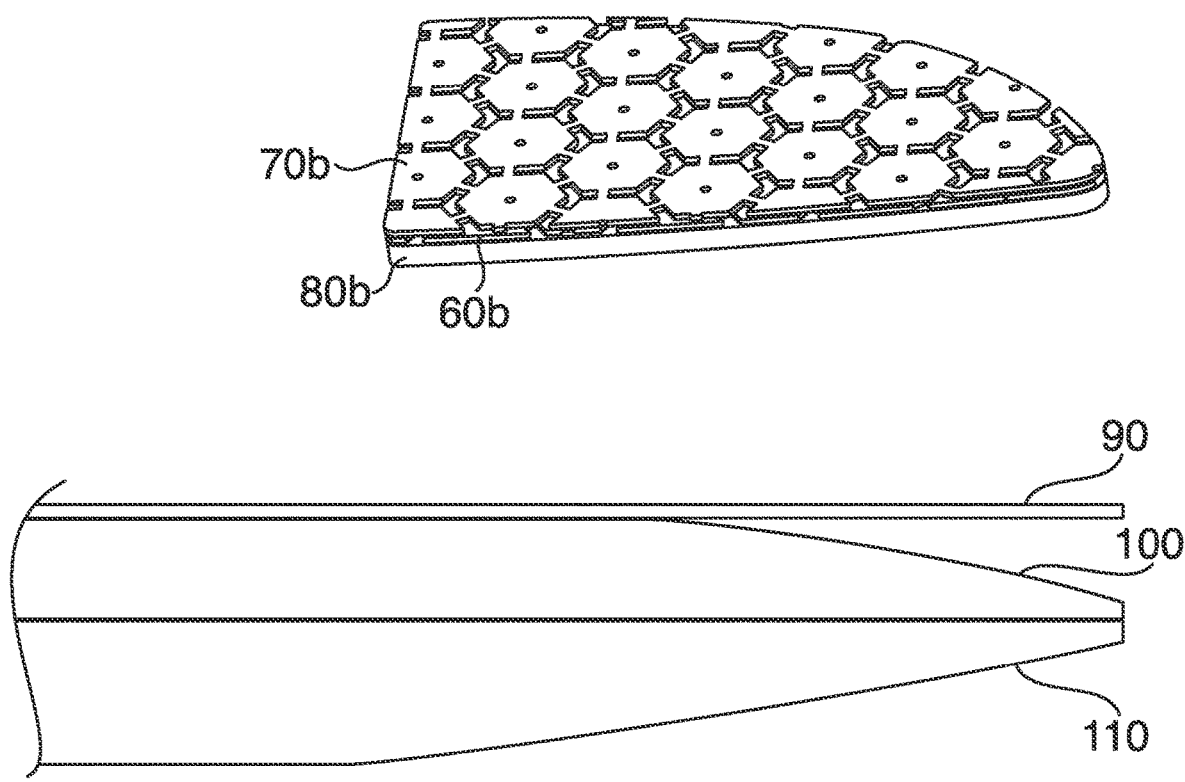
FIG. 3 illustrates a layered temple protection system for one temple and a layered forehead and side head protection system in accordance with the present invention.

FIG. 3 illustrates a layered temple or side protection system for one temple (70b, 60b, and 80b), and a layered forehead and side head protection system (90, 100, 110). As can be seen, the layered forehead and side head protection system (90, 100, 110) is tapered as it reaches its end at the sides for better comfort when positioned inside a cap from approximately about a position of the back of one ear, around the front of a cap, to about the back area of the other ear. The tapered layers of liners 100 and 110 allow for the curvature in a head protection system found in, for example, a cap where the "gap" between plate 90 and liner 100 is absent when the protection system comprising plate 90, liner 100, and liner 110 are inserted in the cap, such that each layer is directly adjacent to the other.

Figure 4:
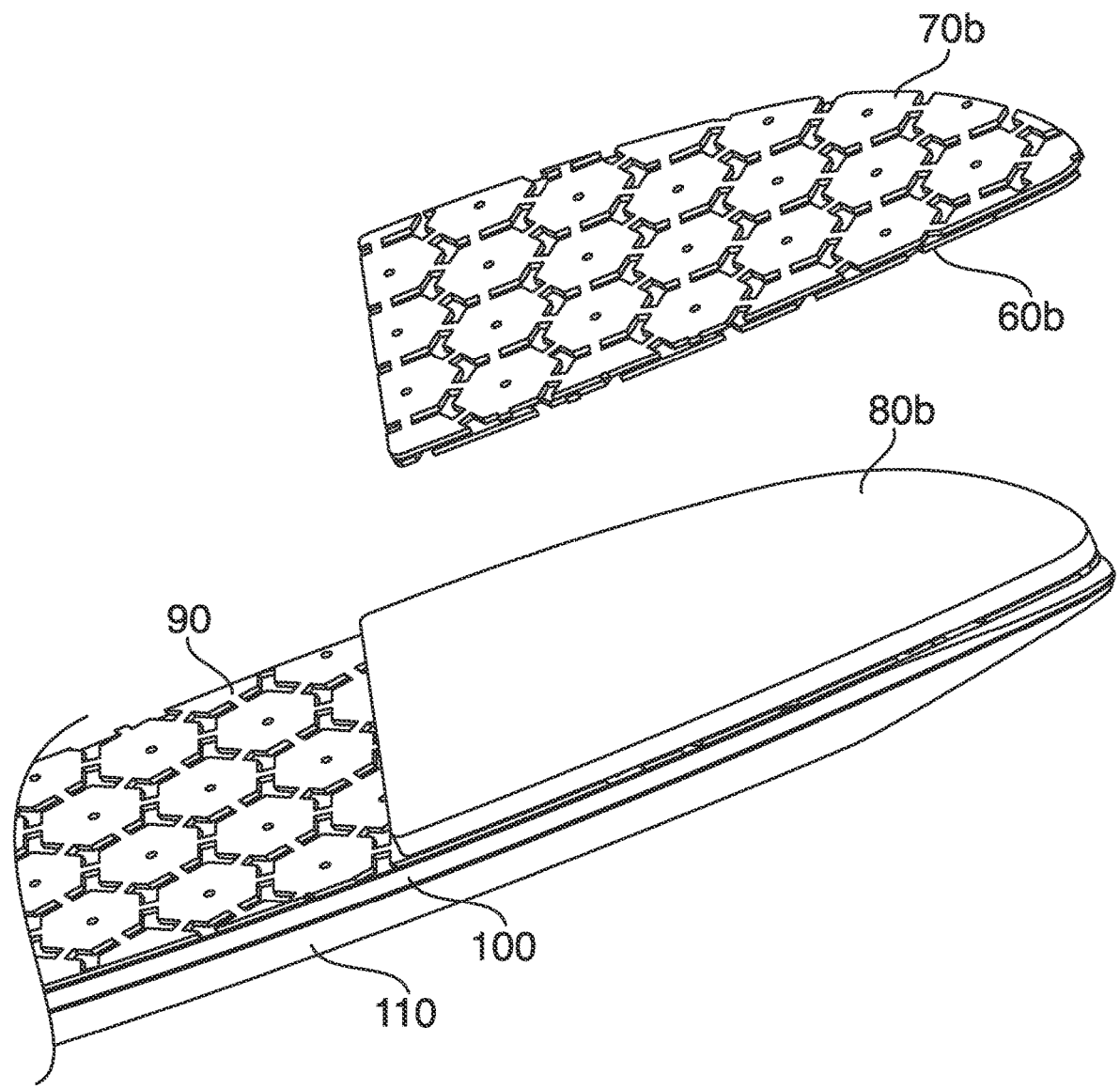
FIG. 4 illustrates an example of layering temple protection system layer on top of the layered forehead and side head protection system.

FIG. 4 illustrates an example of layering temple protection system layer 80b on top of the layered forehead and side head protection system (90, 100, 110).

Figure 5:
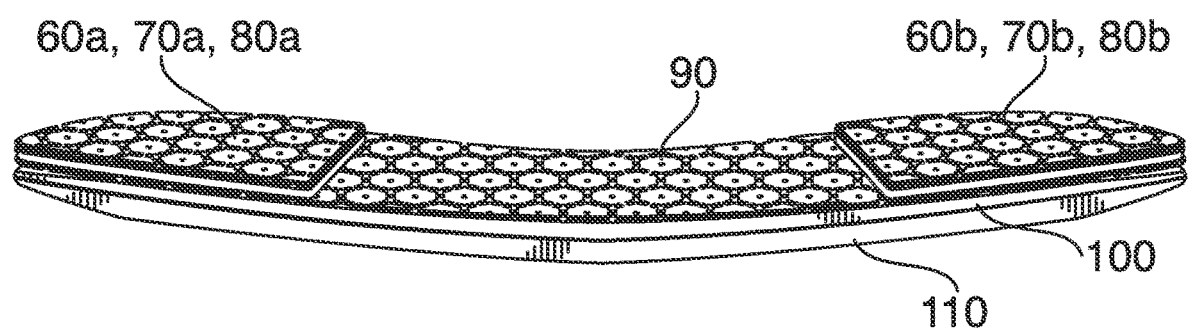
FIG. 5 illustrates a side view of an embodiment wherein temple liner elements are used in combination with the forehead and side head protection elements.
Figure 6:
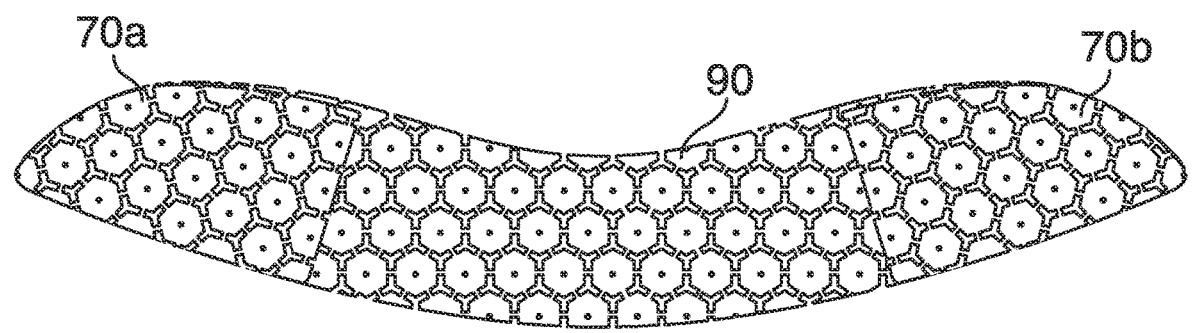
FIG. 6 illustrates a top view of the embodiment of FIG. 5.

FIG. 5 illustrates a side view of an embodiment where temple liner elements 60a and 60b, 70a and 70b, and 80a and 80b, are used in combination with the forehead and side head protection elements 90, 100, and 110. The combination of the temple liner elements and the forehead and side head protection elements may be positioned on the inside on the outside of a cap or helmet. Preferably, they are positioned so that the temple liner elements are closest to the inside fabric of the cap or helmet, and the forehead and side head protection elements 90, 100, and 110, are positioned closest to the person's head. FIG. 6 illustrates a top view of the embodiment of FIG. 5.

Figure 7:
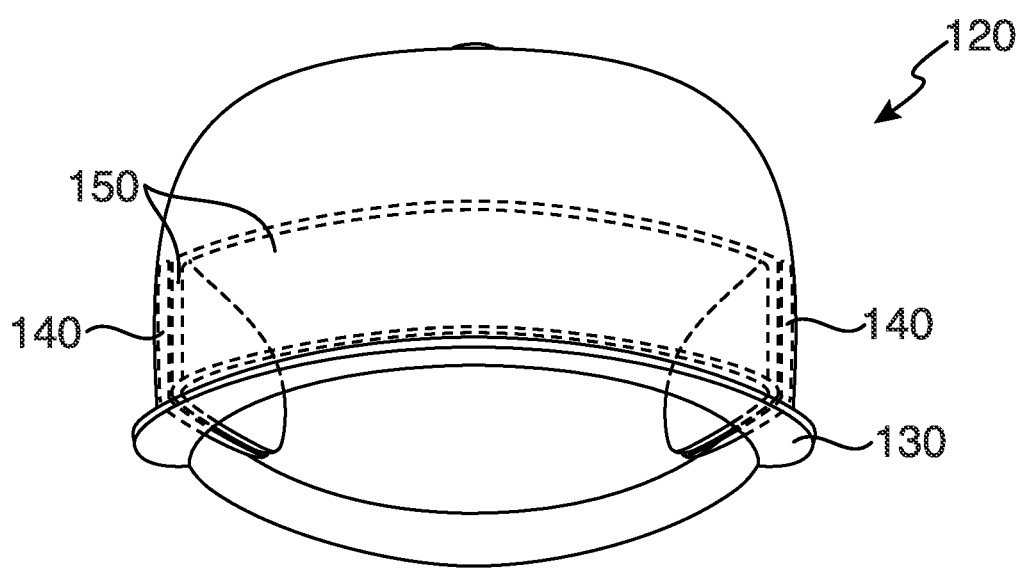
FIG. 7 illustrates one embodiment of a cap in accordance with the present invention.

FIG. 7 illustrates one embodiment of a cap in accordance with the present invention. A cap 120 generally illustrated, with a brim 130. As illustrated by the hashed lines, temple liner components 140 flank the sides of the hat on the inside of the hat, and a forehead and side head protection component 150 extends from a position approximately from the back of each ear all the way around the front of the forehead area in a horseshoe shape or design. In this embodiment, both the temple liner components and the forehead and side head liner component propositioned inside of the outer fabric of the cap. The cap may be made of any suitable fabric and, to reduce weight, may substantially be made of a mesh component which also will serve to reduce heat.

Figure 8:
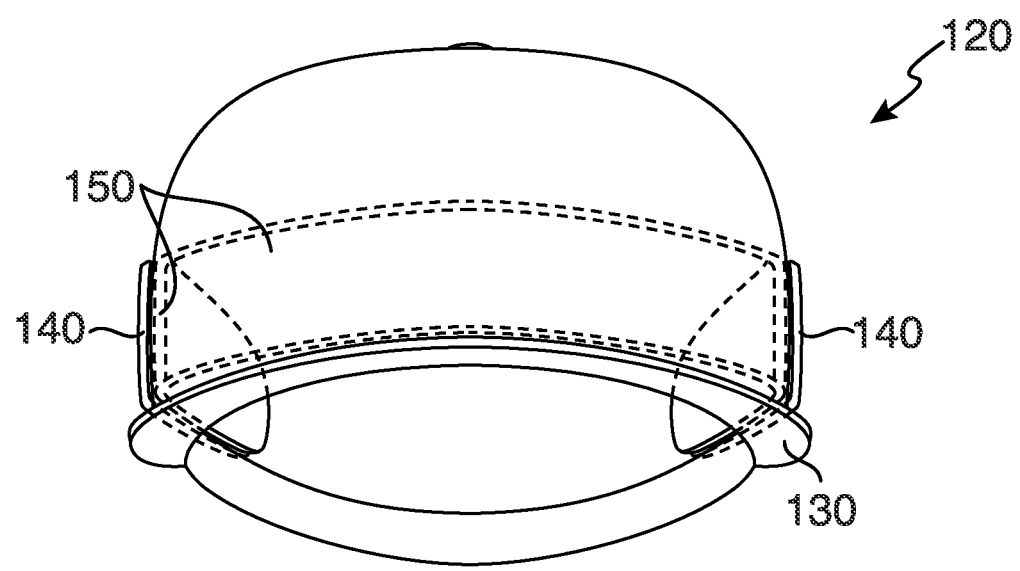
FIG. 8 illustrates another embodiment of a cap in accordance with the present invention.

FIG. 8 illustrates another embodiment of a cap in accordance with the present invention, wherein the cap is generally represented by element 120, the brim is designated by element 130, temple liner components 140 flank the sides of the hat on the outside of the hat, and a forehead and side head protection component 150, represented by the hashed lines on the inside of the hat, extends from a position approximately from the back of each ear all the way around the front of the forehead area in a horseshoe shape or design.

Figure 9:
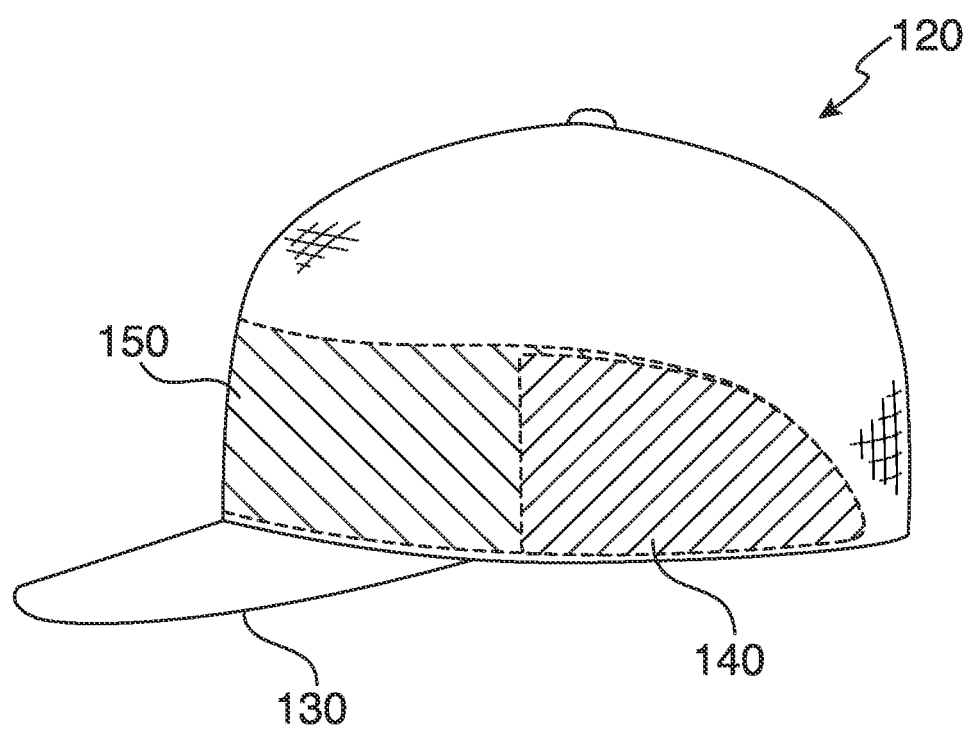
FIG. 9 illustrates a side view of a cap or hat in accordance with the present invention.

FIG. 9 illustrates a side view of a cap or hat, generally represented by element 120, wherein the brim is designated by element 130, temple liner component 140 represented by hashed lines flanks on one side of the hat (on the inside and/or on the outside) of the hat, and a forehead and side head protection component 150, represented by the hashed lines on the inside of the hat, extends from a position approximately from the back of an ear all the way around the front of the forehead area in a crescent or horseshoe shape or design.

Figure 10:
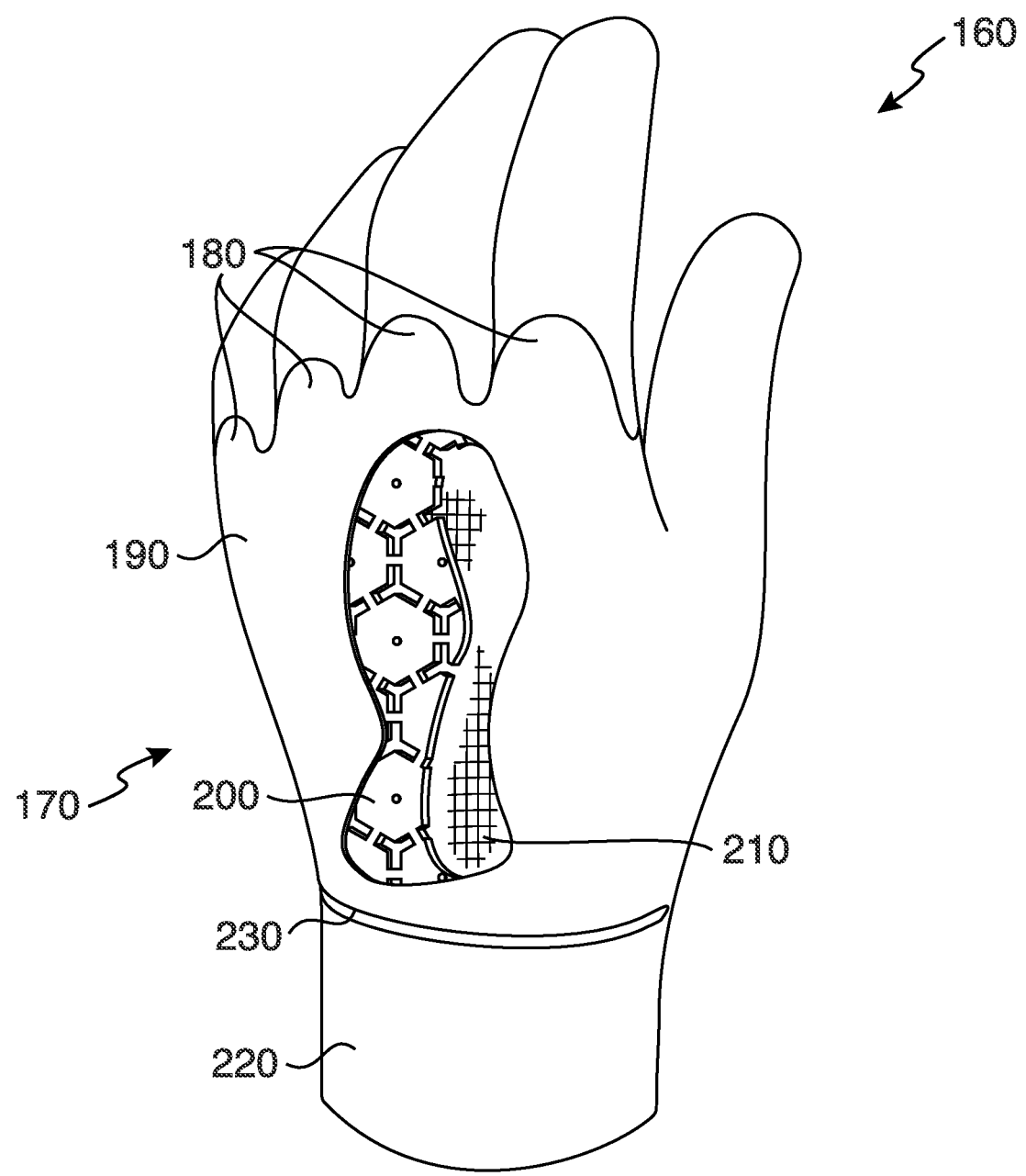
FIG. 10 illustrates an embodiment of a glove in accordance with the present invention.

FIG. 10 illustrates an embodiment of a glove 160 in accordance with the present invention. In the embodiment shown, the glove has a protection system that covers the back of the hand (generally shown by 170), and extends just beyond the knuckles 180 of four of the five fingers. The top layer of the protection system 190 may be made of any suitable material, such as leather or vinyl or it may be made of a waterproof polymer. Interconnected plate elements 200 are shown as positioned underneath outer layer 190, and between the outer layer 190 and the inner liner layer 210. As illustrated in this embodiment, the glove also includes a wrist protection system to 220, which also includes plate elements and an inner liner layer (not shown). Element 230 illustrates the scene of an opening of a compartment or pocket for inserting an additional protective element, such as an additional plate elements and/or liner element within the pocket. Alternatively, the pocket may be used for storage, for example storing money.

Figure 11:
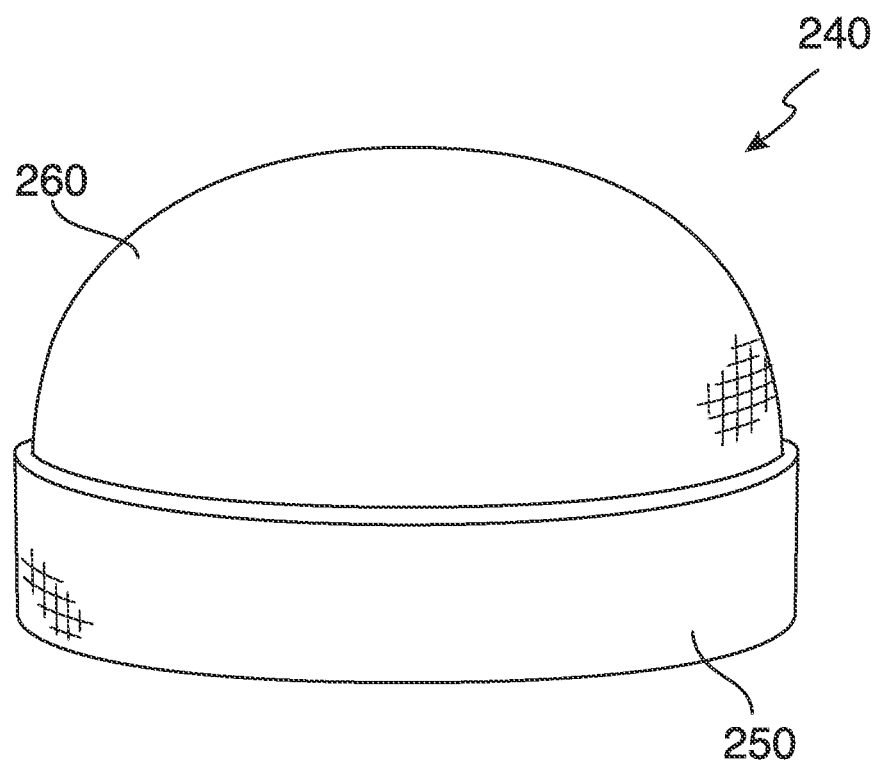
FIG. 11 illustrates an example of a protective skull hat in accordance with the present invention.

FIG. 11 illustrates an example of a protective skull cap or beanie (generally 240) in accordance with the present invention. As can be seen, in the embodiment shown, the protection system 250 (covered by outer fabric) extends all the way around the protective skull cap or beanie. However, it optionally may only extend around the front and side of the head to an area approximately in back of the ear so that it covers a part of the ear as well. The embodiment shown includes a fabric top 260 to the hat, but that element is merely optional, and when not present the article is in the shape and design of a head band. Another embodiment may be directed to a protection system that is incorporated into the top of the protective skull cap or beanie at area 260.

Figure 12:
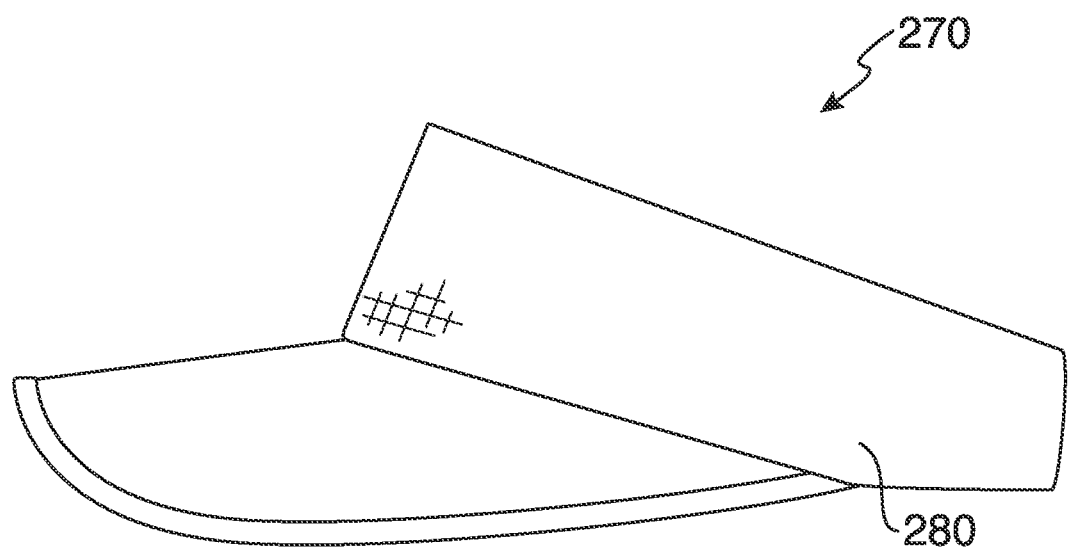
FIG. 12 illustrates an example of a visor in accordance with the present invention.

FIG. 12 illustrates an example of a visor (generally 270) in accordance with the present invention. As can be seen, in the embodiment shown, the protection system 280 (covered by outer fabric) extends all the way around the visor. However, it optionally may only extend around the front and side of the head to an area approximately in back of the ear so that it covers a part of the ear as well. Moreover, the protection system may be of a similar height around the circumference of the visor, or may have graduating or tapered heights around a portion or the entirety of the visor.

Figure 13B:
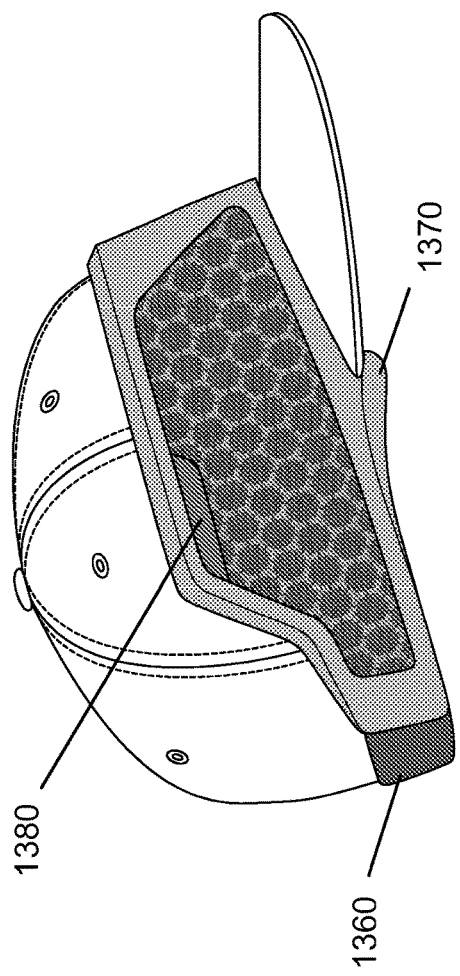
FIGS. 13A-13C illustrate an example of an over-hat head protection system that may be temporarily attached to a billed hat, where the front (FIG. 13A), one side (FIG. 13B), and the back (FIG. 13C) are shown.
Figure 13A:
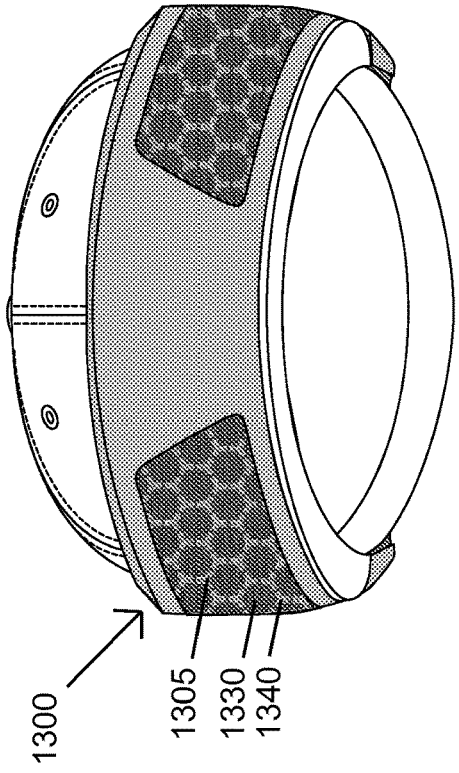
Figure 13C:
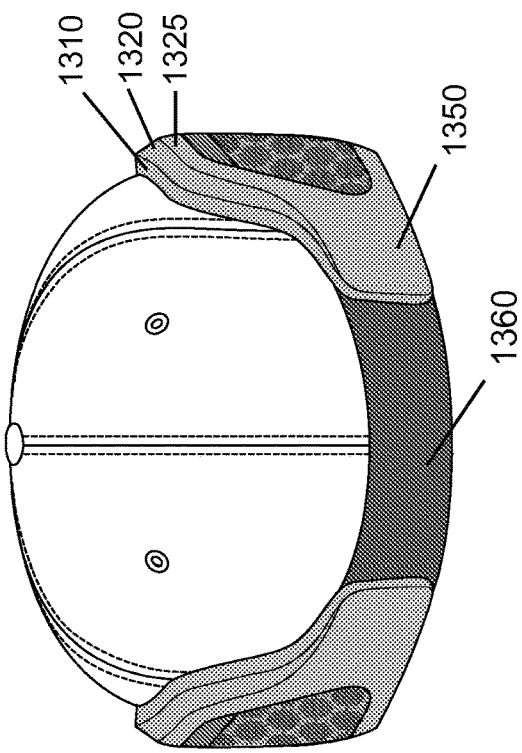

FIG. 13 illustrates an example of an over-hat band head protection system in accordance with the present invention (1300). As can be seen, in the embodiment shown, the protection system has two mesh windows (1305) on either side of the center line of the forehead section (FIG. 13A) that extend all the way towards the rear of the head and joined by a connector, preferably an elastic band (1360) as shown in the rear or back view (FIG. 13C). A notch (1370) at around the temple areas may hook onto the bill of a hat for more secure placement of the over-hat head protection system as shown in the side view in FIG. 13B. Moreover, the protection system may generally be of a similar height around the circumference of the band, or may have graduating or tapered heights around a portion or the entirety of the visor. The combination of layers may be identified in view of the series of chamfers, for example, the base liner (1310), an adjacent liner with a downward sloping chamfer (1320), another liner at the temple area of the head protection system (1325), a plate element (1330) that is visible through the mesh window (1305) composed of a mesh layer (1340), where except for the mesh windows, the combination of layers of the head protection system is covered by a hot melt film (1350).

Figure 14:
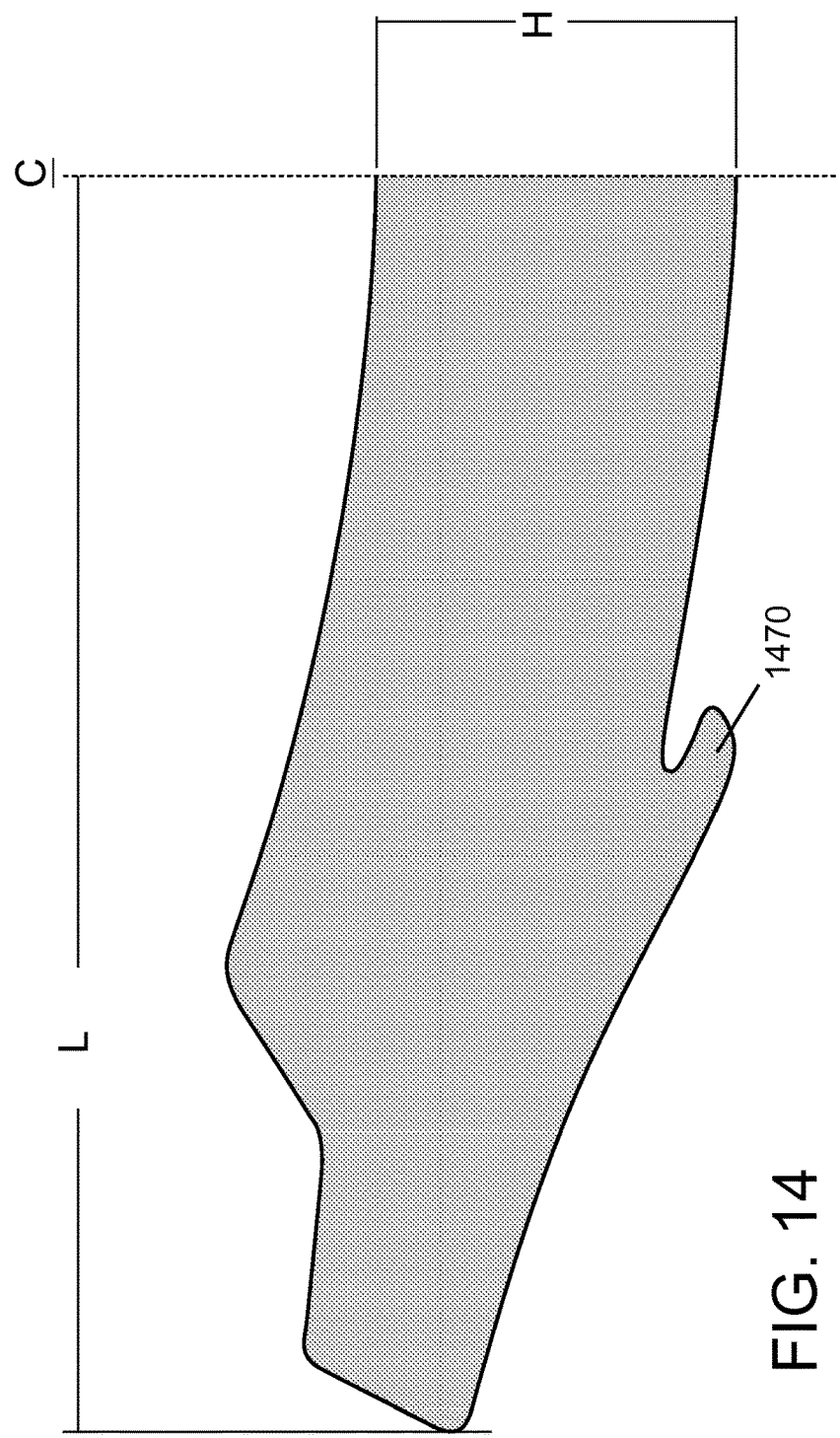
FIG. 14 illustrates a symmetrical half of the overall shape and size the over-hat head protection system of FIG. 13 from the center line (C), which represents the center of the forehead, to the portion of the head protection system that reaches towards the back of the head.

FIG. 14 illustrates the general shape and size of a side of the over-hat protection system of FIG. 13, where the length (L) of the side from the center line (C) of the forehead section is about 3.5 times the height (H). This shape also includes the notch (1470) that fits under the bill of a hat.

Figure 15D:
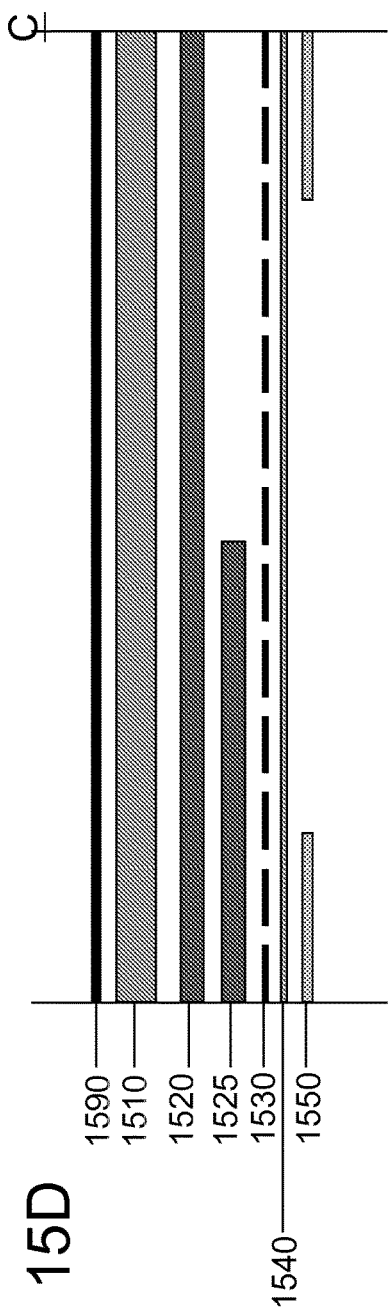
Figure 15F:
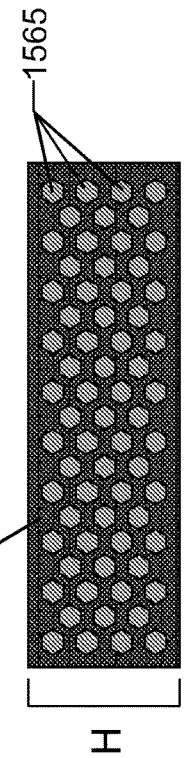
Figure 15E:
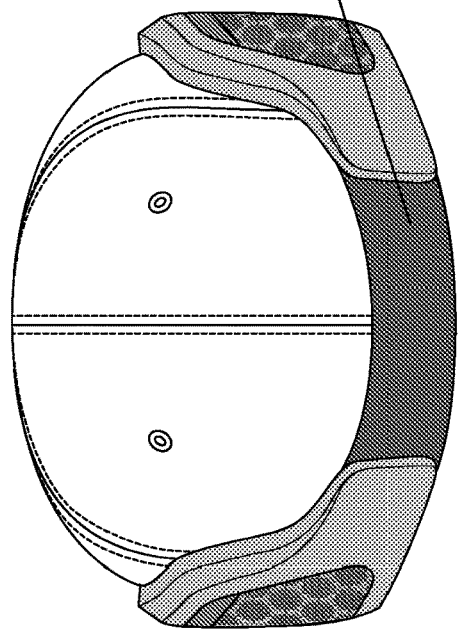

FIG. 15 illustrates the construction details of the over-hat head protection system of FIG. 13, where the center line (C) shows the point of symmetry for each side of the head protection system. A guideline (G) surrounds the plate element layer (1530) in FIG. 15A. The combination of layers of FIG. 15B shows X,X' which represents the cross section in FIG. 15C, where a base liner 1 (1510), a liner 2 (1520), a liner 3 (1525), a plate element (1530), a mono-mesh (1540), and a hot melt film (1550) comprise one exemplary over-hat head protection system. A screen print logo or graphic (1580) may be displayed with a hot melt film underlay in the mesh window (1505). FIG. 15D shows the layering details from the top, where the center line is at the forehead section. The textile (1590) may be the exterior hat textile or in another embodiment a fabric that forms a base of the combination of layers. FIG. 15E illustrates the rear or back view of the over-hat head protection system embodiment with an elastic band connector (1560) and FIG. 15F shows a detailed view of the interior side of the elastic band, where the elastic band has a height of about 32 mm and contains grips (1565) printed on the inside of the elastic band or equivalent friction bearing material to secure the over-hat head protection system in place. Although the grips may preferably be made of silicone and in the shape of a hexagon, any material that provides friction, any shape of the grip that provides sufficient surface area to make contact and provide traction, and any distribution pattern or number of grips may be contemplated as understood by one of skill in the art.

Figure 16A:
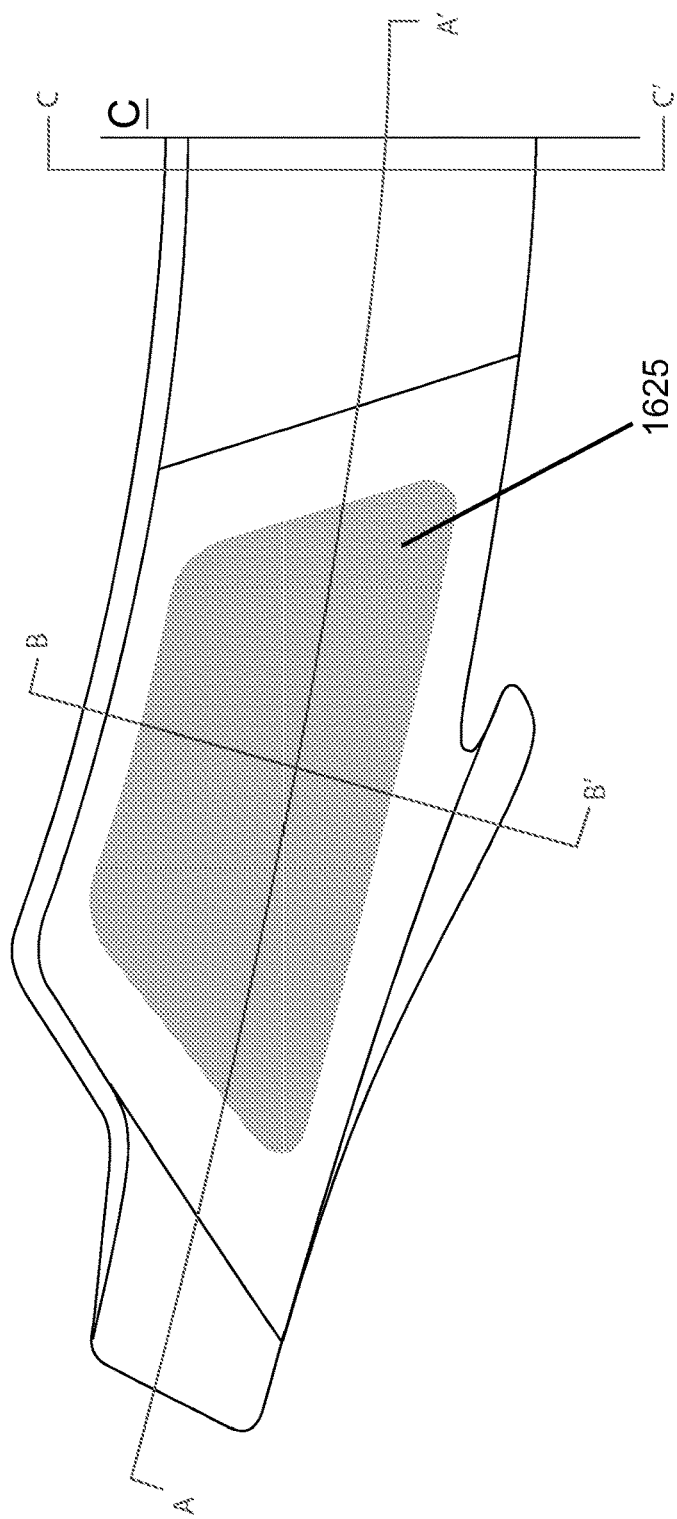

FIG. 16A illustrates liner layering and details, where A,A'; B,B'; and C,C' cross sections are detailed in FIGS. 16B, 16C, and 16D, respectively, where a plate element layer, optional mesh layer, and exterior material would be on top of the detailed liners. FIG. 16B shows the cross section A,A' from the center line of the forehead (C) to the sides, including the temple area, and the back end of the over-hat head protection system. The uppermost base liner 1 (1610) which is closest to the head or exterior of the hat has "V" notch flex channels (1615), i.e., siping, along the forehead and back side areas, with an exemplary width (W). Liner 2 (1620) is adjacent to liner 1 (1610) and liner 3 (1625) is adjacent to liner 2 where the temple or side of the head that needs additional impact protection is located. As can be seen, both ends of liner 3 (1625) are tapered downward, while liners 1 and 2 are only tapered at the back ends. FIG. 16C shows the B,B' cross-section of the liners at the temple region, where the base liner 1 (1610) has a horizontal top edge and bottom edge, liner 2 (1620), preferably has a top chamfer angle that is about 45° downward (i.e., in the clockwise direction) from liner 1, which represents 0°. The bottom chamfer of liner 2 preferably has an upward angle of about 60° (in the counter clockwise direction from liner 1 of 0°). FIG. 16D represents the C,C' cross section at the center line of the forehead section, where the base liner 1 (1610) has a horizontal top edge, liner 2 (1620), preferably has a top chamfer angle that is about 45° downward (i.e., in the clockwise direction) from liner 1, which represents 0°. The bottom chamfers of liners 1 and 2 preferably have an upward angle of about 150° (in the counter clockwise direction from an imaginary liner 1 horizontal line of 0°), or an upward angle of about 30° in the clockwise direction.

FIGS. 17A-17C show the liner patterns for the base liner 1 (1710), liner 2 (1720), and the temple impact zone liner 3 (1725) from the center line to the back end of the head protection system. In this embodiment of an over-hat head protection system illustrated in FIG. 13, liner 1 (FIG. 17A) and liner 2 (FIG. 17B) have the same pattern, including the notch (1770), and liner 3 (FIG. 17C) which is an additional liner that provides temple impact protection has a smaller pattern for the temple area.

FIGS. 18A-18C illustrate another over-hat head protection system (1800) embodiment with a mesh window on each side, where FIG. 18A shows the front view with a hot melt film (1850) over mesh (1840) and plate element (1830), where only the mesh windows (1805) are not covered by hot melt film. At the center line of the forehead section, a logo, graphic, or design may be applied (1882), for example by die cut in the hot melt film. FIG. 18B of a side view shows one continuous mesh window (1805), which is a mirror image of the other side (not shown). In addition to the die cut in film at the center line, FIG. 18B shows a graphic (1884) applied to an elastic band connector (1860) and a logo screen printed (1880) to a mesh window (1805). FIG. 18C shows a cross section view of a portion behind the ear area, i.e., without the additional temple protection, of the over-hat head protection system containing, preferably, a ⅜-inch liner (1810) or a ¼-inch liner (1820), or combinations thereof, a plate element layer (1830), and a mesh layer (1840), all within a pocket or pouch made of hot melt film (1850), and which has an optional interior band (1895), such as an elastic sweatband, that folds up around the perimeter of a portion of the hat (1890).

Figure 19B:
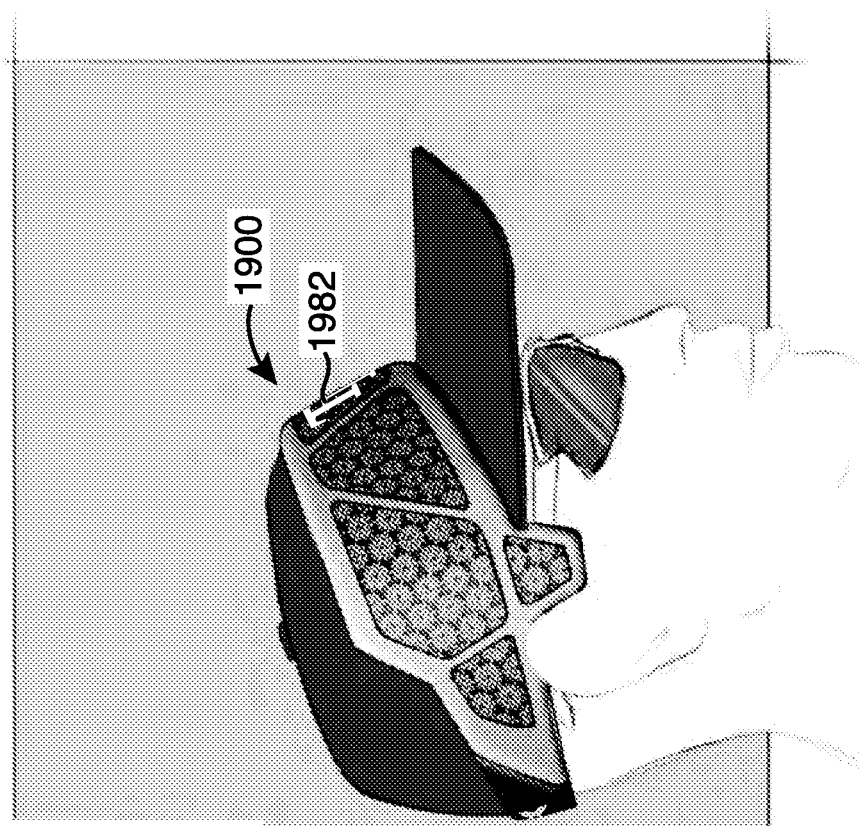
FIGS. 19A-19B illustrate an over-hat head protection system designed to have multiple mesh windows spanning the sides, including the sideburn area, and front, connected by an elastic band at the back, with a front view (A) and a side view (B).
Figure 19A:
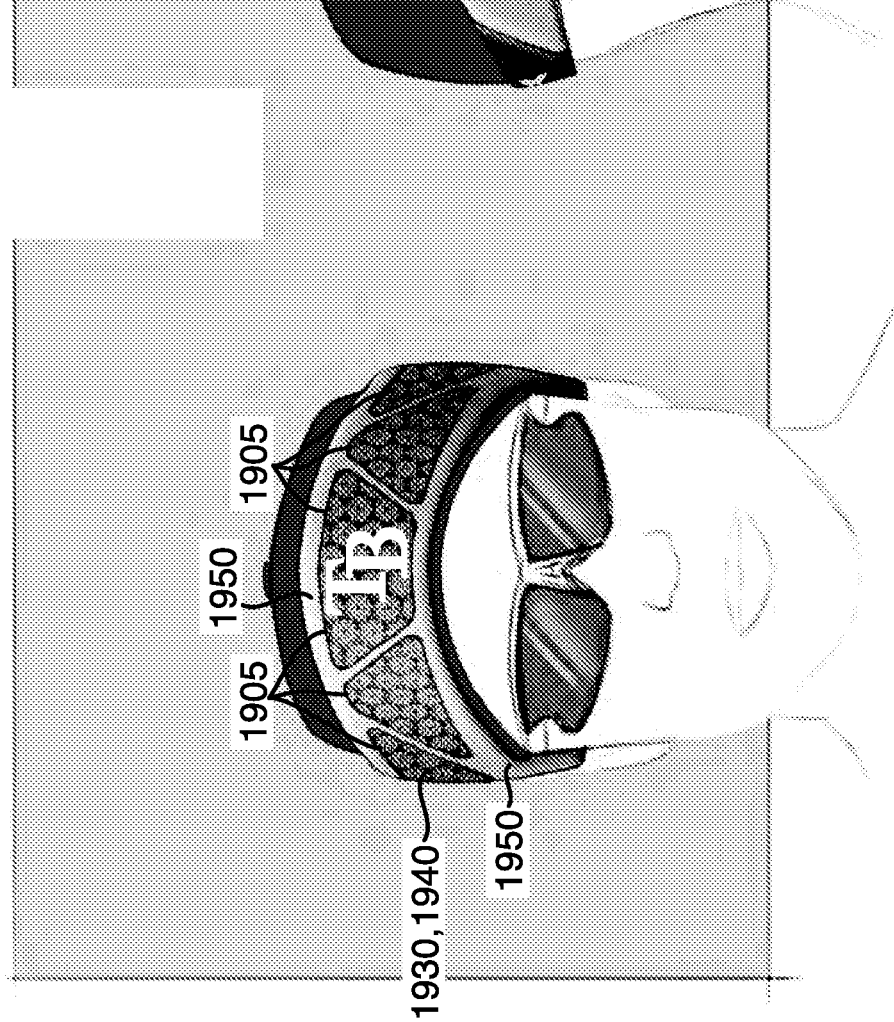

FIGS. 19A-19B illustrate another over-hat head protection system (1900) that has multiple mesh windows distributed across the system from the back sides, sideburns, and forehead areas. FIG. 19A shows a front view with multiple mesh windows (1905) and a logo made of hot melt film (1982) on the mesh (1940), where the mesh windows are bordered by hot melt film (1950). FIG. 19B shows a side view which also has mesh windows over the sideburn area, and the mesh windows display a mesh layer (1940) and a plate element layer (1930), where the liners are not shown.

FIGS. 20A-20C show a front view (FIG. 20A), a side view (FIG. 20B), and a back or rear view (FIG. 20C), where multiple mesh windows (2005) are symmetrically distributed around the over-hat head protection system (2000) except at the back which is connected by an elastic band (2060) and the forehead section where a logo, graphic, or design is placed at the center line of the head protection system (2082) by application to the hot melt film (2050). Another logo, graphic, or design placed on a portion of a mesh window on the side of a head protection system (2080), which may be applied by screen printing the logo on a hot melt film underlay.

FIGS. 21A-21C show a front view (FIG. 21A), a side view (FIG. 21B), and a back or rear view (FIG. 21C) of yet a further embodiment of an over-hat head protection system (2100). In this embodiment, parallel raised slats (2145) are distributed on the mesh windows (2105). The raised slats may be of varying lengths in order to fit on the mesh windows. FIG. 21A shows the forehead section that has a logo (2182) die cut in the hot melt film (2150). FIG. 21B shows that the raised slats (2145) also cover the sideburn area on the mesh window and a logo, graphic, or design (2180) may be placed on the "corner" of the head impact protection system between the forehead and side sections. An elastic band connector (2160) may be used to join the ends of the over-hat head protection system, which allows for the system to comfortably and securely fit on the hat, preferably without slippage.

FIGS. 22A-22C show a front view (FIG. 22A), a side view (FIG. 22B), and a back or rear view (FIG. 22C) of another embodiment of an over-hat head protection system (2200), where there are few hot melt film borders (2250) around the mesh windows (2205), and the arrangement of the various sections of mesh windows appear to form blocks that are angular. FIG. 22A shows the forehead section that has a logo (2282) die cut in the hot melt film (2250). FIG. 22B shows multiple mesh windows (2205) on the side of the head protection system, and a portion of the forehead section that has a logo (2282) die cut in the hot melt film (2250) or a logo, design, or graphic (2280) screen-printed or applied in another manner to the side section. Also, an elastic band connector (2260) of FIG. 22C may be used to join the ends of the over-hat head protection system, which allows for the system to comfortably and securely fit on the hat, preferably without slippage.

FIGS. 23A-23C show a front view (FIG. 23A), a side view (FIG. 23B), and a back or rear view (FIG. 23C) of different embodiment of an over-hat head protection system (2300) that has an extended sideburn area and where the forehead to side sections have a significant downward slope. The mesh windows (2305) make up each of the sections of the head protection system, i.e., the forehead and sides, while an elastic band (2360) shown in the rear view (FIG. 23C) connects the mesh windows of the back ends. The front (FIG. 23A) and side (FIG. 23B) views show the entire forehead section (2355) that is made of a single mesh window with a logo, graphic, or design imprinted, embroidered, or affixed in an equivalent manner (2382), while the side (2342), including temple (2344), head protection system also comprises a single mesh window (2305) with a logo, graphic, or design imprinted (2380).

Figures 24A, 24B, 24C:
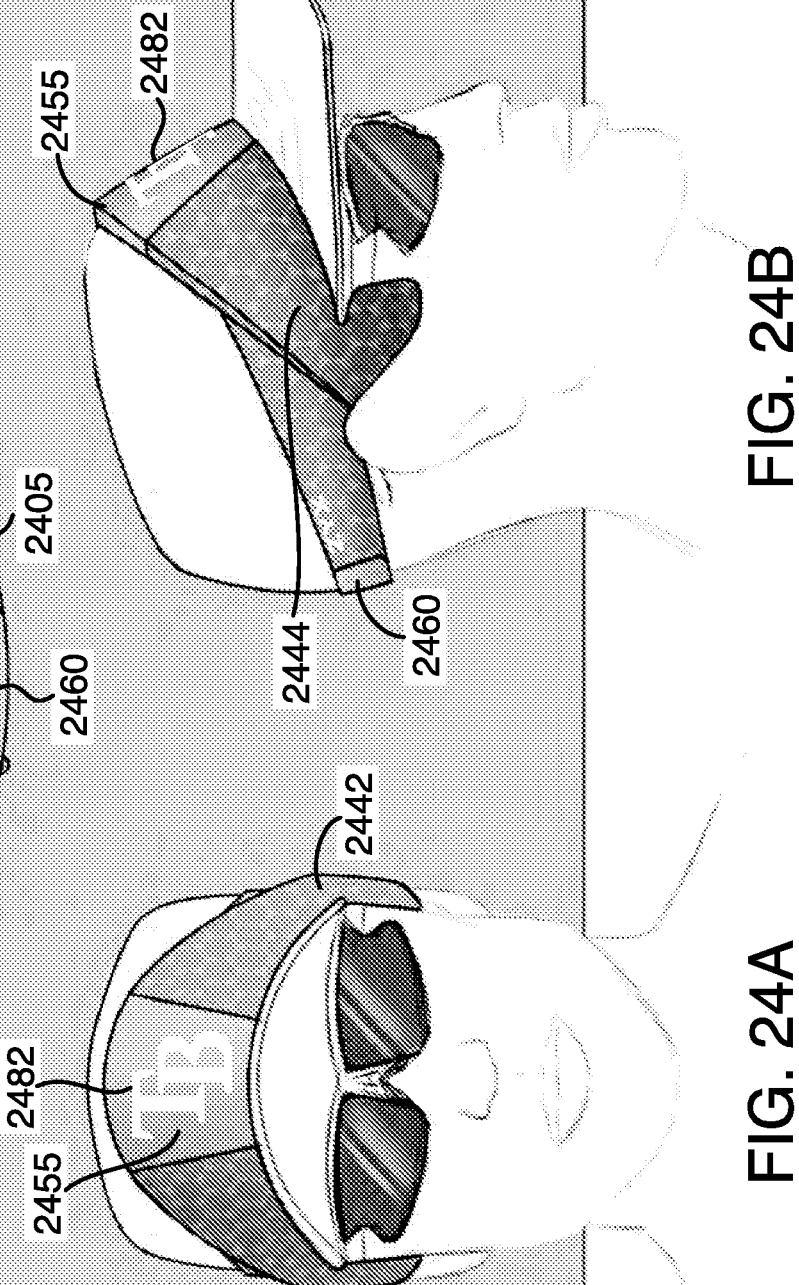
FIGS. 24A-24C illustrate an over-hat head protection system designed to have mesh windows throughout the system, except for the back connector, which may be an elastic band, buckle, hook-and-loop fastener, or combinations, or the like and a portion of the forehead that has a graphic, with a front view (A), a side view (B), and a back view (C).

FIGS. 24A-24C show a front view (FIG. 24A), a side view (FIG. 24B), and a back or rear view (FIG. 24C) of another embodiment of an over-hat head protection system (2400) that has an extended sideburn area and where the forehead to side sections have a significant downward slope. The mesh windows (2405) make up each of the sections of the head protection system, i.e., the forehead (2455) and sides (2442), including temple region (2444), while a connector (2460) of a hook-and-loop fastener through a buckle shown in the rear view (FIG. 24C) does not have a mesh window, rather the connector joins the mesh windows of the back ends of the head protection system. The front (FIG. 24A) and side (FIG. 24B) views show the entire forehead section (2455) that is made of a single mesh window with a logo, graphic, or design imprinted (2482) while the side (2442), including temple (2444), head protection system also comprises a single mesh window (2405).

FIGS. 25A-25C show a front view (FIG. 25A), a side view (FIG. 25B), and a back or rear view (FIG. 25C) of a further over-hat head protection system (2500) embodiment that has an extended sideburn area and where the forehead to side sections do not have a significant downward slope, but have essentially the same, about the same, or a slightly increasing height. Multiple mesh windows (2505) covering the sides (2542), including the temple (2544) and sideburn areas, and forehead (2555) may be connected by a connector (2560) of an elastic band that has a buckle or D-ring closure allowing for adjustments to the circumference of the head protection system for securing the system to a user's head. The entire forehead section (2555) may have a single mesh window with a, for example, hot melt film logo, graphic, or design imprinted (2582) and the borders between the mesh windows may be a hot melt film (2550).

FIGS. 26A-26C show a front view (FIG. 26A), a side view (FIG. 26B), and a back or rear view (FIG. 26C) of a detachable or temporarily attachable over-hat head protection system (2600) which utilizes elastic webbing connectors (2660) to attach to the user's head and hat. The elastic bands extend from the front of the head protection system at the forehead (2655) over the top or crown area of the head or hat, and connects the sides (2642) from the front and sides to the back section at two points (i.e., the top and the lower sections of the sides) forming a cage-like design, where the elastic webbing may be attached by sewing, gluing, adhering, or affixing in a similar manner to the forehead (2655) and sides (2642), including temples (2644).

FIGS. 27A-27C show a front view (FIG. 27A), a side view (FIG. 27B), and a back or rear view (FIG. 27C) of a removable over-hat head protection system (2700), which utilizes elastic webbing connectors (2760) to attach to the user's head and hat. A hook-and-loop fastener connector (2760a), shown in a closed position, may be used to attach the side portions at the back ends, while elastic webbing connectors (2760b) may attach a side section (2742) that includes the temple (2744) and ear covering (2746) sections, where the ear covering provides ear protection while allowing the wearer to still hear. A logo, design, or graphic (2782), for example, a hot melt film, logo may be applied to the forehead (2755) section or the side sections (2742) of the over-hat head protection system.

FIGS. 28A-28C show a front view (FIG. 28A), a side view (FIG. 28B), and a back or rear view (FIG. 28C) of an over-hat head protection system (2800) designed to removably or temporarily attach to a user's head and hat through elastic webbing (2860), where the elastic webbing connects all of the sections of the head protection system and a back section with sufficient gaps in between the sections such that the system fits over the user's head and hat and fits comfortably around the head. The mesh windows (2805) showing the plate element (2830) and mesh (2840) layers covers a significant portion of the forehead (2855), sides (2842), including temple (2844), sideburn, and ear (2846) areas, and back of the head (2848), where the ear areas have an opening in the layers, except for the elastic webbing, thereby allowing the user to hear. The forehead (2855) and side (2842) sections may have a logo, design, or graphic (2882) printed on the outermost layer.

FIGS. 29A-29C show a front view (FIG. 29A), a side view (FIG. 29B), and an expanded view (FIG. 29C) of an over-hat head protection system (2900) designed to temporarily attach to a user's head and hat by encircling the forehead (2955), sides (2942), and back (2948) of the head connected by a hook-and-loop fastener connector (2962, 2964) attached to the outermost layer (i.e., the mesh layer), which may also have a logo, graphic, or design printed (2982). This embodiment covers a significant portion of the forehead (2955), sides (2942), including temples (2944) and sideburns, and back (2948) of the head, where the different sections have chamfers on the edges such that their placement allows the over-hat head protection system to lay flat and when joined, provide contouring to surround the circumference of a user's head or hat.

FIGS. 30A-30B show a front view (FIG. 30A) and a side view (FIG. 30B) of an exterior hat-incorporated head protection system designed on the exterior of a user's hat, covering the forehead (3055) and sides of the head (3042), where the layers of the head protection system are sewn onto the exterior of the hat by a stitch and turn seam along the top edge of the forehead section (3055), preferably first when manufacturing, and a top stich around the curved section at the back of the sides (3048), preferably second when manufacturing. The mesh windows (3005) show the plate element (3030) and mesh (3040) layers underneath, and the outermost layer, such as for example, hot melt film (3050) covering the forehead (3055) and sides (3042) of the head protection system forming the border of the mesh windows may have a logo, graphic, or design (3082) die cut in in the film.

FIGS. 31A-31C show a front view (FIG. 31A), a side view (FIG. 31B), and a cross section view of a siped liner (FIG. 31C) of an exemplary exterior hat-incorporated head protection system designed on the exterior of a user's hat, covering the forehead (3155) and sides of the head (3142), including the temple region (3144), where the layers of the head protection system are sewn in a pouch onto the exterior of the hat by top stitching around the perimeter (3158) of the system that contacts the hat. The outermost layer (3150) may be any material, including but not limited to, hot melt film, a synthetic leather, a woven fabric, polyester, nylon, and the like, for this and any of the described embodiments. FIG. 31B of the side section (3142) that has a single mesh window (3105) shows the underlying plate element (3130) and mesh (3140) layers, but the further underlying liner(s) are not shown. FIG. 31C shows a view of a liner with siping or "V" notch flex channels (3115), where the channels allow for contouring around the user's head or hat.

FIGS. 32A-32D show a front view (FIG. 32A), a side view (FIG. 32B), a cut out view of the layer of the front and side sections (FIG. 32C), and an view of the side section, including the sideburn portion (FIG. 32D) of an integrated hat head protection system designed on the interior of a user's hat, covering the forehead (3255) and sides of the head (3242), where the layers of the head protection system are integrated into the hat such that the hat textile covers all of the layers of the head protection system. FIGS. 32A and 32B show the forehead (3255) and side (3242) sections, which have a logo, design, or graphic located thereon, for example, a logo on the forehead at the center line (3282), on the top edge of the side section (3280), and on the sideburn area of the side section (3284). FIG. 32C shows a mesh layer (3240) covering a plate element (3230) that spans liner(s) underneath (not shown). FIG. 32D shows a detailed view of the sideburn (3284) interior, where an interior material (3295), such as for example an elastic band, a sweatband, a combination, or the like, may be a layer at the bottom edge of the head protection system in the integrated hat head protection system. The bill of the hat has essentially same dimensions as that of a hat without the head protection system integrated into the hat. Moreover, the design of this embodiment minimizes the bulk of the combination of layers.

Figures 33A, 33B:
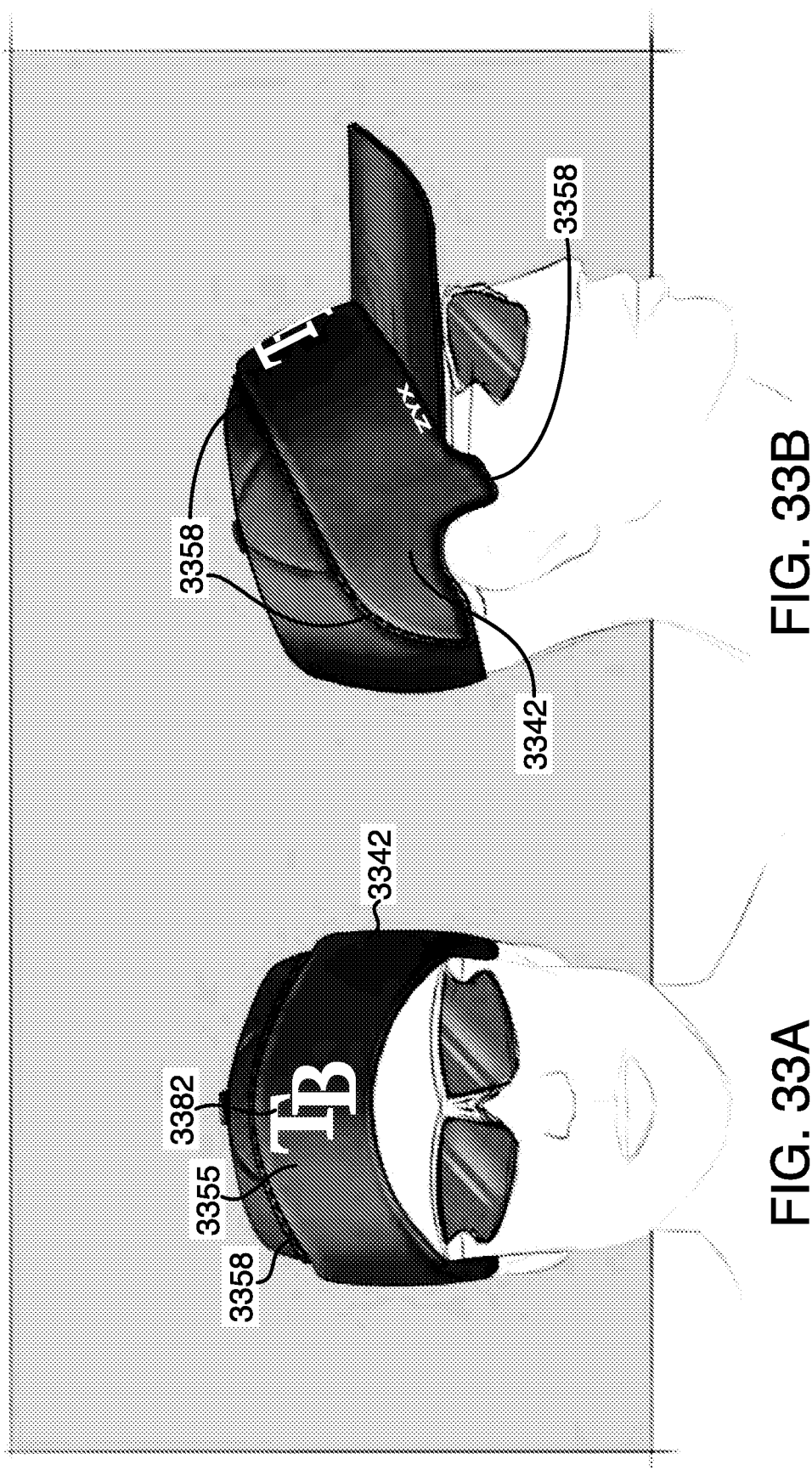
FIGS. 33A-33B illustrate an integrated hat head protection system designed on the exterior of a user's hat, covering the forehead and sides of the head, where the layers of the head protection system are integrated into the hat such that the layers of the head protection system are held in a pocket on the hat exterior, where a hat textile covers all of the layers of the head protection system. A front view (A) and a side view (B) show stitching along the perimeter of the pocket that contacts the hat.

FIGS. 33A-33B show a front view (FIG. 33A) and a side view (FIG. 33B) of an integrated hat head protection system designed on the exterior of a user's hat, covering the forehead (3355) and sides (3342) of the head. The layers of the head protection system are integrated into the hat such that the layers of the head protection system are held in a pocket on the hat exterior and the bulk of the combination of layers are preferably minimized. A hat textile covers all of the layers of the head protection system, thereby integrating the head protection system into the hat. Stitching along the perimeter of the pocket (3358) holding the combination of layers integrates the head protection system into the hat, where the dimensions of the bill of the hat are not compromised.

Figure 34A:
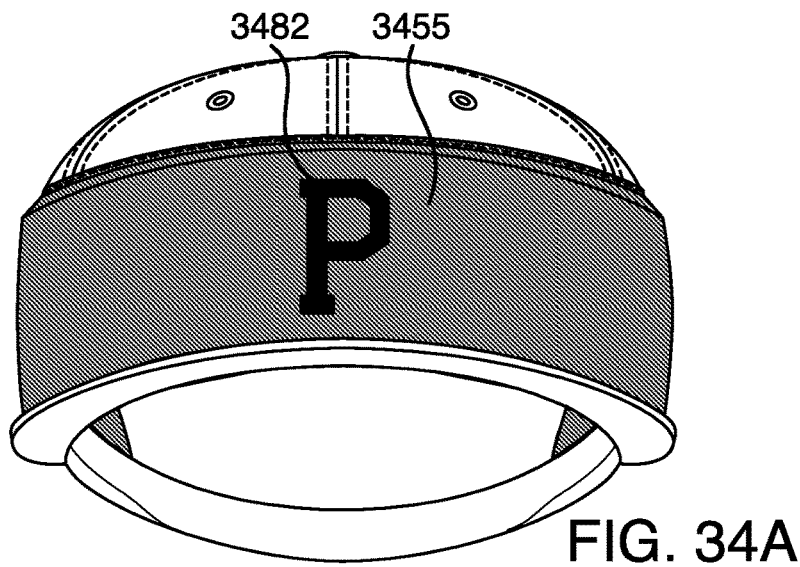
FIGS. 34A-34C illustrate an example of an in-hat head protection system that comprises layers on the interior and exterior of a billed hat.
Figure 34B:
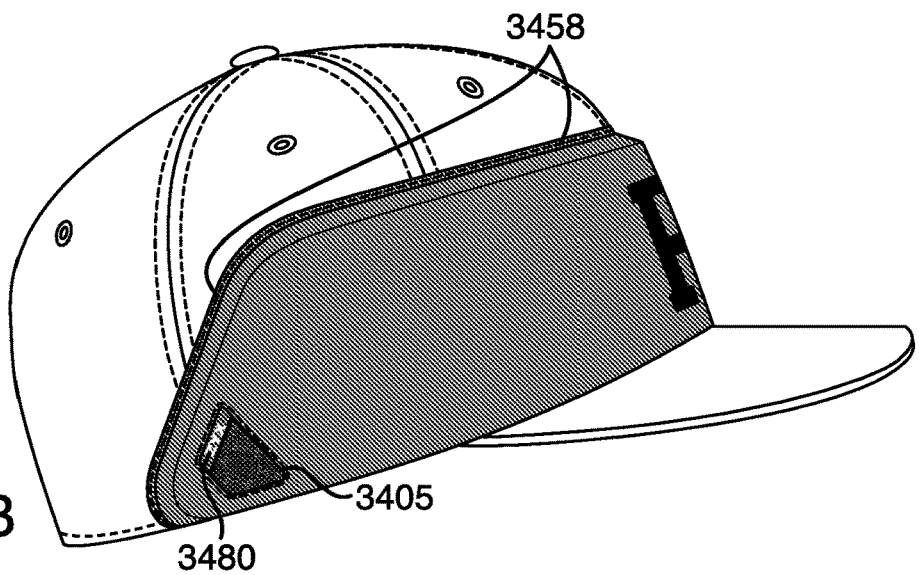
Figure 34C:
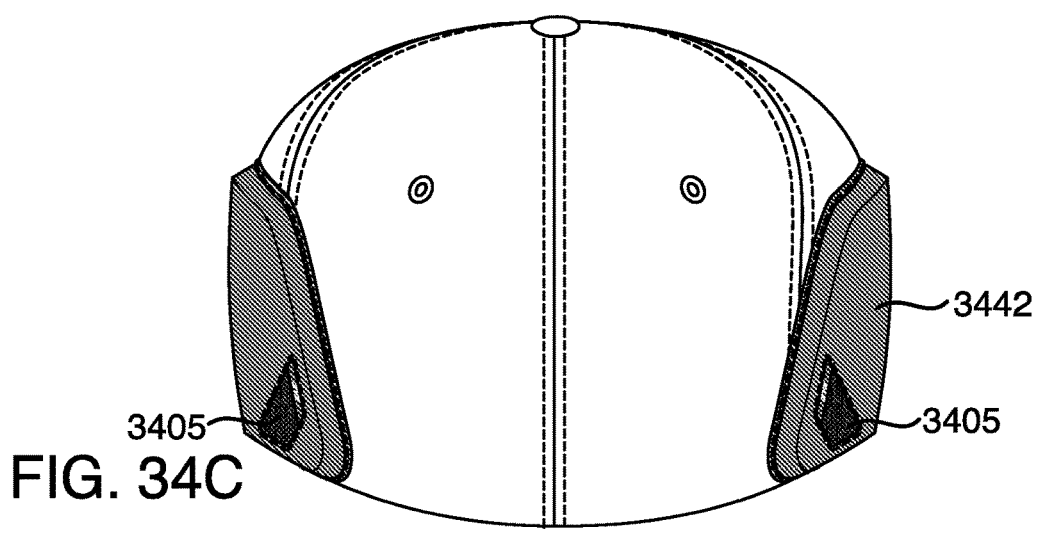

FIGS. 34A-34C show a front view (FIG. 34A), a side view (FIG. 34B), and a back or rear view (FIG. 34C) of an example of an in-hat head protection system that comprises layers on the interior and exterior of a billed hat. The forehead section (3455) may have a logo, graphic, or design (3482), while the side sections (3442) may have a mesh window (3405) displaying a mesh layer (3440) covering a plate element layer (3430), and containing a logo, graphic, or design printed on the mesh window (3480). The top edge along the forehead and side sections may have stitching (3458) to the hat forming the exterior portion of the in-hat head protection system.

Figure 35:
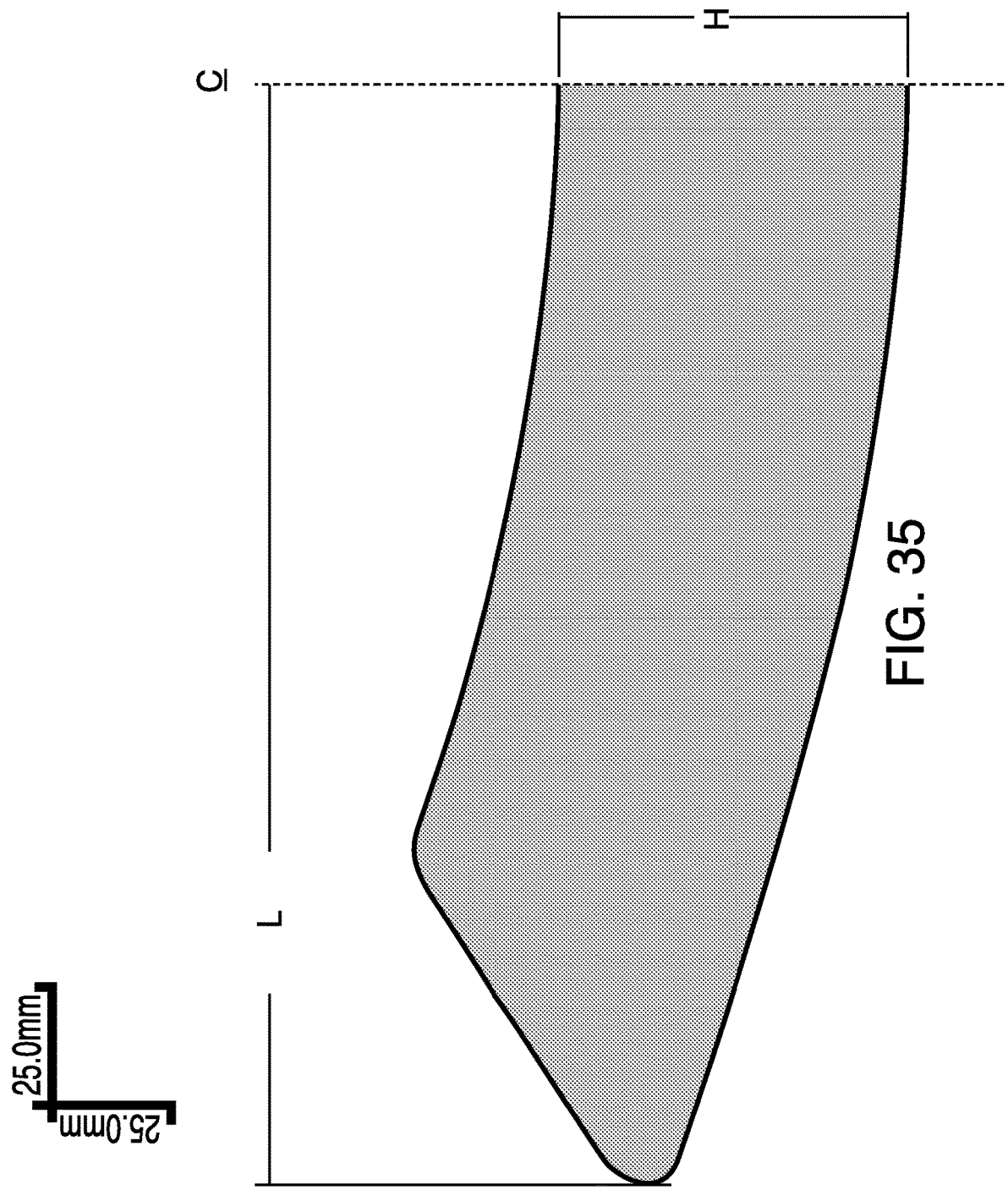
FIG. 35 illustrates a symmetrical half of the overall shape and size of the in-hat head protection system of FIG. 34 from the center line (C), which represents the center of the forehead, to the portion of the head protection system that reaches towards the back of the head.

FIG. 35 illustrates a symmetrical half of the overall shape and size of an in-hat head protection system of FIG. 34 from the center line (C), and having a height (H) of about 74 mm and a length (L) from the center line to the back end of about 232 mm. The length is preferably about 3 times the height.

Figure 36C:
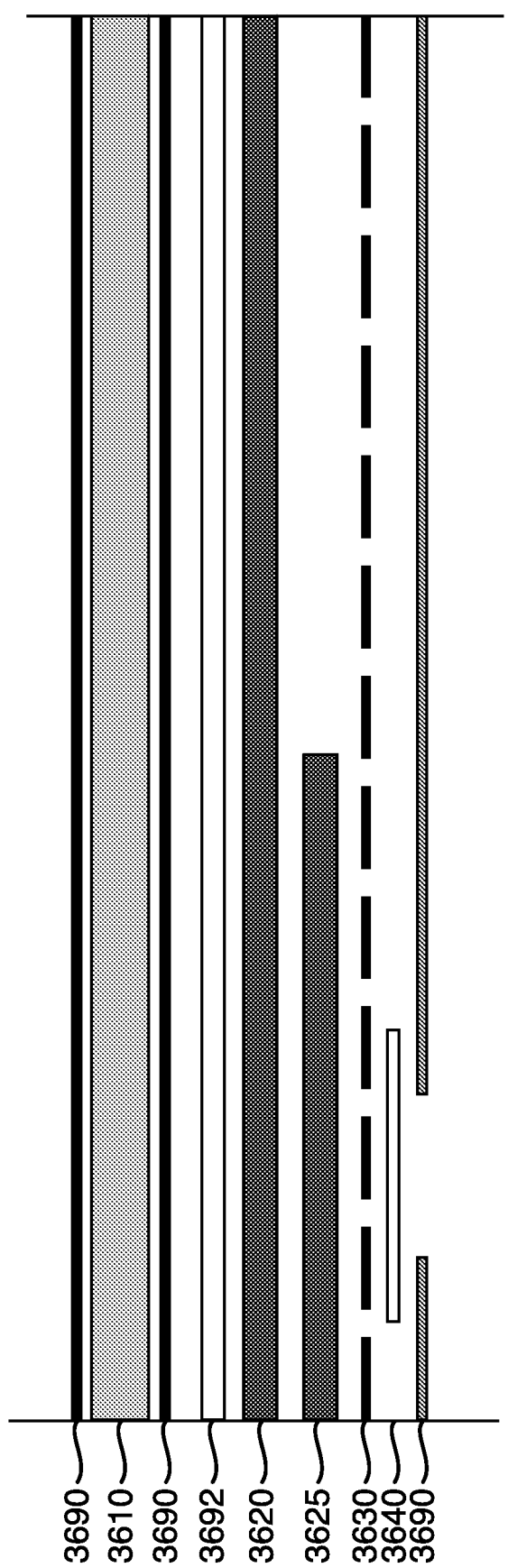

FIGS. 36A-36C illustrates the construction details of the in-hat head protection system of FIG. 34, where the center line (C) shows the point of symmetry for each side of the head protection system. A guideline (G) borders the interconnected plate element layer (3630) is shown in FIG. 36A, while FIG. 36B shows the head protection system covered by, for example, a textile (3690) with the exception of where a mesh window (3605) containing a logo, design, or graphic (3680) screen printed on a hot melt film underlay is located. A flange, rim, or ridge with stitching (3658) is shown along the top edge of the forehead and side sections where the center line (C) is the middle of the forehead section. FIG. 36C shows the combination of layers for the in-hat head protection system comprising a textile (3690), a base liner 1 (3610), another textile layer (3690), the hat (3692), a liner 2 (3620), a liner 3 (3625) at the temple regions of the side section, a plate element layer (3630), a mono-mesh (3640), and an exterior textile (3690) which essentially covers the entire combination of layers of the in-hat head protection system with the exception of mesh windows (3605).

Figure 37A:
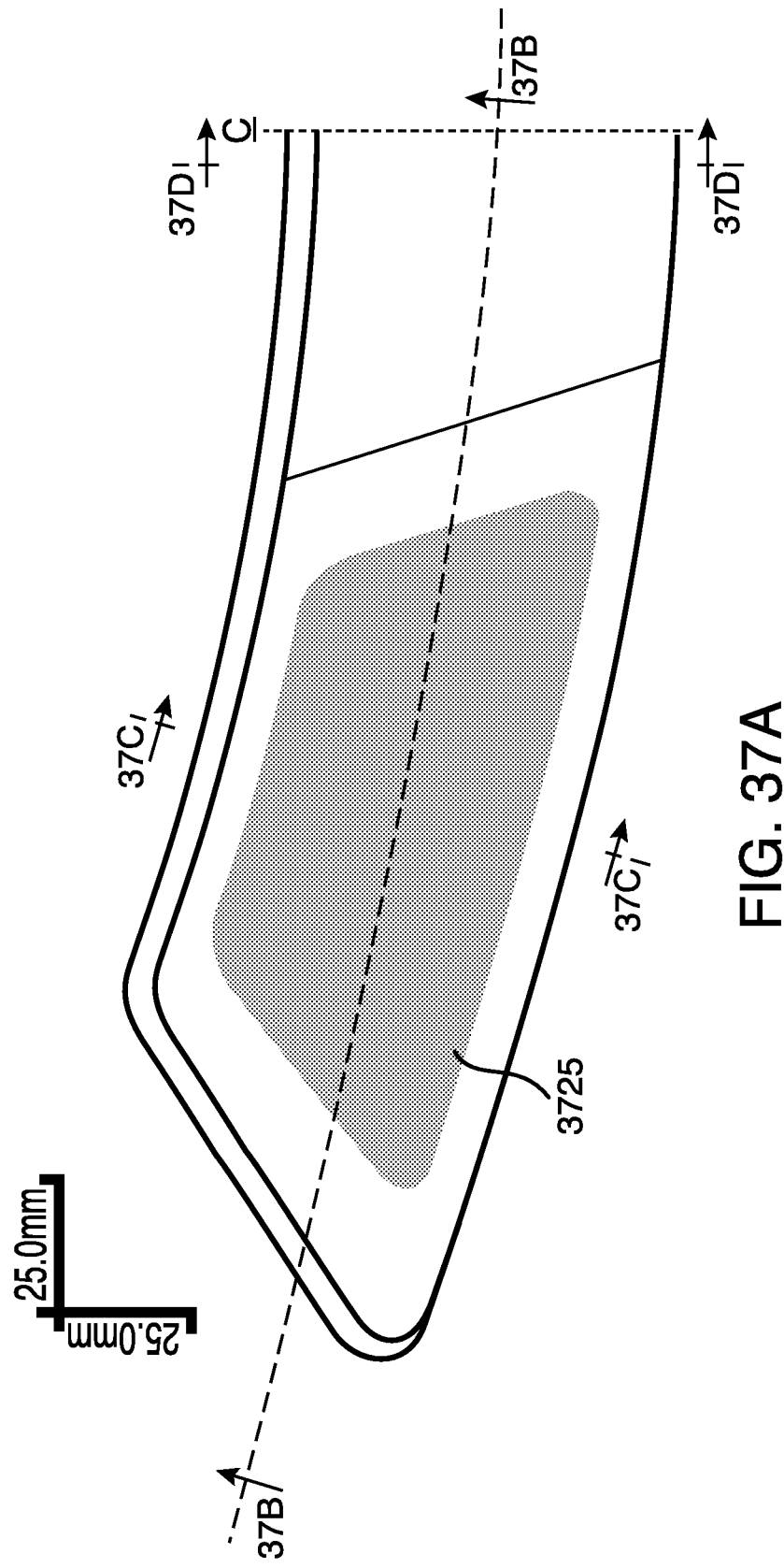

FIGS. 37A-37D illustrate the liner or foam details of the in-hat head protection system of FIG. 34, where cross sections are detailed in FIGS. 37B, 37C, and 37D, respectively. FIG. 37B shows the horizontal cross section from the center line of the forehead to the sides, including the temple area, and the back end of the over-hat head protection system. The uppermost base liner 1 (3710) which is on the interior of the hat is closest to the head has "V" notch flex channels (3715), i.e., siping, along the forehead area. Liner 2 (3720) is on the exterior of the hat and is adjacent to liner 3 (3725) at the temple or side of the head sections that need additional impact protection. As can be seen, both ends of liner 3 (3725) are tapered downward, while liners 1 and 2 are only tapered at the back ends. FIG. 37C shows the vertical cross-section of the liners at the temple region, where the base liner 1 (3710) has a horizontal top edge and bottom edge, liner 2 (3720), preferably has a top chamfer angle (T) that is about 45° downward (i.e., in the clockwise direction) from liner 1 (3710), which represents 0°. The bottom chamfer of liner 2 (3720) preferably has a horizontal bottom edge. FIG. 37D represents the vertical cross section at the center line (C) of the forehead section, where the base liner 1 (3710) has horizontal top and bottom edges, liner 2 (3720), preferably has a top chamfer angle (T) that is about 45° downward (i.e., in the clockwise direction) from liner 1, which represents 0°. The bottom chamfer angle (B) of liner 2 preferably has an upward angle of about 150° (in the counter clockwise direction from the horizontal edge of 0° of liner 1), or an upward angle of about 30° in the clockwise direction.

Figure 38A:
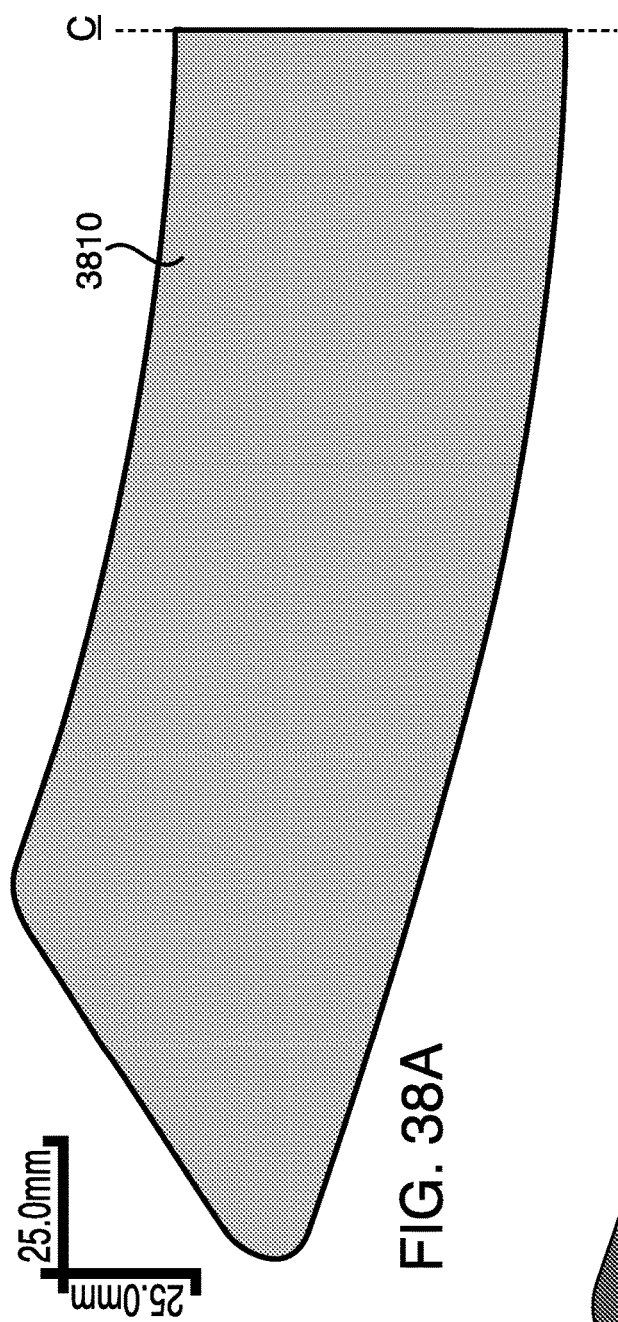
FIGS. 38A-38C illustrate the liner or foam patterns for the in-hat head protection system of FIG. 34.
Figure 38B:
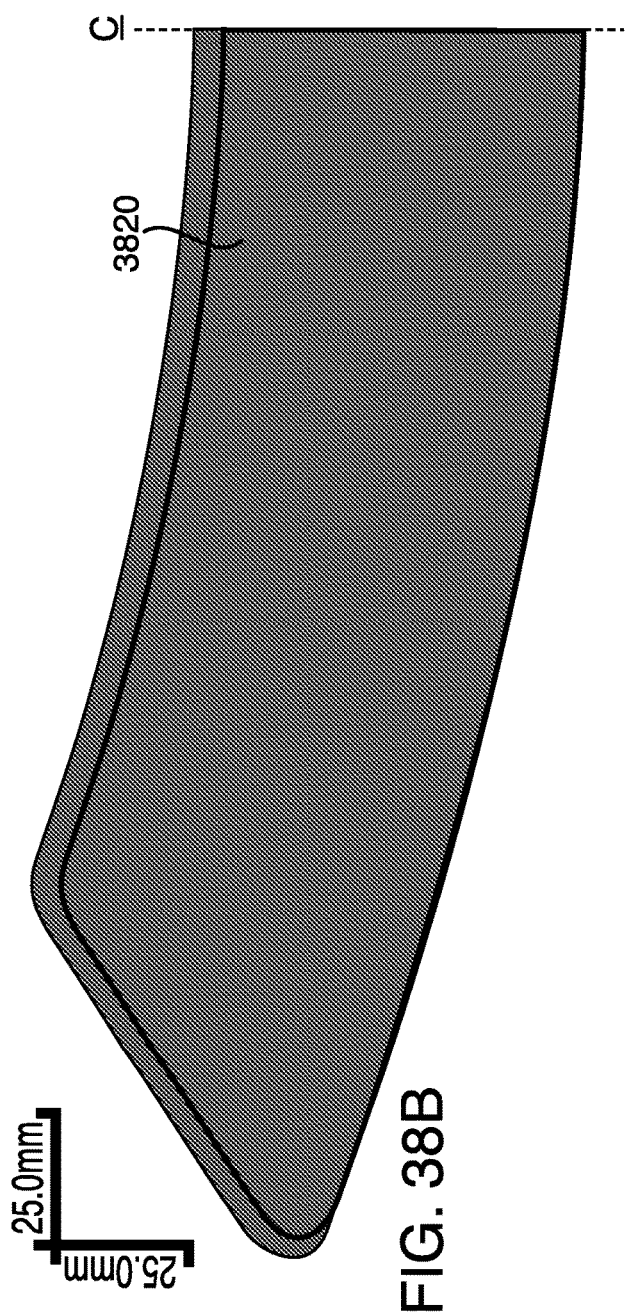
Figure 38C:
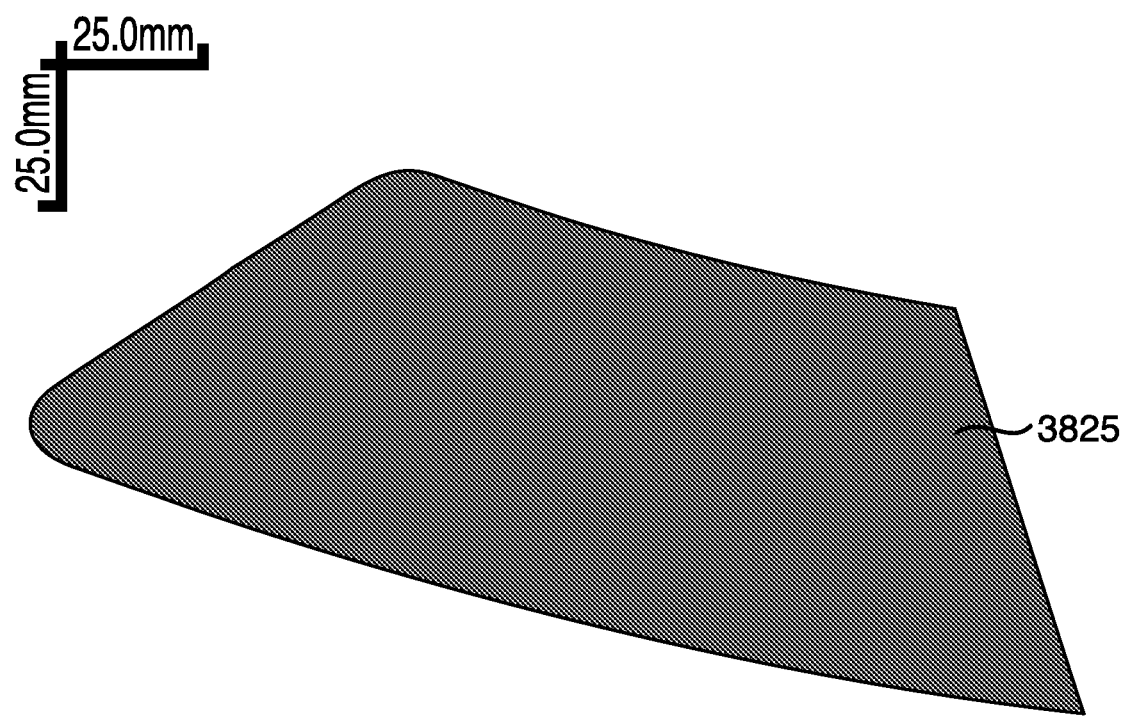

FIGS. 38A-38C show the liner patterns for the base liner 1 (3810), liner 2 (3820), and the temple impact zone liner 3 (3825) from the center line (C) to the back end of an in-hat head protection system of FIG. 34. In this embodiment of an in-hat head protection system illustrated in FIG. 34, liner 1 (FIG. 38A) and liner 2 (FIG. 38B) have the same general pattern, and liner 3 (3825) (FIG. 38C), which is an additional liner exterior to the combination of liners (3810) and (3820) that provides additional temple impact protection has a smaller pattern specific for the temple area.

FIGS. 39A-39B show the construction of an in-hat head protection system of FIG. 34. FIG. 39A shows a front view where a cross section at the center line of the forehead section which depicts FIG. 39B. FIG. 39B shows the construction of the in-hat head protection system at the center line cross section, where a hat (3992) is in-between the interior portion comprising a base liner 1 (3910) covered by, for example, a textile (3990), where at the bottom edge of the interior part of the hat adjacent to the textile covered liner 1 (3910) is a material, for example, an elastic sweatband (3995) that may be attached to the textile covering the base liner 1, to a bottom edge of the hat (3992), or to an edge of the bill of a hat (3994). The exterior portion comprises a textile pocket (3990) containing a combination of layers of a liner 2 (3920) and a plate element layer (3930) at the forehead section (3955) with an optional logo, design, or graphic (3982).

Figure 40:
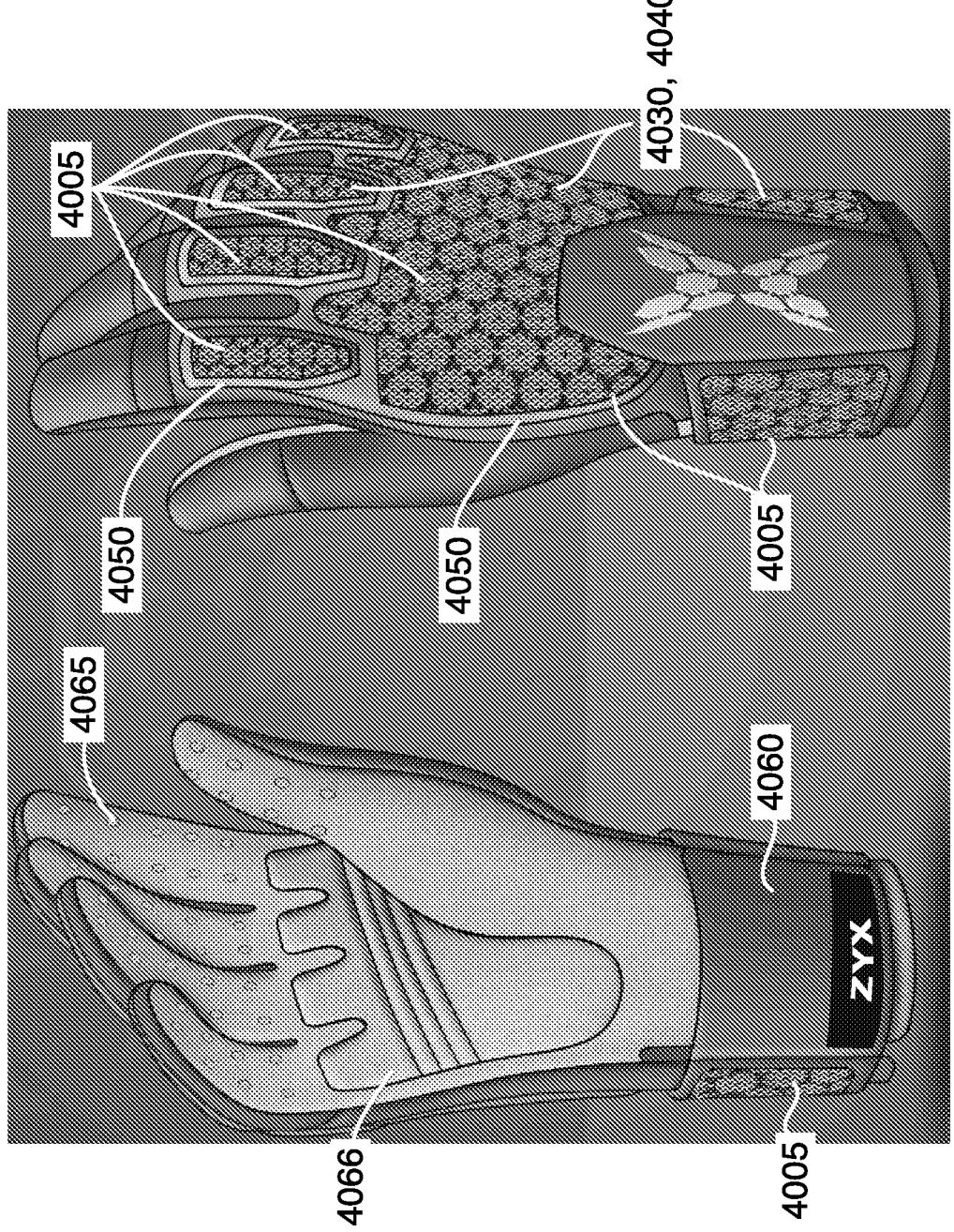
FIG. 40 illustrates gloves of a hand protection system, where the protection layers are positioned at areas of the knuckles, back of hand, and wrist. Mesh windows show the plate elements, while tear resistant hot melt film border the protection layers holding them in place. At the wrist area, a cuff with a hook-and-loop fastener connector provide adjustability, while optional additional padding located at the palm of the glove, and silicone print may be placed on the fingers of the gloves on the palm-side to provide grip or friction.

FIG. 40 shows an exemplary glove impact protection system comprising optional mesh windows showing a plate element layer, with tear resistant hot melt film bordering the protection layers that hold everything in place. At the wrist area, a cuff with a hook-and-loop fastener connector (4060) provides adjustability, while additional optional padding (4066) may be located at the palm of the glove, and silicone print (4065) may be placed on the fingers of the gloves on the palm-side to provide grip or friction. The palm of the glove may simply be the material of the glove, or comprise additional material that offers a cushion, extra grip, or the like. Preferably the layers of the glove impact protection system comprise an interior-most base liner and an adjacent plate element layer that may be seen through a mesh window. The base liner may preferably be 0.375 inch or ⅜-inch (or 0.9525 cm) in thickness, and the plate element liner described here. The mesh windows (4005) display a mesh layer (4040) and plate element layer (4030) on the back of the hand and around the wrist area and a logo, design, or graphic may be on the back of the wrist area by screen printing on a hot melt film (4050). The palm side of the glove embodiment may have optional additional palm padding (4066) made of the textile of the glove, silicone, foam, or the like; grips (4065) along the digits or fingers of the palm-side of the glove, preferably the grips are made of silicone print in any shape or design, and in any distribution along the digits, fingers, or palms of the hand as desired.

Figure 41A:
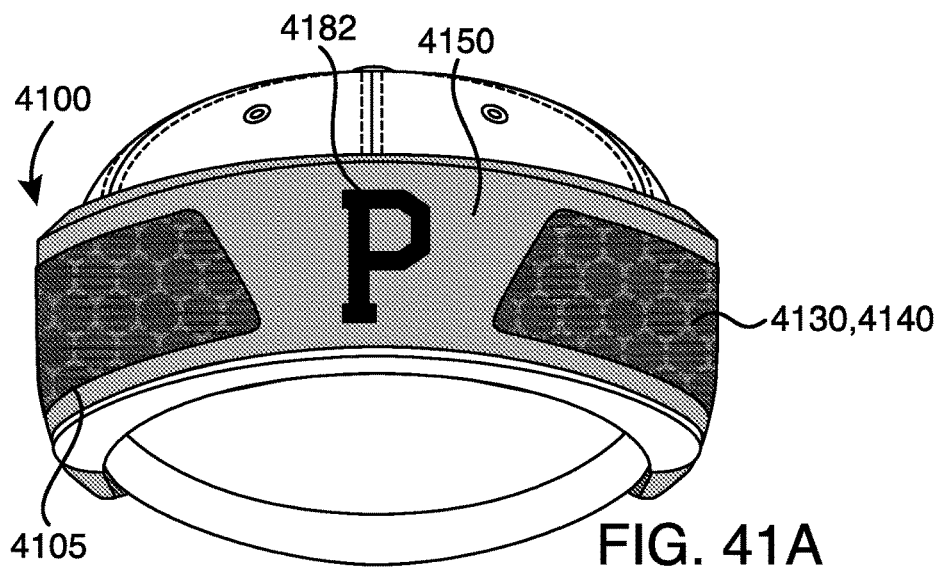
FIGS. 41A-41C illustrate an example of an over-hat head protection system that may be temporarily attached to a billed hat, where the front (FIG. 41A), one side (FIG. 41B), and the back (FIG. 41C) are shown.
Figure 41B:
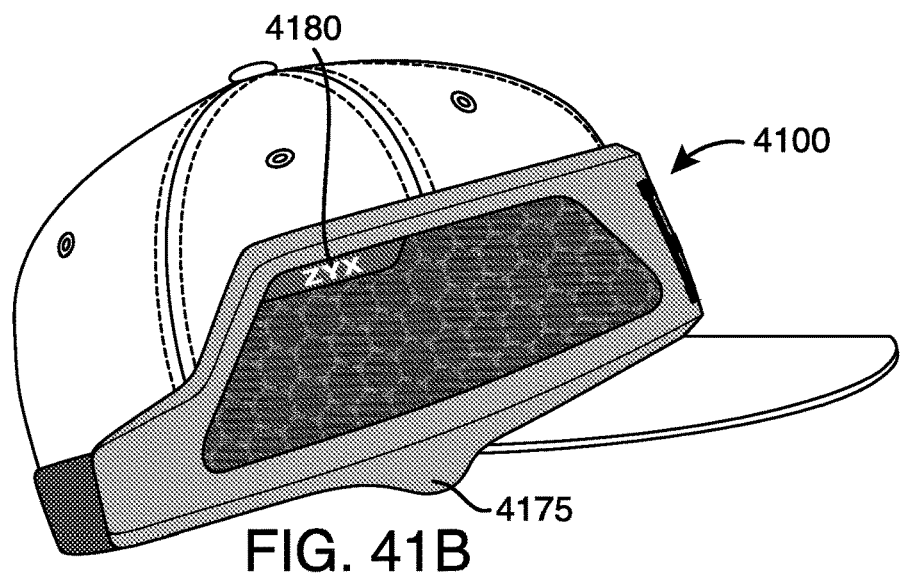
Figure 41C:
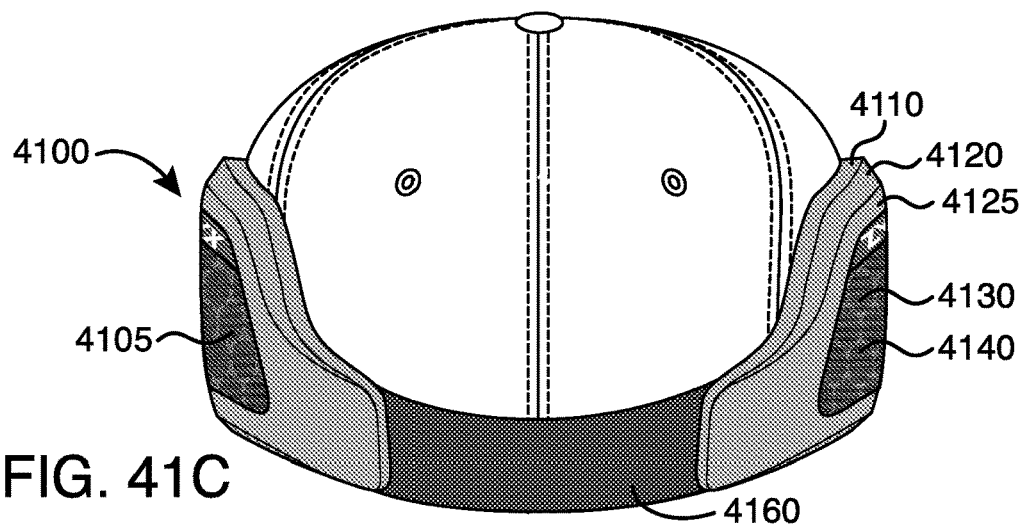

FIG. 41 illustrates an example of an over-hat band head protection system in accordance with the present invention (4100). As can be seen, in the embodiment shown, the protection system has two mesh windows (4105) on either side of the center line of the forehead section (FIG. 41A) that extend all the way towards the rear of the head and joined by a connector, preferably an elastic band (4160) as shown in the rear or back view (FIG. 41C). A rounded sideburn area (4175) at around the temple areas near the base of the bill of a hat provides more secure placement of the over-hat head protection system as shown in the side view in FIG. 41B. Moreover, the protection system may generally be of a similar height around the circumference of the band, or may have graduating or tapered heights around a portion or the entirety of the visor. The combination of layers may be identified in view of the series of chamfers, for example, the base liner (4110), an adjacent liner with a downward sloping chamfer (4120), another liner at the temple area of the head protection system (4125), a plate element (4130) that is visible through the mesh window (4105) composed of a mesh layer (4140) which is also visible, where except for the mesh windows, the combination of layers of the head protection system is covered by an outer layer, such as for example, a hot melt film (4150). A graphic, logo, or design may be placed anywhere on the over-hat head protection system, such as, for example, at the center line of the forehead section (4182) or screen printed on the mesh window (4180).

Figure 42:
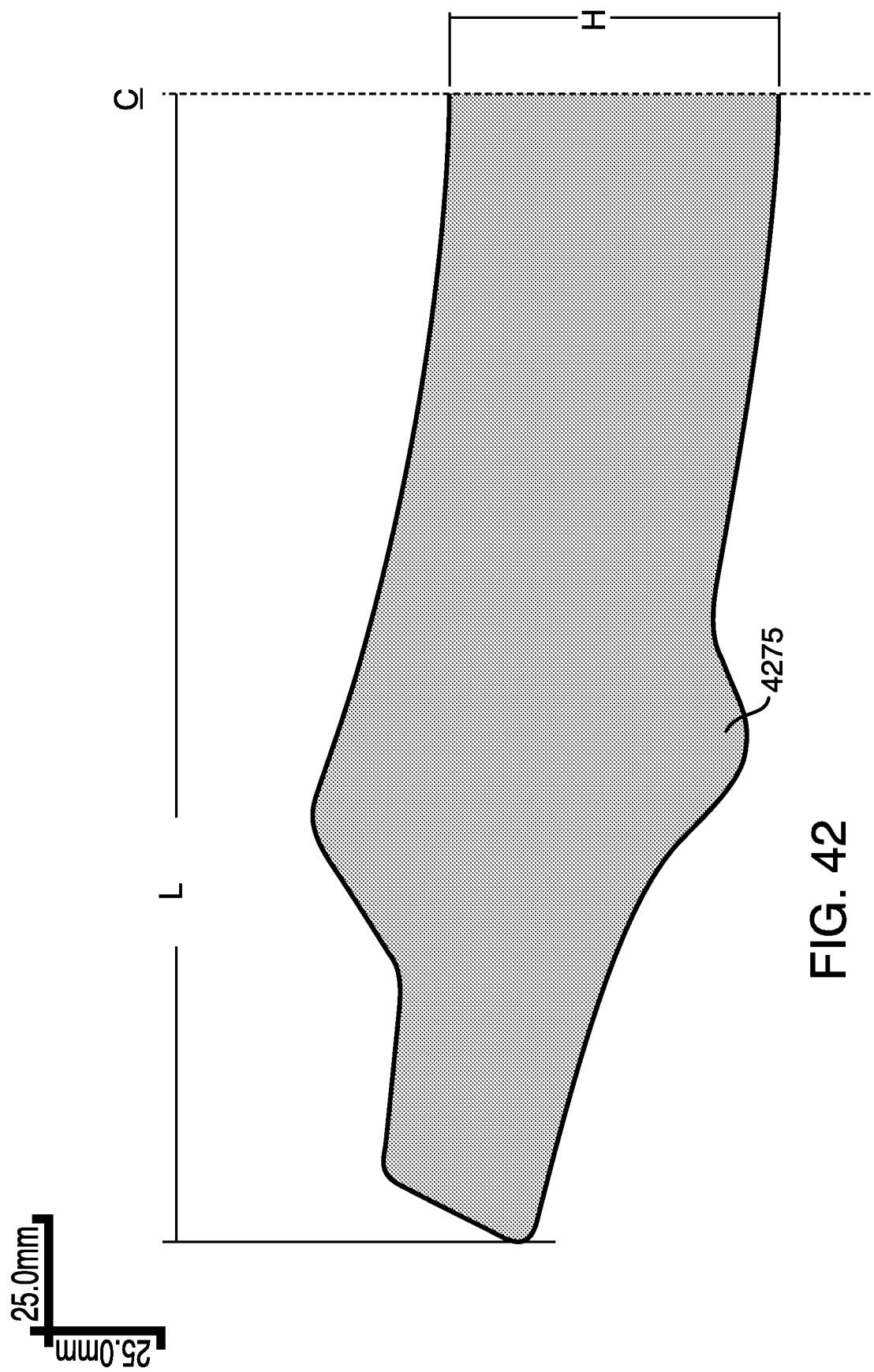
FIG. 42 illustrates a symmetrical half of the overall shape and size of the over-hat head protection system of FIG. 41 from the center line (C), which represents the center of the forehead, to the portion of the head protection system that reaches towards the back of the head.
Figure 43C:
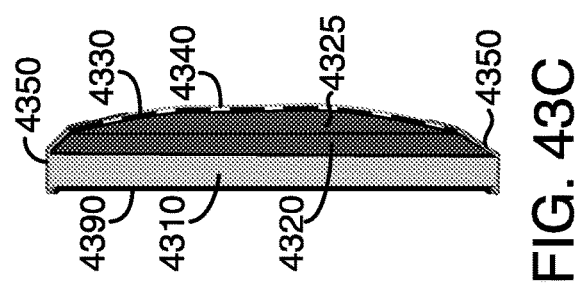
FIGS. 43A-43F illustrate the construction details of the over-hat head protection system of FIG. 41.
Figure 43A:
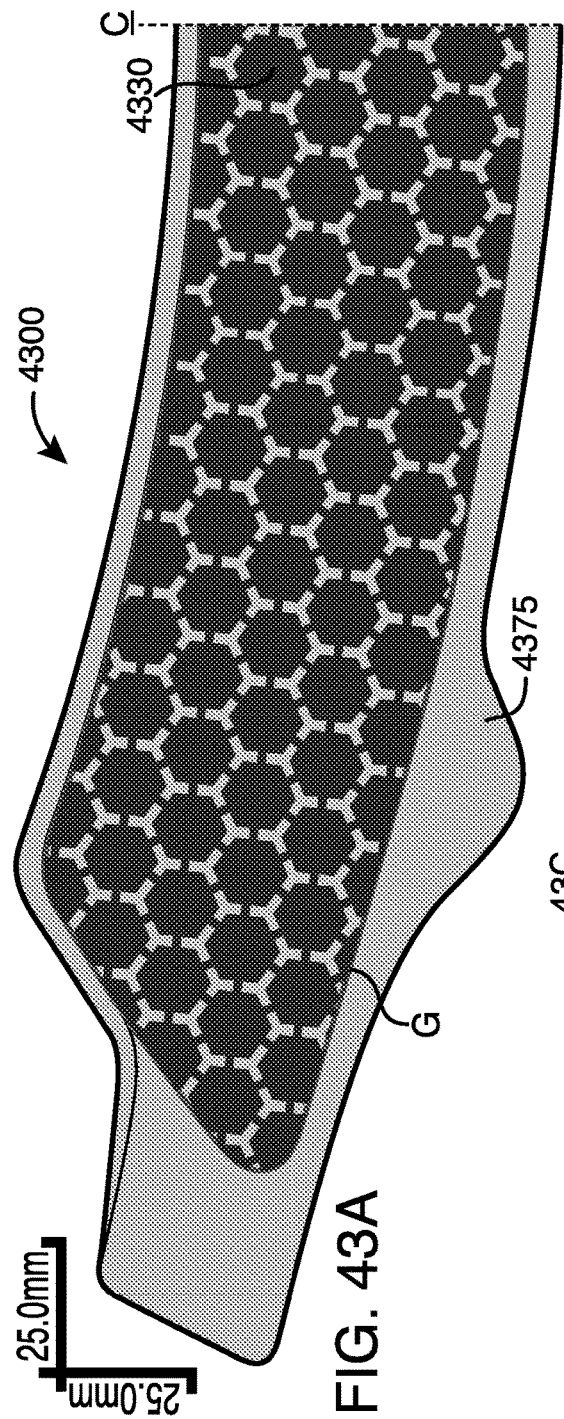
Figure 43B:
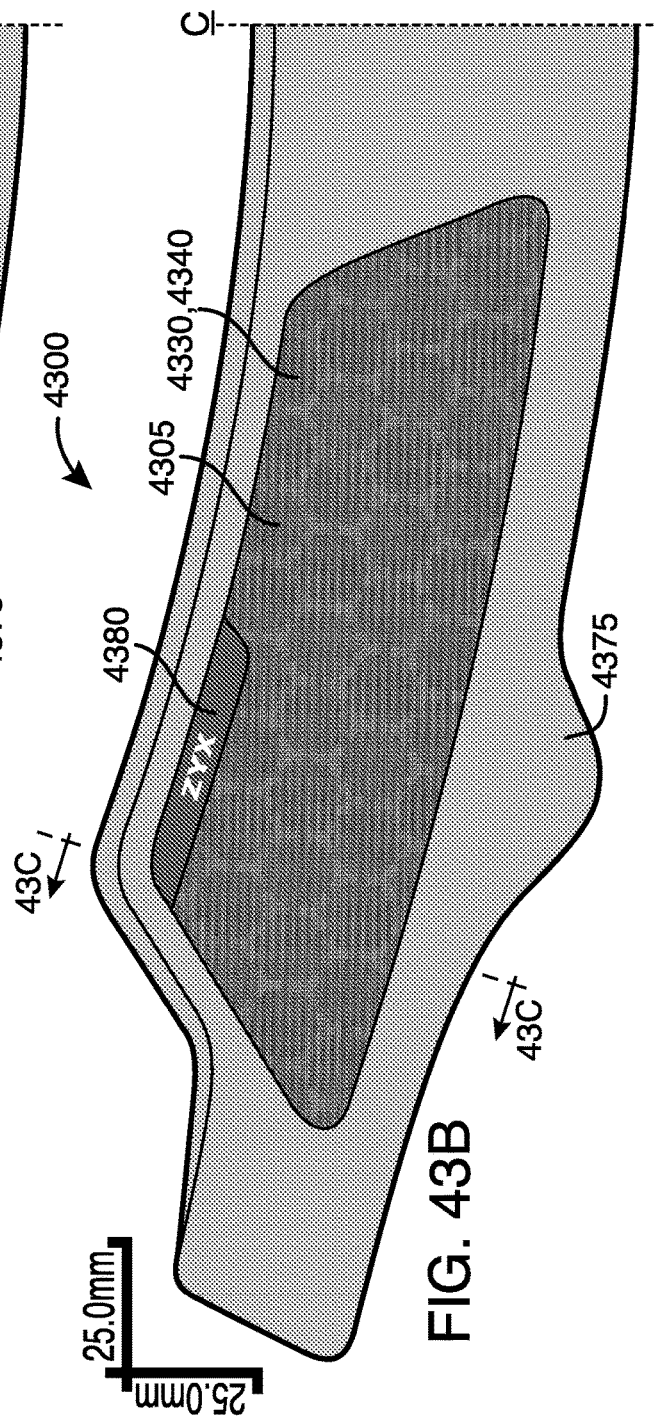
Figure 43D:
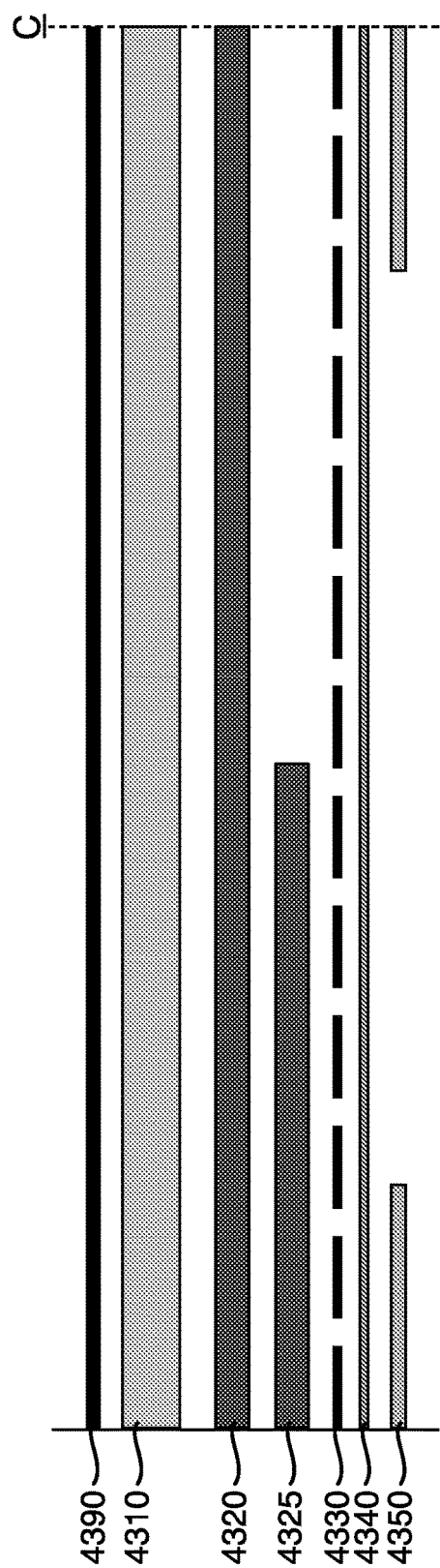
Figure 43F:
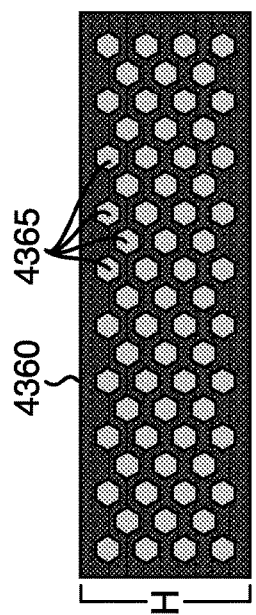
Figure 43E:
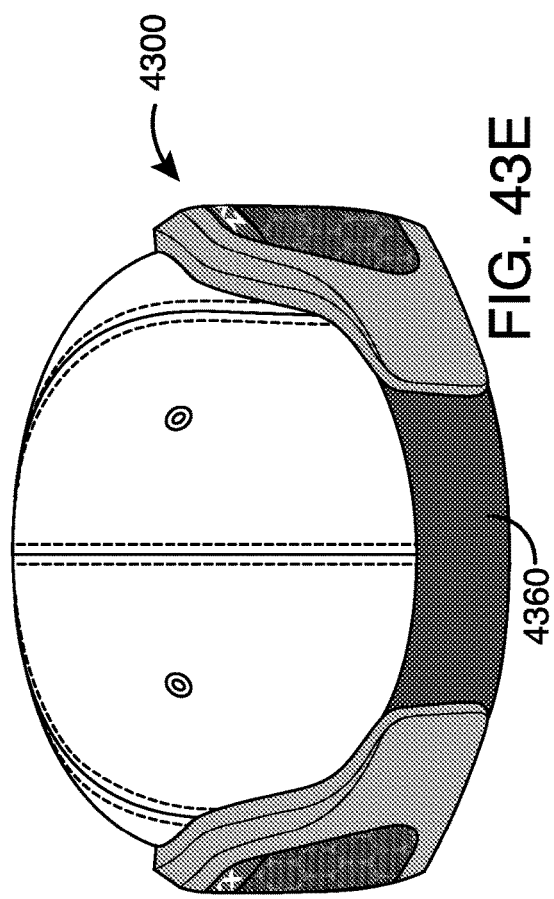

FIG. 42 illustrates the general shape and size of half of an over-hat protection system of FIG. 41, extending from the center line (C) of the forehead section through the side section to the rear area, where the length (L) of the side from the center line (C) of the forehead section is about 3.5 times the height (H). This shape also includes the rounded sideburn area (4275) that fits approximately adjacent to or under the bill of a hat. A preferred length may be about 257 mm, while the preferred height may be about 74 mm for this embodiment.

FIG. 43 illustrates the construction details of the over-hat head protection system of FIG. 41, where the center line (C) shows the point of symmetry for each side of the head protection system. FIG. 43A shows a guideline (G) surrounding the plate element layer (4330). The combination of layers of FIG. 43B shows a dashed line depicting where the vertical cross section of FIG. 43C located behind the sideburn (4375) area, where a base liner 1 (4310), a liner 2 (4320), a liner 3 (4325), a plate element (4330), a monomesh (4340), and a hot melt film (4350) comprise one exemplary over-hat head protection system. A screen print logo or graphic (4380) may be displayed with a hot melt film underlay in the mesh window (4305) which provides visibility of an interconnected plate element (4330) layer and mesh layer (4340). FIG. 43D shows the layering details from the top downward that represents the head side to the outside, and where the center line (C) is located at the forehead section. The textile (4390) may be the exterior hat textile, a hot melt film, or a material that forms a base of the combination of layers. FIG. 43E illustrates the rear or back view of the over-hat head protection system embodiment with an elastic band connector (4360). FIG. 43F shows a detailed view of the interior side of the elastic band, where the elastic band has a height of about 32 mm, or other height comparable to the ends of the head protection system, that may preferably contains grips (4365) printed on the inside of the elastic band or equivalent friction bearing material to secure the over-hat head protection system in place. Grips may be placed at any point on the interior side of the system that contacts the exterior of the hat in order to provide friction and thereby securing the system to the hat. Although the grips may preferably be made of silicone and in the shape of a hexagon, any material that provides friction, any shape of the grip that provides sufficient surface area to make contact and provide traction, and any distribution pattern or number of grips may be contemplated as understood by one of skill in the art.

Figure 44A:
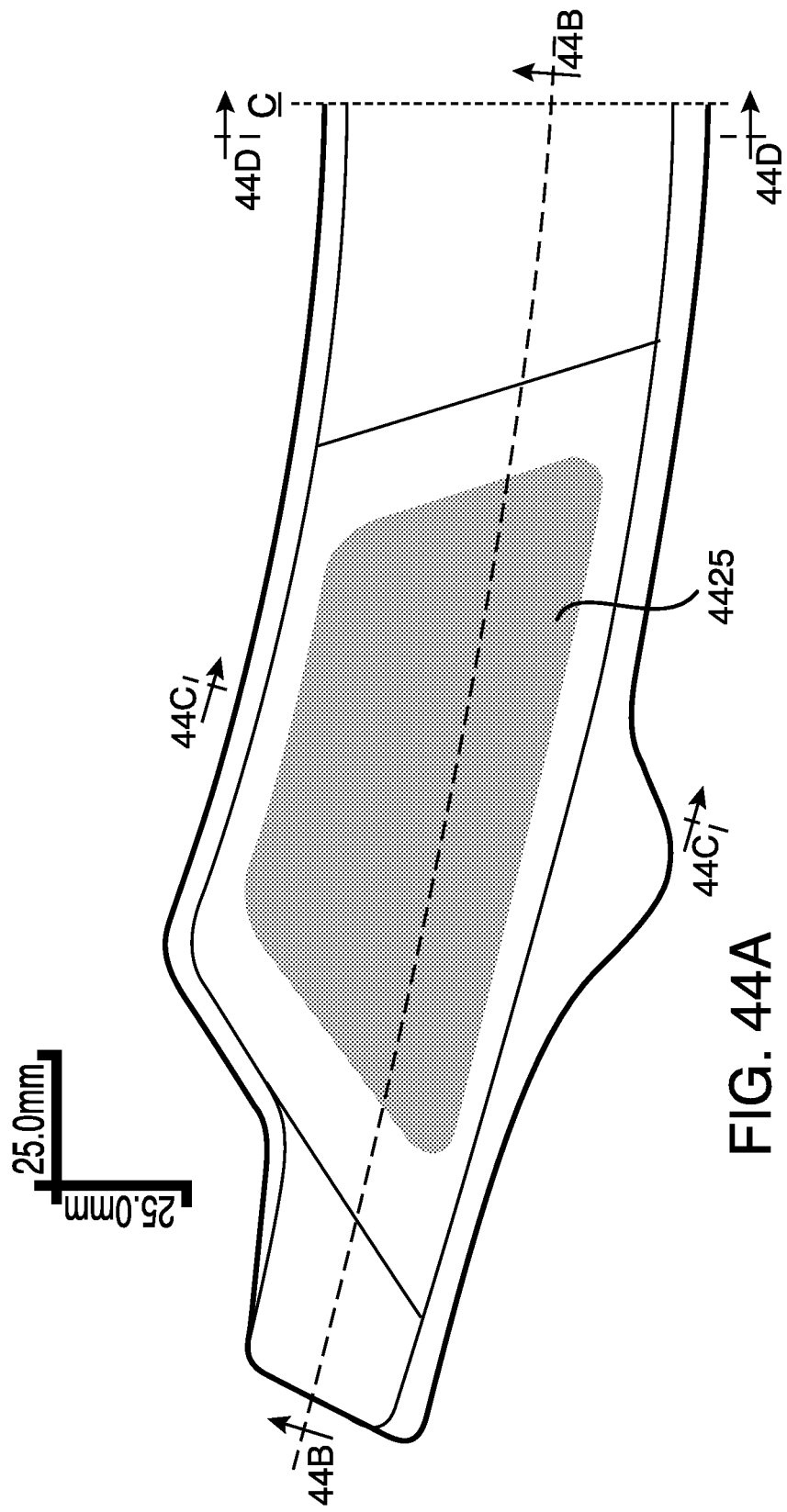

FIG. 44A illustrates liner layering and details, where horizontal and vertical dashed lines show where the cross sections are detailed in FIGS. 44B, 44C, and 44D, respectively. The shaded area at the intersection of cross section lines 44B and 44C represents the additional layer of foam of the temple area or liner 3 (4425), since the temple impact zone should be at its fullest thickness for maximum impact protection. FIG. 44B shows the horizontal cross section from the center line (C) of the forehead to the sides, including the temple area, and the back end of the over-hat head protection system. The uppermost base liner 1 (4410) which is closest to the head or exterior of the hat has "V" notch flex channels (4415), i.e., siping, along the forehead and back side areas with a width (W). Liner 2 (4420) is adjacent to liner 1 (4410) and liner 3 (4425), which is made of similar material and is adjacent to liner 2 represents additional impact protection at the temple or side of the head. As can be seen, both ends of the temple or side impact liner 3 (4425) are tapered downward, while liners 1 and 2 are only tapered at the back ends. FIG. 44C shows the vertical cross-section of the liners at the temple region, where the base liner 1 (4410) has a horizontal top edge and bottom edge, liner 2 (4420), preferably has a top chamfer angle that is about 45° downward (i.e., in the clockwise direction) from liner 1, which represents 0°. The bottom chamfers of liner 2 and liner 3 preferably has an upward angle of about 60° (in the counter clockwise direction from liner 1 of 0°) and greater than 60° but less than 90°, respectively. FIG. 44D represents the vertical cross section at the center line (C) of the forehead section, where the base liner 1 (4410) has a horizontal top edge, liner 2 (4420), preferably has a top chamfer angle (T) that is about 45° downward (i.e., in the clockwise direction) from liner 1, which represents 0°. The bottom chamfer angles (B) of liner 2 preferably have an upward angle of about 45° (in the counter clockwise direction from an imaginary liner 1 horizontal line of 0°).

Figure 45C:
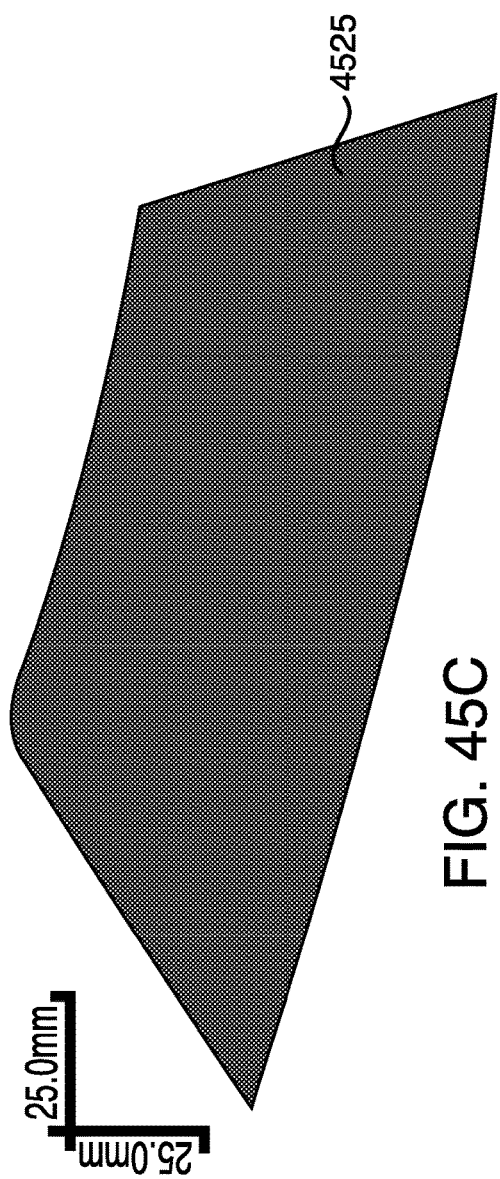

FIGS. 45A-45C show the liner patterns for the base liner 1 (4510), liner 2 (4520), and the temple impact zone liner 3 (4525) from the center line (C) to the back end of the head protection system. In this embodiment of an over-hat head protection system illustrated in FIG. 41, liner 1 (FIG. 45A) and liner 2 (FIG. 45B) have the same pattern, including the rounded sideburn area (4575), and liner 3 (FIG. 45C) which is an additional liner that provides temple impact protection and has a smaller pattern for the temple area.

Figure 46:
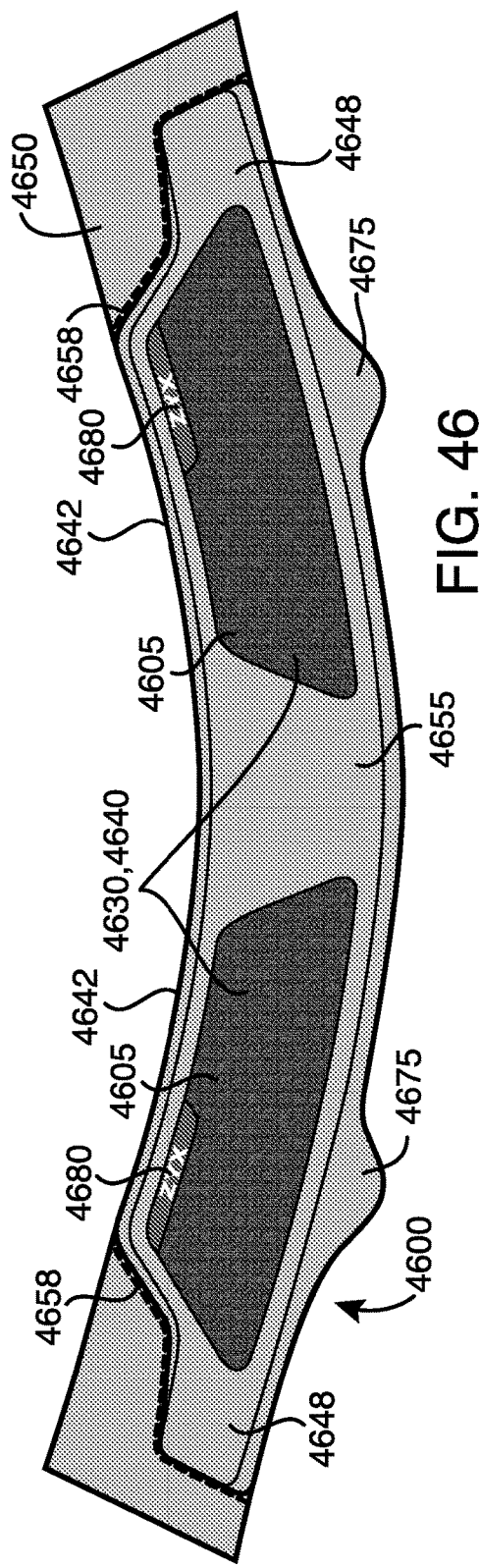
FIG. 46 illustrates tube construction of the over-hat head protection system of FIG. 41.

FIG. 46 illustrates an example of a construction method for making the over-hat head protection system exemplified in FIG. 41. Essentially, the expanded view shows both sides (4642) and forehead (4655) sections, where the top and bottom edges are closed forming a "tube" and the back ends (4648) of both sides are open. Through these openings the various layers of the liners and plate element may be inserted into the "tube" by sliding the layers into the openings. After the combination of liners and plate elements are inserted into the "tube" and through the openings at the back ends (4648) may be closed, for example, by stitching (4658), adhering, or gluing the excess material together, and without closing the opening onto any of the layers of the liners and plate elements, i.e., closure of the openings do not bind or affix the layers together but are capable of movement. After closure of the backs of each side, the excess "tube" material may be trimmed, such that the stitches remain and are not affected by the removal of excess material. The mesh windows may be pre-formed with the "tube" material, but adhering a portion of the mesh layer. The material may be a hot melt film, a textile, or other material that forms a pocket and does not adhere to the inserted combination of liners and plate elements.

Figure 47A:
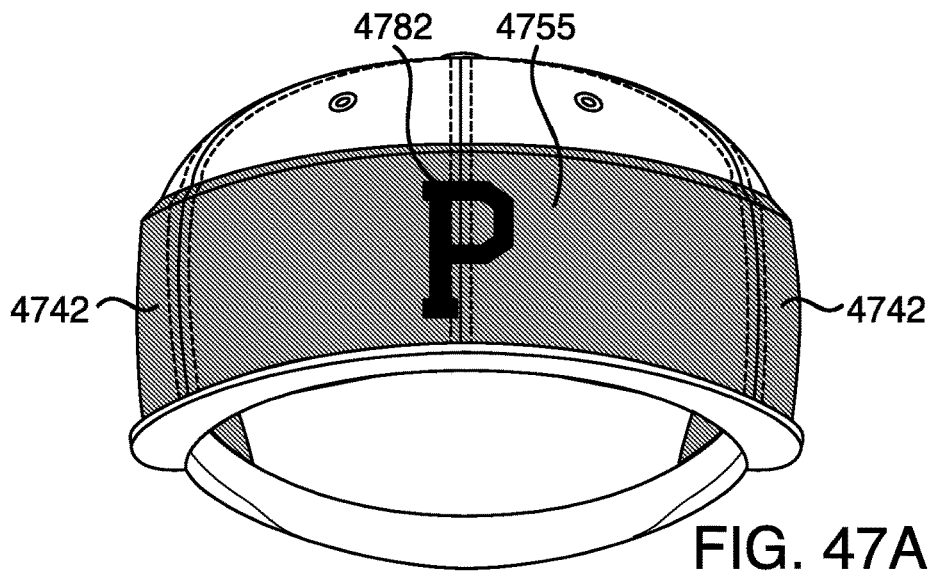
FIGS. 47A-47C illustrate an example of an in-hat head protection system that comprises layers on the interior and exterior of a billed hat.
Figure 47B:
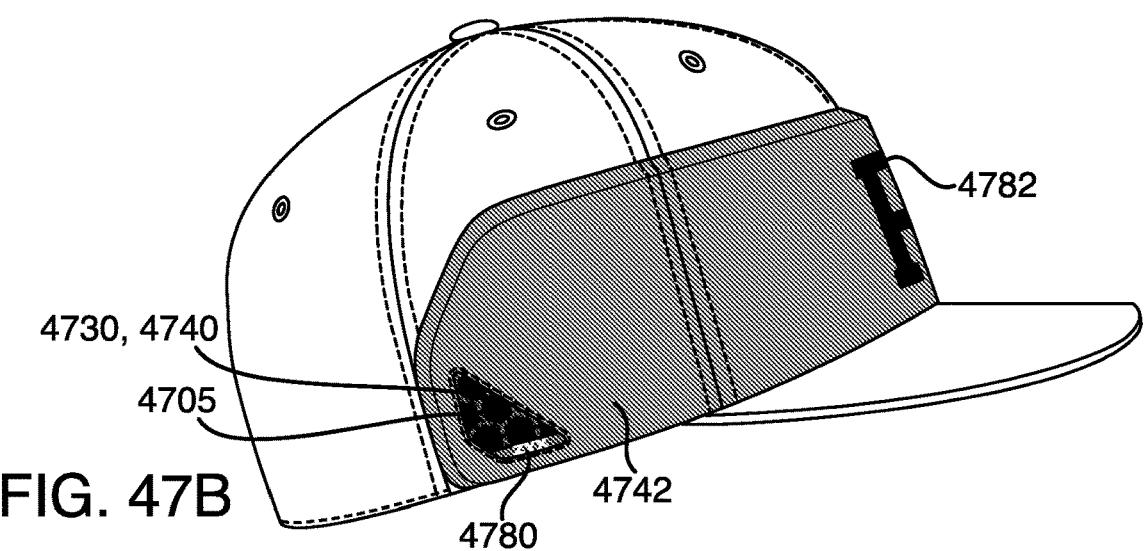
Figure 47C:
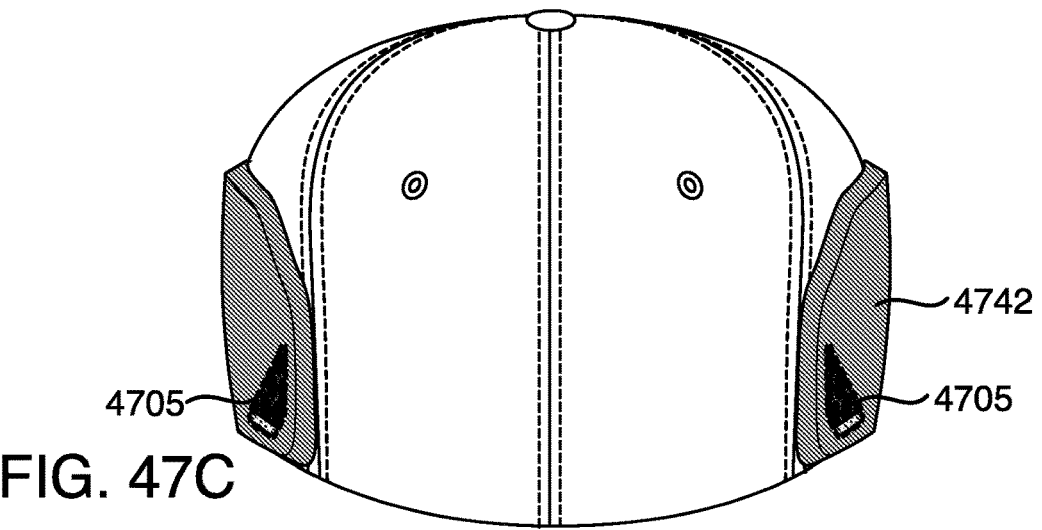

FIGS. 47A-47C show a front view (FIG. 47A), a side view (FIG. 47B), and a back or rear view (FIG. 47C) of an example of an in-hat head protection system that comprises layers on the interior and exterior of a billed hat. The forehead section (4755) may have a logo, graphic, or design (4782), while the side sections (4742) may have a mesh window (4705) displaying a mesh layer (4740) covering a plate element layer (4730), and containing a logo, graphic, or design printed on the mesh window (4780).

Figure 48:
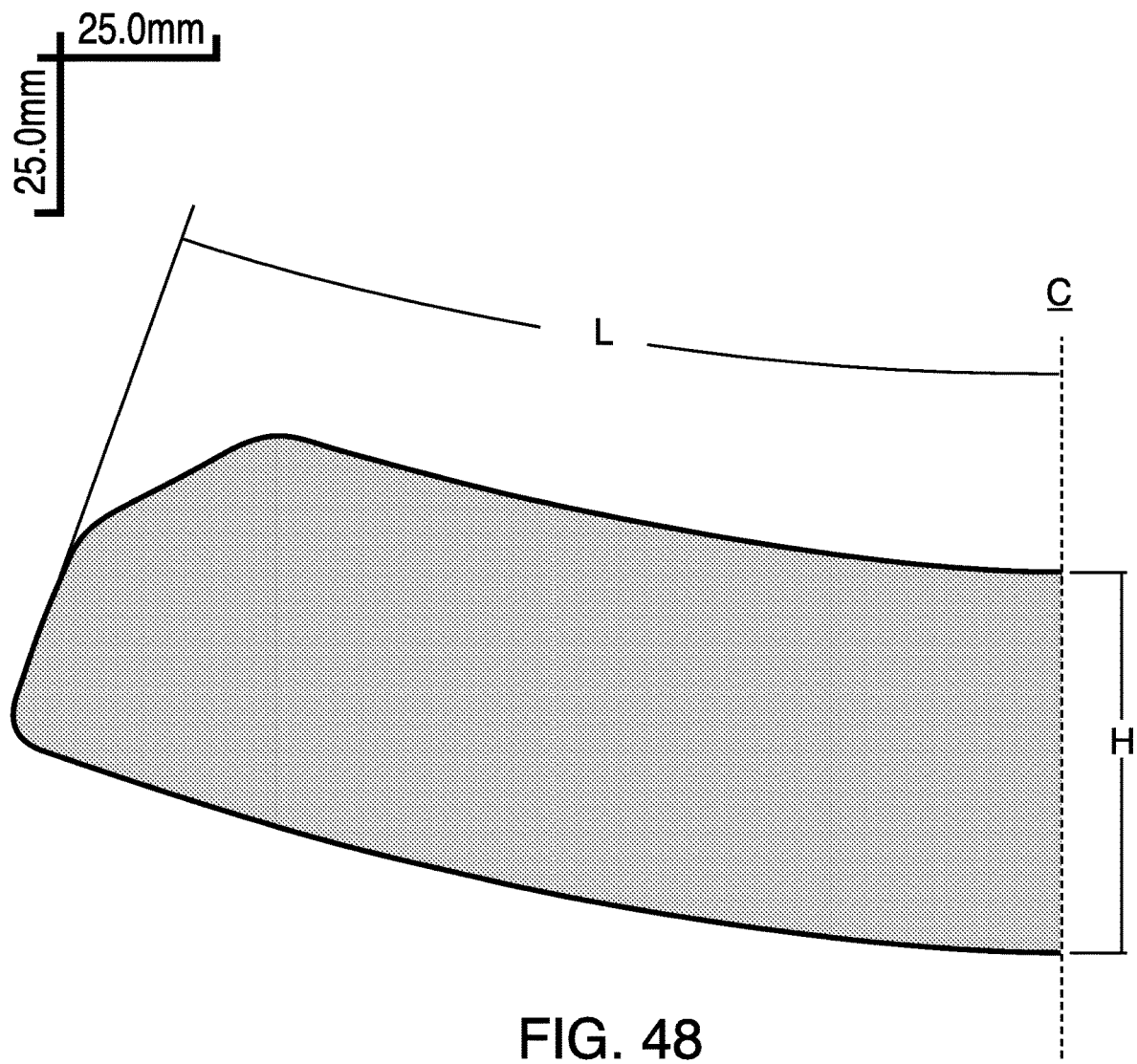
FIG. 48 illustrates a symmetrical half of the overall shape and size of the in-hat head protection system of FIG. 47 from the center line (C), which represents the center of the forehead, to the portion of the head protection system that reaches towards the back of the head.

FIG. 48 illustrates a symmetrical half of the overall rectangular shape and size of an in-hat head protection system of FIG. 47 from the center line (C), and having a height (H) of about 74 mm and a length (L) from the center line to the back end of about 196 mm. The length is preferably about 2.5 times the height.

Figure 49A:
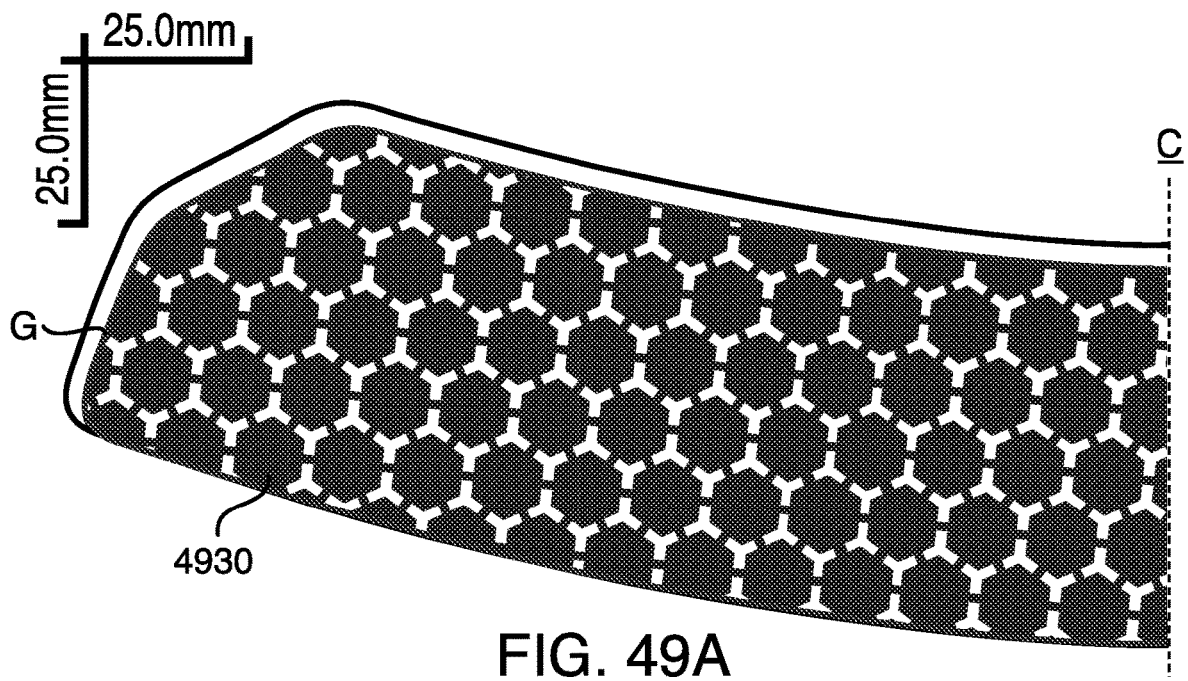
Figure 49B:
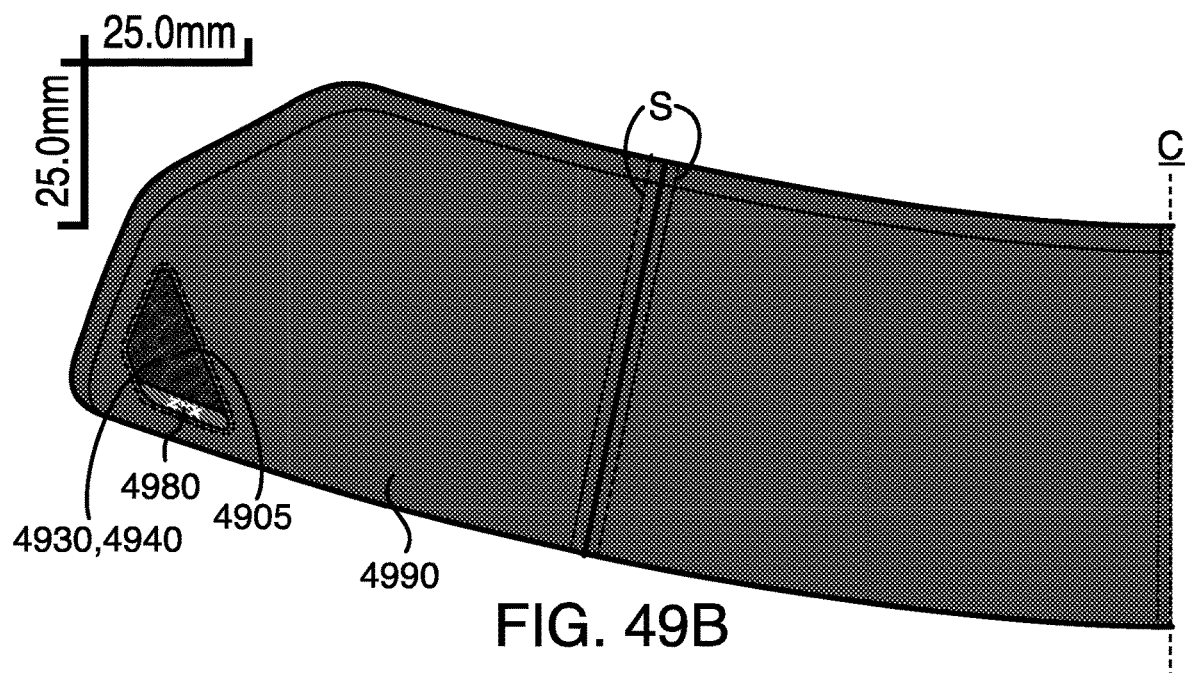

FIGS. 49A-49C illustrates the construction details of the in-hat head protection system of FIG. 47, where the center line (C) shows the point of symmetry for each side of the head protection system. The plate element (4930) is surrounded by a guideline (G) as shown in FIG. 49A, while FIG. 49B shows the head protection system covered by a textile (4990) with the exception of a mesh window (4905) containing a logo, design, or graphic (4980) screen printed on a hot melt film underlay. The seams (S) are shown in FIG. 49B, where the side sections and the forehead sections are joined. FIG. 49C shows the combination of layers for the in-hat head protection system comprising a textile (4990), a base liner 1 (4910), another textile layer (4990), the hat (4992), a liner 2 (4920), a liner 3 (4925) at the temple regions of the side sections, a plate element layer (4930), a mono-mesh (4940), and an exterior textile (4990) which essentially covers the entire combination of layers of the in-hat head protection system with the exception of mesh windows (4905). The mesh window and mesh layer are optional and may be replaced by removing the mesh and constructing the in-hat head protection system such that the entire exterior textile covers the entire combination of layers, i.e., without a mesh window.

Figure 50A:
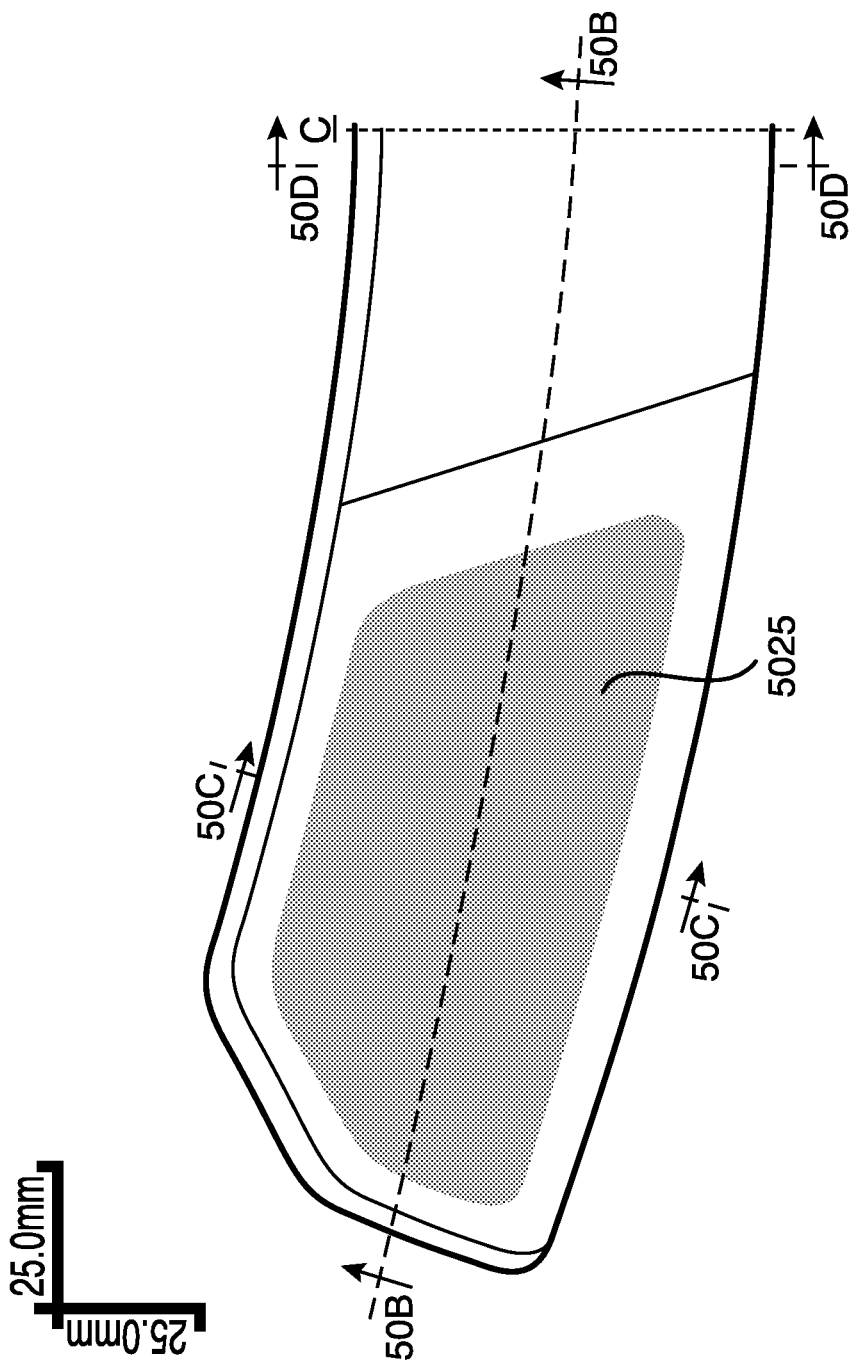

FIGS. 50A-50D illustrate the liner or foam details of the in-hat head protection system of FIG. 47, where the cross sections are detailed in FIGS. 50B, 50C, and 50D, respectively. The shaded area at the intersection of cross sections FIG. 50B and FIG. 50C represents the additional layer of foam of the temple area or liner 3 (5025), since the temple impact zone should be at its fullest thickness for maximum impact protection. FIG. 50B shows the horizontal cross section from the center line (C) of the forehead to the sides, including the temple area, and the back end of the over-hat head protection system. The uppermost base liner 1 (5010) which is on the interior of the hat and closest to the head has "V" notch flex channels (5015), i.e., siping, along the forehead area. While liner 2 (5020) is on the exterior of the hat and is adjacent to liner 3 (5025) at the temple or side of the head sections that need additional impact protection. As can be seen, both ends of liner 3 (5025) are tapered downward, while liners 1 and 2 are only tapered at the back ends. FIG. 50C shows the vertical cross-section of the liners at the temple region, where the base liner 1 (5010) has a horizontal top edge and bottom edge, liner 2 (5020), preferably has a top chamfer angle (T) that is about 45° downward (i.e., in the clockwise direction) from liner 1 (5010), which represents 0°. The bottom edge of liner 2 (5020) preferably has a horizontal bottom edge, i.e., the same as that of liner 1 that is represented by 0°. The top and bottom chamfers of liner 3 (5025) are preferably greater than about 60° and less than about 90° downward (i.e., in the clockwise direction) from the horizontal top edge of liner 1 (5010), which represents 0°, and upward (i.e., in the counter clockwise direction) from the horizontal bottom edge of liner 1 (5010), which represents 0°. FIG. 50D represents the vertical cross section at the center line of the forehead section, where the base liner 1 (5010) has horizontal top and bottom edges, liner 2 (5020), preferably has a top chamfer angle (T) that is about 45° downward (i.e., in the clockwise direction) from liner 1, which represents 0°. The bottom edge of liner 2 (5020) preferably has a horizontal bottom edge represented 0°.

Figure 51A:
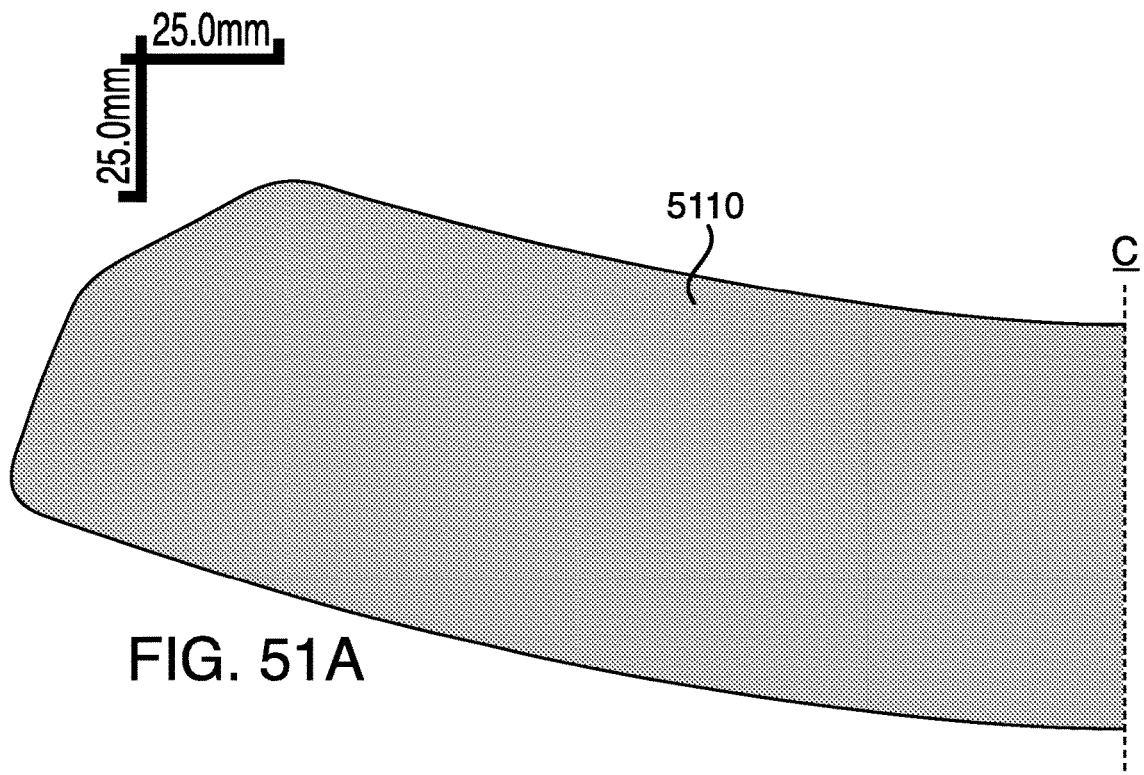
FIGS. 51A-51C illustrate the liner or foam patterns for the in-hat head protection system of FIG. 47.
Figure 51B:
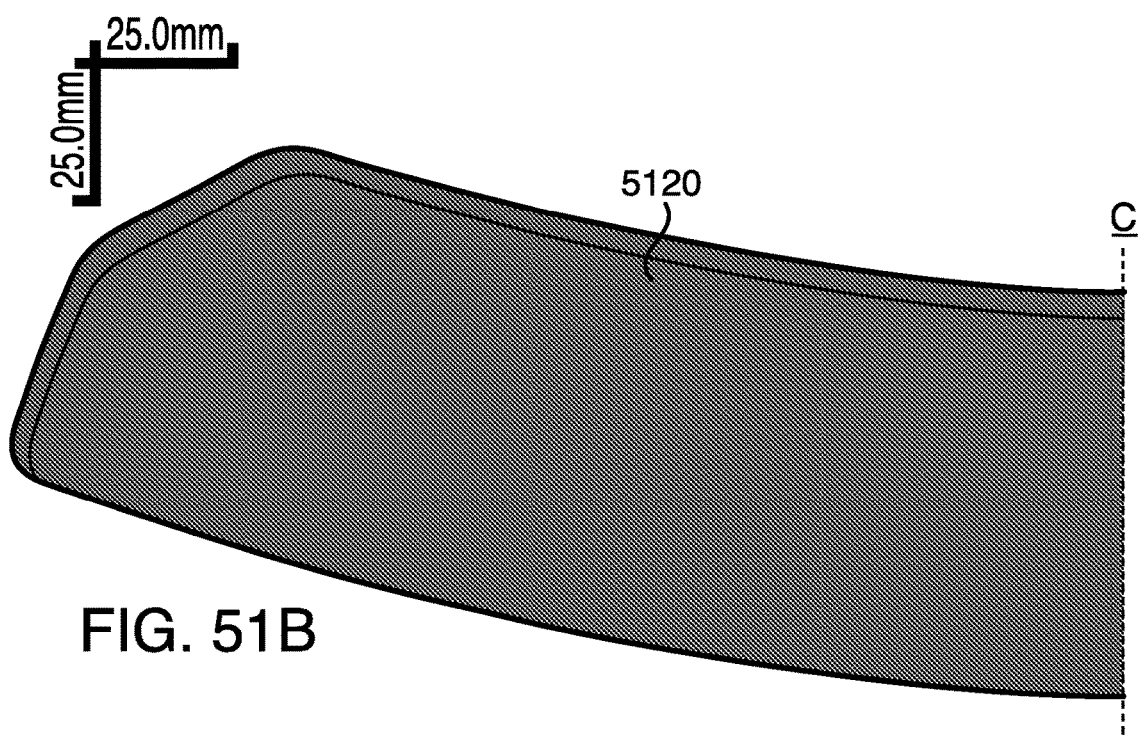
Figure 51C:
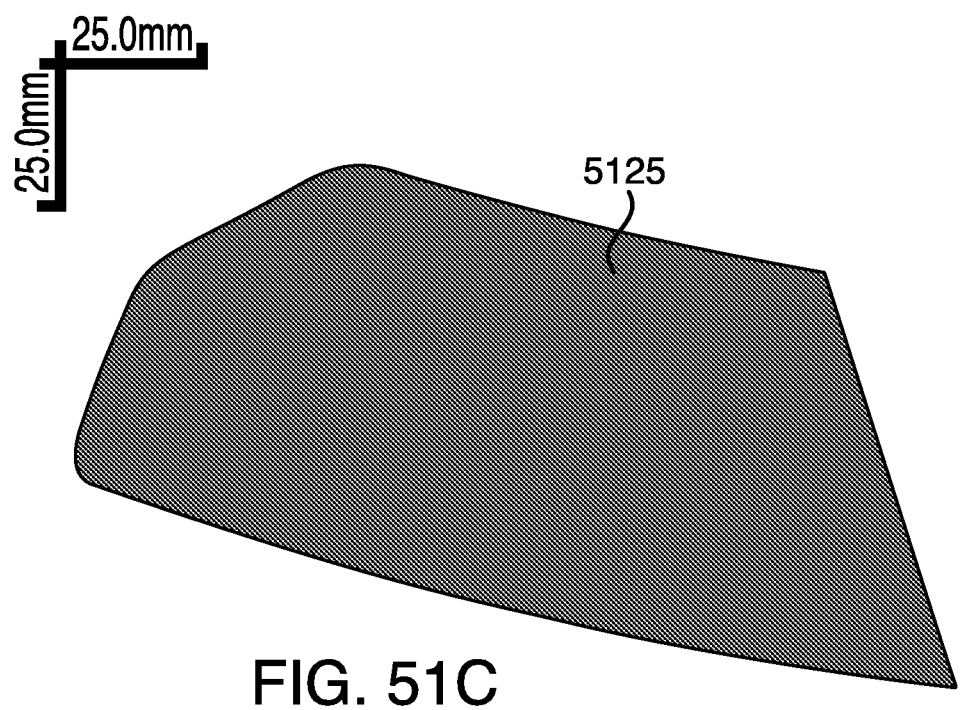

FIGS. 51A-51C show the liner patterns for the base liner 1 (5110) which is located on the inside of the hat, liner 2 (5120) which is on the outside of the hat, and the temple impact zone liner 3 (5125) from the center line (C) to the back end of an in-hat head protection system of FIG. 47. In this embodiment of an in-hat head protection system illustrated in FIG. 47, liner 1 (FIG. 51A) and liner 2 (FIG. 51B) have essentially the same pattern, and liner 3 (FIG. 51C), which is an additional liner that provides extra temple impact protection has a smaller pattern for the temple area.

Figure 52B:
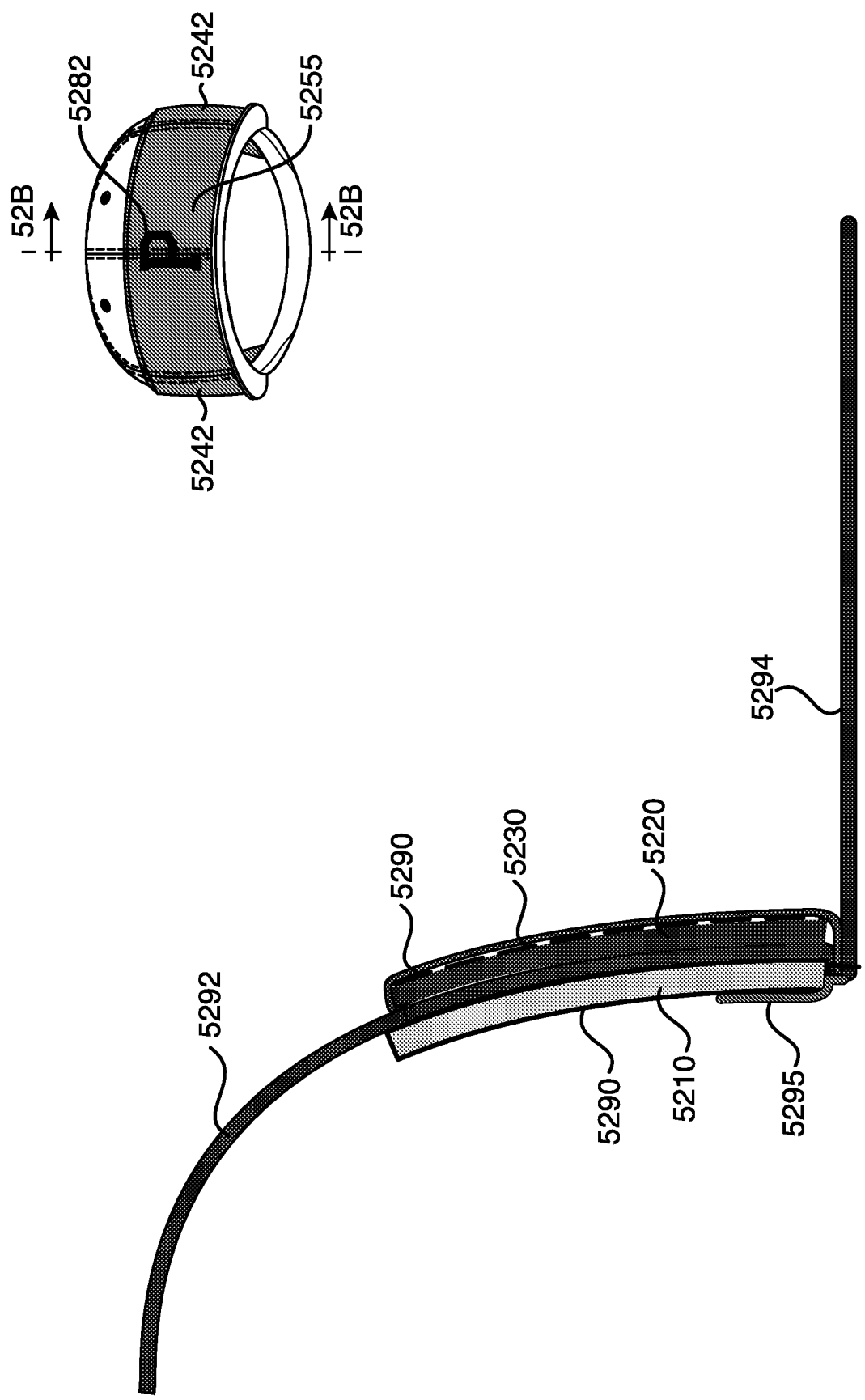

FIGS. 52A-52B show the construction of an in-hat head protection system of FIG. 47. FIG. 52A shows a front view where a vertical cross section which is depicted in FIG. 52B located at the center line of the forehead section, and FIG. 52B shows the construction of the in-hat head protection system at the center line cross section shown in FIG. 52A. FIG. 52B shows a cross section of a hat (5292) that is in-between the interior portion comprising a base liner 1 (5210) covered by a textile (5290), where at the bottom edge of the interior part of the hat adjacent to the textile covered liner 1 (5210) is a material, for example, an elastic sweatband (5295) that may be attached to the textile covering the base liner 1, to a bottom edge of the hat (5292), or to an edge of the bill of a hat (5294). The exterior portion comprises a textile pocket (5290) containing a combination of layers of a liner 2 (5220) and a plate element layer (5230) at the forehead section with an optional logo, design, or graphic (5282), where the top edge of the exterior portion of the textile pocket (5290) may be attached directly to the hat, for example, by stitching, gluing, or adhering, or combinations thereof. Although not shown, the side sections including the temple regions may have an additional liner 3 in the exterior pocket (5290), where liner 3 is sandwiched between liner 2 (5220) and the interconnected plate element layer (5230).

While various embodiments have been described above, it should be understood that such disclosures have been presented by way of example only and are not limiting. Thus, the breadth and scope of the subject methods, devices, and systems should not be limited by any of the above-described exemplary embodiments, but should be defined only in accordance with the following claims and their equivalents.

Having now fully described the subject protection systems and devices, it will be understood by those of ordinary skill in the art that the same can be performed within a wide and equivalent range of conditions, formulations and other parameters without affecting their scope or any embodiment thereof. All cited patents, patent applications and publications are fully incorporated by reference in their entirety.

EXAMPLES

The compositions and methods described herein will be better understood with reference to the following non-limiting examples.

Example 1

Baseball Cap Testing Methods and Results

Although there is no current standard method for testing the front, front boss, sides, and angled front areas of hat protection systems or other head protective devices or at impact speeds that are required by professional Major League Baseball, a modified testing method was developed. In particular, the "Standard Performance Specification for Newly Manufactured Baseball/Softball Fielder's Headgear" for youth and amateur players developed by the National Operating Committee on Standards for Athletic Equipment (NOCSAE) (ND029-12m12) was modified to test the impact speeds typically used by professional athletes. Another NOCSAE testing method was incorporated for testing the described protection systems, specifically, the "Standard Projectile Impact Test Method and Equipment Used in Evaluating the Performance Characteristics of Protective Headgear, Faceguards or Projectiles" (ND021-11m12). The Severity Index (SI) and peak accelerations of the protection systems were tested using a 7.5 inches NOCSAE head form, which is the typical size of a male in the $50^{th}$ percentile at the Southern Impact Research Center (SIRC).

The Baseball Research Center collaborated with the SIRC to perform impact testing with the NOCSAE head form. Various configurations were tested to evaluate the severity index measured on impacts against the head protection system within the baseball cap. The standard front location according to the NOCSAE standards if the front center of the baseball cap, i.e., 0°, and the side location is 90° from the front center. The sides of the baseball cap were tested using a baseball projected at an impact velocity of approximately 75 miles per hour (mph) to about 95 mph, while the front of the baseball cap was tested at about 75 mph to about 105 mph all at room temperature.

It was found that a particular configuration (S) having five layers from the outside to the inside comprising (1) a sheet of plate elements having an average thickness of 0.072 inch (+/−0.001 inch) (Muehlstein 4062A); (2) a sheet of plate elements having an average thickness of 0.072 inch (+/− 0.001 inch) (Muehlstein 0620); (3) a 0.251 inch (+/−0.006 inch) liner (1485); (4) a 0.250 inch (+/−0.009 inch) liner (1485); and (5) a 0.376 inch (+/−0.013 inch) liner (1000). Configuration S in a baseball cap was designed to have a total average weight of 349.0 g, with weights ranging from 339.2 g to 359.4 g. Since baseball caps have an average weight of 162 g, the weight of the protection system is 187 g. The total average thickness of the protection system excluding the baseball cap was 1.021 inches. Configuration A has an average weight of the layers of 147.6 g with an average thickness of 0.77 inch. Configuration B has an average weight of 167.0 g and an average thickness of 0.91 inch. While Configuration C has an average weight and thickness of 108.1 g and 0.52 inch, respectively. All of these configurations were assembled into a fabric pouch and zippered into a baseball cap for testing. Table 2 demonstrates the various configurations.

TABLE 2

| Configuration | 1 | 2 | 3 | 4 | 5 |
| --- | --- | --- | --- | --- | --- |
| S | 0.072" Plate | 0.072" Plate | 0.251" Liner | 0.250" Liner | 0.376" Liner |
| A | 0.072" Plate | 0.072" Plate | 0.251" Liner | 0.376" Liner | — |
| B | 0.072" Plate | 0.072" Plate | 0.251" Liner | 0.13" Liner | 0.376" Liner |
| C | 0.072" Plate | 0.072" Plate | 0.376" Liner | — | — |

As is understood, a Severity Index (SI) of below 1200 $G^{2.5}$·s is desirable and optimal for safety in head protection devices for the typical wearer (i.e., a typical $50^{th}$-percentile male) to avoid suffering severe head trauma, but not necessarily from mild-traumatic brain injury or concussions. The relationship between the SI and impact velocity for the front location of a baseball cap was tested. It was found that Configuration S tested on the front of the baseball cap at impact velocities ranging from about 95 mph to about 105 mph, resulted in SI that increased from about 400 $G^{2.5}$·s to about 800 $G^{2.5}$·s, well below the maximum desirable SI of 1200 $G^{2.5}$·s. However, Configuration A and Configuration C, which were also tested, had significantly different SI values much higher than those of the standard Configuration S. Configuration A was tested at an impact velocity of about 95 mph and was found to have a SI of about 1200 $G^{2.5}$·s. While at an impact velocity of about 75 mph and 90 mph, Configuration C had an SI of about 800 $G^{2.5}$·s and about 1900 $G^{2.5}$·s. These results confirmed that reducing the total thickness of the liner reduced the effectiveness of the protection.

When the sides of a baseball cap were tested, the results of the SI tests of Configurations A and B were found to be similar and higher than the SI of the standard Configuration S. Specifically, Configuration S had SI values of about 400 G2.5·s, 800 G2.5·s, 1200 G2.5·s, and 1900 G2.5·s at impact velocities of about 75 mph, about 85 mph, about 90 mph, and about 95 mph, respectively. While the SI values tested on the sides of a baseball cap with Configuration A resulted in an SI value of about 1750 G2.5·s to about 2000 G2.5·s at an impact velocity of about 80 mph. Similarly, Configuration B had an SI value of about 1650 G2.5·s at an impact velocity of about 80 mph. These results confirmed that reducing the total thickness of the liner reduced the effectiveness of the protection.

Example 2

Spherical Impact Testing of Protection Systems

Testing was conducted using a spherical impact method based on the American Society for Testing and Materials (ASTM) (ASTM F1446). A protective garment was spread across a round flat anvil surface that had sensors, for example, a force ring sensor anvil, that could measure the acceleration or Peak G (9.81 m/s$^2$=1 G). A 5 kg spherical mass with a uniaxial (single axis) accelerometer was dropped from a height of about 0.12 meters (~5 inches) on the impact site on which the protective garment sample lays. This was repeated three times in the same location (Test Area 1). The sample was rotated or moved to another location of the protective garment sample (Test Area 2) and the spherical mass was dropped in the same manner with measurements taken after each of the three releases. Finally, the test was repeated again in triplicate in another location of the same protective garment (Test Area 3) under the same conditions. The force recordings were collected from three test areas and performed in triplicate to ensure sufficient information was acquired per impact.

Essentially, a metal sphere was dropped onto three test areas of the base layer protection system samples, including competitor protection garments and those protection garments containing the base layer protection system described here. The dimensions of the samples are important considerations during dynamic impact testing. Since compression properties may vary as the cross-sectional area changes in size relative to the metal sphere, the size of the material being tested was presented in its final form for its intended application, i.e., as a protection garment base layer.

In a base layer protection comparison, the competitor and inventive sample items were each tested by dropping a metal sphere at a velocity of about 1.5 m/s (about 3 miles per hour). It was found that the measurements of the first drop test typically had a lower Peak G than compared to the third. The repeated impact in the same test area may compromise the protection garment. However, for the inventive base layer protection system in the tested protection garment, the Peak G force of the third drop test was not necessarily higher than that of the first drop test (data not shown). Moreover, the average Peak G force was significantly reduced from the results of the competitor sample item as demonstrated in Table 3. Table 3 compares the average (Avg) Peak G of the Competitor protective garment to that of the inventive sample item.

TABLE 3

| TEST AREA | COMPETITOR AVG PEAK G | INVENTIVE AVG PEAK G | TIMES DIFFERENT |
|---|---|---|---|
| 1 | 224 | 36 | 6 |
| 2 | 224 | 38 | 6 |
| 3 | 187 | 37 | 6 |

The competitors' resulting data showed that the average peak G was about 5-6 times greater than the average peak G of the inventive sample over all three test areas. Essentially, the peak G is the amount of force that the base layer protective system gear receives. A peak acceleration of any impact should not exceed 300 G. This is essentially the pass/fail limit for protective garments. Thus, it is beneficial and significantly important that the acceleration be no more than 300 G and as low as possible.

It should be understood, of course, that the foregoing relates to exemplary embodiments of the invention and that modifications may be made without departing from the spirit and scope of the invention as set forth in the following claims.

Aspects of the disclosure can be modified, if necessary, with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

What is claimed is:

1. A protection system, comprising:
    a) at least one interconnected mesh plate element network comprising a plurality of plate elements substantially evenly spaced from one another in an arrayed pattern, the plurality of plate elements being made from a hard plastic material; and
    b) at least one liner disposed adjacent to the at least one interconnected mesh plate element network, the at least one liner being made from a different material than the plurality of plate elements,
    wherein the at least one interconnected mesh plate element network includes a first interconnected mesh plate element network and a second interconnected mesh plate element network that overlap one another, and wherein the plurality of plate elements of the first interconnected mesh plate element network are disposed adjacent to and laterally offset from corresponding plate elements of the second interconnected mesh plate element network.

2. The protection system of claim 1, wherein each of the plurality of plate elements of the at least one interconnected mesh plate element network is disposed within one of a plurality of depressions formed in the liner.

3. The protection system of claim 1, wherein the plurality of plate elements of the at least one interconnected mesh plate element network include one or more flat sides, and wherein the one or more flat sides of adjacent plate elements of the plurality of plate elements are interconnected by flexible bridges made from the same hard plastic material as the plurality of plate elements.

4. The protection system of claim 1, wherein each of the plurality of plate elements of the at least one interconnected mesh plate element network has a width of between about 0.25 inch and about 2.5 inches and a thickness between about 0.007 inch and about 0.074 inch.

* * * * *